(12) United States Patent
Araki et al.

(10) Patent No.: US 6,207,236 B1
(45) Date of Patent: Mar. 27, 2001

(54) COATING COMPOSITION, COATING FILM, AND METHOD FOR PRODUCING COATING FILM

(75) Inventors: Takayuki Araki; Yoshito Tanaka; Masahiro Kumegawa; Noritoshi Oka; Tetsuo Shimizu, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/202,592

(22) PCT Filed: Jun. 16, 1997

(86) PCT No.: PCT/JP97/02070

§ 371 Date: Dec. 17, 1998

§ 102(e) Date: Dec. 17, 1998

(87) PCT Pub. No.: WO97/48774

PCT Pub. Date: Dec. 24, 1997

(30) Foreign Application Priority Data

Jun. 19, 1996 (JP) .................................... 8-157978

(51) Int. Cl.$^7$ ...................................................... B05D 3/02
(52) U.S. Cl. ........................ 427/386; 427/387; 427/388.1; 427/389.7
(58) Field of Search ................................ 427/387, 388.1, 427/389.7, 386

(56) References Cited

FOREIGN PATENT DOCUMENTS

| | | |
|---|---|---|
| 63-54409 | 3/1988 | (JP) . |
| 5-1118 | 1/1993 | (JP) . |
| 5-194668 | 8/1993 | (JP) . |
| 5-247304 | 9/1993 | (JP) . |
| 6-329442 | 11/1994 | (JP) . |
| 7-157335 | 6/1995 | (JP) . |

OTHER PUBLICATIONS

English Translation of International Preliminary Examination Report for PCT/JP97/02070, Aug. 1998.
Chemical Abstracts, vol. 110, No. 26, Jun. 26, 1989, Columbus, OH US, Abstract No. 233284, XP002109775 & JP 63 314282 A (Taiyo Bussan Co., Ltd.), Dec. 22, 1988.
Database WPI, Section Ch, Week 9517, Derwent Publications Ltd., London, GB Class A14, AN 95–128600, XP002109776 & 07 053911 A (Asahi Glass Co., Ltd.), Feb. 28, 1995.
Database WPI, Section Ch, Week 9248, Derwent Publications Ltd., London, GB, Class A28, AN 92–394002, XP002109777 & JP 04 292677 A (Showa Tekunokoto KK) Oct. 16, 1992.

*Primary Examiner*—Erma Cameron
(74) *Attorney, Agent, or Firm*—Sughrue, Mion, Zinn, Macpeak & Seas, PLLC

(57) ABSTRACT

To provide the water-repellent coating film having excellent transparency, abrasion resistance, weather resistance and water repellency, the method for producing the coating film, the multi-functional composite material provided with the coating film and the coating composition used therefor which has excellent dispersion stability. The coating composition comprises (A) the fluorine-containing ethylenic polymer prepared by copolymerizing a fluorine-containing ethylenic monomer having at least one functional group selected from hydroxyl, carboxyl, a carboxylic salt group, a carboxylic ester group and epoxy, (B-1) the metal oxide sol, and (C) the solvent.

11 Claims, 1 Drawing Sheet

COATING COMPOSITION, COATING FILM, AND METHOD FOR PRODUCING COATING FILM

This is the national stage of International Application No. PCT/JP97/02070, filed Jun. 16, 1997.

TECHNICAL FIELD

The present invention relates to a coating composition, a coating film and a method for producing the coating film.

BACKGROUND ART

Hitherto various attempts have been studied to give water repellency to window glasses and fender mirrors for the purpose to repel rain water and to obtain clear view in rainy days.

For example, JP-A-4-124047, JP-A-4-325446 and JP-A-5-24885 disclose coating of a silane compound containing a fluoroalkyl group $R_f$ group) on a substrate such as glass. Also JP-A-4-359086, JP-A-5-170486 and JP-A-5-213633 disclose forming of a water-repellent coating film by partially hydrolyzing, with an acid, etc., a fluoroalkyl-containing silane compound or a metal alkoxide mixed with a fluoroalkyl-containing silane compound, condensation-polymerizing (to be sol) and then coating on a glass substrate and baking (to be gel).

However the water-repellent glass obtained by the above-mentioned methods has a problem that water-repellent groups are easy to distribute in the outermost surface of the coating film and water-repellency is lowered by abrasion. Further the fluoroalkyl-containing silane compound and its condensate have insufficient heat resistance and weather resistance, so that when used for a long period of time, they are deteriorated and cannot maintain water-repellency.

Therefore in order to solve those problems, there have been investigated various methods to obtain a water-repellent coating film by dispersing fluorine-containing resin particles having no functional group as a water-repelling component into a metal oxide obtained through so-called sol-gel method. For example, in JP-A-5-51238, JP-A-6-329442, JP-A-6-340451, JP-A-7-102207 and JP-A-7-157335, it is disclosed that a coating solution is prepared by admixing particles (powder or dispersion) of water-repellent fluorine-containing resin such as polytetrafluoroethylene, tetrafluoroethylene-hexafluoropropylene polymer or fluorine-containing acrylic resin to a sol solution prepared by hydrolyzing and condensating a metal alkoxide compound in a solvent such as alcohol, and the coating solution is applied on a substrate such as glass and then baked (to be gel) to form a water-repellent coating film that the water-repellent particles are distributed in the sol-gel film.

However in those methods, though improvements of weather resistance and heat resistance can be expected, there are the following problems.

① Dispersion stability of fluorine-containing resin particles in the coating solution prepared by admixing the fluorine-containing resin particles to the sol solution is poor, sedimentation of the fluorine-containing resin particles easily occurs, and thus the coating film becomes turbid in white and transparency becomes lowered significantly.

② Even if the coating solution visually seems to be dispersed, when the solution is coated and concentrated in the coating film during baking step, the fluorine-containing resin particles are coagulated because of insufficient dispersion stability, and the coating film becomes turbid in white and its transparency is lowered.

③ Since interfacial affinity between the metal oxide and the fluorine-containing resin particles is inherently low, dispersibility of the fluorine-containing resin particles in the obtained coating film is low, strength of the coating film is lowered and abrasion resistance of the coating film becomes low.

④ Since interfacial affinity between the metal oxide and the fluorine-containing resin particles in the obtained coating film is low, removal of the fluorine-containing resin particles occurs in the abrasion resistance test, and water-repellency is lowered.

As mentioned above, present situation is such that there have not yet been obtained a water-repellent coating film or water-repellent glass which is excellent in transparency and water-repellent durability such as abrasion resistance and weather resistance, and a coating composition which is used therefor and is excellent in dispersion stability.

An object of the present invention is to provide a multi-functional coating film being excellent in not only water-repellency and transparency but also stain-proofing property, non-sticking property, sliding property (abrasion resistance) and weather resistance, a method for producing the coating film, a multi-functional composite material provided with the coating film, and a coating composition which is used therefor and is excellent in dispersion stability.

Further an object of the present invention is to provide composite materials having water-repellency, stain-proofing property, non-sticking property, sliding property or weather resistance which are produced by applying the mentioned coating film on a substrate.

Also an object of the present invention is to provide a composite material for cooking apparatuses and a composite material for building.

DISCLOSURE OF THE INVENTION

The present invention relates to a coating composition comprising (A) a fluorine-containing ethylenic polymer having functional group (hereinafter also referred to as "fluorine-containing polymer (A) having functional group") prepared by copolymerizing a fluorine-containing ethylenic monomer having functional group which has at least one functional group selected from the group consisting of hydroxyl, carboxyl, a carboxylic salt group, a carboxylic ester group or epoxy, (B-1) a metal oxide sol, and (C) a solvent.

Also in the present invention, it is preferable that the above-mentioned fluorine-containing polymer (A) having functional group is in the form of fine particles.

Also in the present invention, it is preferable that fine particles of the above-mentioned fluorine-containing polymer (A) having functional group are water-repellent fine particles.

Also in the present invention, it is preferable that the fluorine-containing polymer (A) having functional group is a fluorine-containing polymer having functional group which is prepared by copolymerizing (a) 0.05 to 50% by mole of at least one of fluorine-containing ethylenic monomers having functional group and represented by the formula (1):

$$CX_2=CX^1-R_f-Y \qquad (1)$$

herein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms or a divalent fluorine-containing alkylene group having 1 to 40 carbon atoms and ether bond and (b) 50 to 99.95% by mole of at least one of fluorine-containing ethylenic monomers copolymerizable with the fluorine-containing ethylenic monomer (a) having functional group.

Also in the present invention it is preferable that the fluorine-containing ethylenic monomer (a) having functional group is a fluorine-containing ethylenic monomer having functional group and represented by the formula (2):

$$CH_2=CFCF_2-R_f^1-Y^1 \quad (2)$$

wherein Y$^1$ is —CH$_2$OH, -COOH, a carboxylic salt group, a carboxylic ester group or epoxy, R$_f^1$ is a divalent fluorine-containing alkylene group having 1 to 39 carbon atoms or OR$_f^2$, in which R$_f^2$ is a divalent fluorine-containing alkylene group having 1 to 39 carbon atoms or a divalent fluorine-containing alkylene group having 1 to 39 carbon atoms and ether group.

Also in the present invention it is preferable that the fluorine-containing ethylenic monomer (b) is tetrafluoroethylene.

Also in the present invention it is preferable that the fluorine-containing ethylenic monomer (b) is a mixture of 85 to 99.7% by mole of tetrafluoroethylene and 0.3 to 15% by mole of a monomer represented by the formula (3):

$$CF_2=CF-R^3 \quad (3)$$

wherein R$_f^3$ is CF$_3$ or OR$_f^4$, in which R$_f^4$ is a perfluoroalkyl group having 1 to 5 carbon atoms.

Further the present invention relates to a metal oxide coating film comprising the above-mentioned metal oxide (B) and fine particles of the fluorine-containing polymer (A) having functional group, and containing the fine particles in dispersed state.

Further the present invention relates to a metal oxide coating film comprising the above-mentioned metal oxide (B) and water-repellent fine particles of the fluorine-containing polymer (A) having functional group, and containing the water-repellent fine particles in dispersed state.

Further the present invention relates to a method for producing a coating film by using (B-1) a metal oxide sol obtained from at least one selected from the group consisting of a metal alkoxide, a metal acetylacetate, a metal carboxylate, a metal nitrate or a metal chloride and an aqueous dispersion containing fine particles of the above-mentioned fluorine-containing polymer (A) having functional group obtained by emulsion polymerization; the method comprising the steps of (1) preparing a coating solution by mixing the metal oxide sol (B-1) and the aqueous dispersion, (2) forming a coating film by applying the coating solution to a substrate, and (3) baking the coating film to obtain the film containing the fine particles of the fluorine-containing polymer (A) having functional group in dispersed state.

BEST MODE FOR CARRYING OUT THE INVENTION

Figure 1:
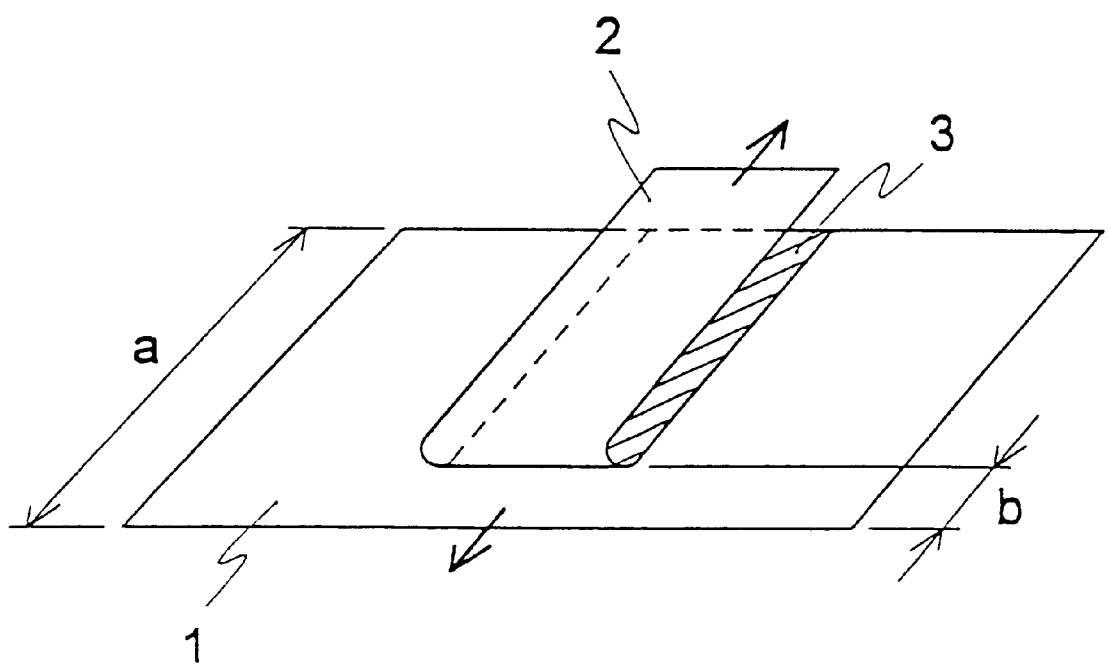
FIG. 1 is a diagrammatic perspective view of a sample used for a non-stickiness test in Example of the present invention.

The coating composition of the present invention is the coating composition comprising (A) the fluorine-containing ethylenic polymer having the specific functional group, (B-1) the metal oxide sol and (C) the solvent, and the important feature of the present invention is to use the fluorine-containing polymer (A) having functional group which is obtained by introducing the specific functional group.

The present inventors have found that, not only since dispersion stability of the fluorine-containing polymer (A) having functional group in the metal oxide sol (B- 1) and the solvent (C) is enhanced remarkably but also since the fluorine-containing ethylenic polymer (A) having functional group is dispersed so uniformly in the coating film obtained from the coating composition comprising the mentioned components, the coating film is particularly good in transparency and is also excellent in water-repellency, stain-proofing property, non-sticking property, sliding property, weather resistance and heat resistance, and thus have completed the present invention.

Further the present inventors have found that even in case where the fine particles of the fluorine-containing polymer (A) having functional group are used, the above-mentioned dispersion stability, transparency, water-repellency, stain-proofing property, non-sticking property, sliding property, weather resistance and heat resistance are more excellent, and that particularly when the water-repellent fine particles of the fluorine-containing polymer (A) having functional group are used, those characteristics are further enhanced, and particularly water-repellency is significantly enhanced.

As compositions similar to the coating composition of the present invention, for example, JP-A-7-82520, WO94/06870 and JP-A-8-12921 disclose coating compositions prepared by blending a hydrolyzable silane compound with a polymer of a hydrocarbon vinyl ether having hydroxyl and fluorine-containing ethylene.

However the coating compositions disclosed in the mentioned publications are characterized in that after the coating, the fluorine-containing polymer composes a matrix and the silane compound is phase-separated therefrom and spread in the surface region of the coating film. Namely the inventions disclosed in the mentioned publications aim to make the coating film surface hydrophilic by hydrolyzing the silane compound in the surface region of the coating film to improve property for preventing stain due to rain water, when used outdoors.

Accordingly those coating compositions cannot give a coating film having the excellent water-repellency, stain-proofing property, non-sticking property, sliding property, weather resistance and heat resistance of the present invention. Also the fluorine-containing polymers themselves disclosed in the mentioned publications have weather resistance but are insufficient in water-repellency and heat resistance, and thus when forming a coating film according to the sol-gel method of the present invention, thermal decomposition occurs, for example, at the time of baking step, which results in poor appearance of the coating film and lowering of the inherent characteristics of the fluorine-containing resin.

On the other hand since the fluorine-containing polymer (A) having functional group in the coating composition of the present invention is a polymer obtained particularly by copolymerizing the fluorine-containing ethylenic monomer having functional group and the fluorine-containing ethylenic monomer which does not have the above-mentioned functional group, the polymer itself has a large fluorine content and is excellent in water-repellency, stain-proofing property, non-sticking property, sliding property, weather resistance and heat resistance. Thus the polymer is not thermally decomposed at the baking step and can give a metal oxide coating film having excellent transparency and water-repellency.

The specific functional group of the fluorine-containing polymer (A) having functional group which can be used in the coating composition of the present invention is at least one of hydroxyl, carboxyl, a carboxylic salt group, a carboxylic ester group and epoxy, and is selectively and optionally used depending on purposes and applications, namely kind of the metal oxide (B), kind of a starting material such as metal alkoxide used when preparing the metal oxide sol (B-1) and kind of a substrate surface. From the viewpoints of dispersion stability of the coating composition and heat resistance at baking, hydroxyl is most preferable.

Example of the fluorine-containing polymer (A) used in the coating composition of the present invention is a fluorine-containing polymer having functional group which is prepared by copolymerizing (a) 0.05 to 50% by mole of at least one of fluorine-containing ethylenic monomers having functional group and represented by the formula (1):

$$CX_2=CX^1-R_f-Y \quad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms or a divalent fluorine-containing alkylene group having ether bond and 1 to 40 carbon atoms, and (b) 50 to 99.95% by mole of at least one of fluorine-containing ethylenic monomers copolymerizable with the fluorine-containing ethylenic monomer (a) having functional group. The obtained fluorine-containing polymer having functional group is excellent in heat resistance, weather resistance and water-repellency.

Examples of the fluorine-containing ethylenic monomer (a) having functional group are monomers represented by the formula (4):

$$CF_2=CF-R_f^5-Y \quad (4)$$

wherein Y is the same as Y in the formula (1), R$_f^5$ is a divalent fluorine-containing alkylene group having 1 to 40 carbon atoms or OR$_f^6$, in which R$_f^6$ is a divalent fluorine-containing alkylene group having 1 to 40 carbon atoms or a divalent fluorine-containing alkylene group having ether bond and 1 to 40 carbon atoms, the formula (5):

$$CF_2=CFCF_2-OR_f^7-Y \quad (5)$$

wherein Y is the same as Y in the formula (1), R$_f^7$ is a divalent fluorine-containing alkylene group having 1 to 39 carbon atoms or a divalent fluorine-containing alkylene group having ether bond and 1 to 39 carbon atoms, the formula (2):

$$CH_2=CFCF_2-R_f^1-Y^1 \quad (2)$$

herein Y$^1$ is the same as Y in the formula (1), 1 is a divalent fluorine-containing alkylene group having 1 to 39 carbon atoms or OR$_f^2$, in which R$_f^2$ is a divalent fluorine-containing alkylene group having 1 to 39 carbon toms or a divalent alkylene group having ether bond and 1 to 39 carbon atoms, the formula (6):

$$CH_2=CH-R_f^8-Y \quad (6)$$

wherein Y is the same as Y in the formula (1), R$_f^8$ is a divalent fluorine-containing alkylene group having 1 to 40 carbon atoms, and the like.

The fluorine-containing ethylenic monomers having functional group which are represented by the formulae (2) and (4) to (6) are preferable from the points that copolymerizability with the fluorine-containing ethylenic monomer (b) is relatively good and that heat resistance and water-repellency of the polymer obtained by the copolymerization is not lowered remarkably.

Among them, from the viewpoints of copolymerizability with other fluorine-containing ethylenic monomer and heat resistance of the obtained polymer, the monomers represented by the formulae (2) and (4) are preferable, and the monomer represented by the formula (2) is particularly preferable.

Examples of the fluorine-containing ethylenic monomer having sectional group and represented by the formula (4) are:

$$CF_2=CFOCF_2CF_2CH_2OH, \quad CF_2=CFO(CF_2)_3COOH,$$

$$CF_2=CFOCF_2CF_2COOCH_3,$$

$$CF_2=CFCF_2COOH, \quad CF_2=CFCF_2CH_2OH,$$

and the like.

Examples of the fluorine-containing ethylenic monomer having functional group and represented by the formula (5) are:

$$CF_2=CFCF_2OCF_2CF_2CF_2COOH,$$

$$CF_2=CFCF_2OCF_2CF_2CF_2CH_2OH,$$

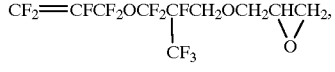

and the like.

Examples of the fluorine-containing ethylenic monomer having functional group and represented by the formula (2) are:

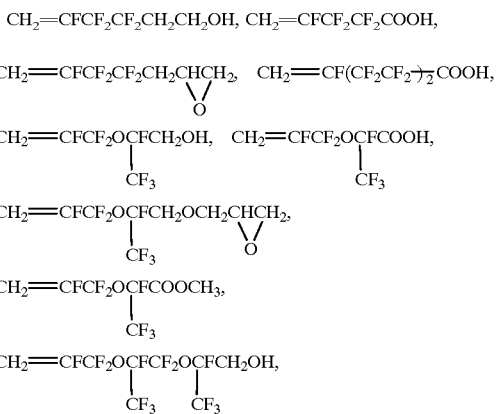

and the like.

Examples of the fluorine-containing ethylenic monomer having functional group and represented by the formula (6) are:

$CH_2=CHCF_2CF_2CH_2CH_2COOH$,

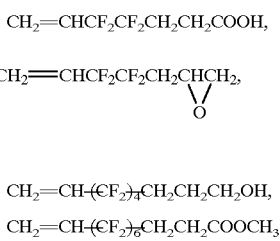

$CH_2=CH{-}(CF_2)_4CH_2CH_2CH_2OH$, $CH_2=CH{-}(CF_2)_6CH_2CH_2COOCH_3$, and the like.

In addition, there are

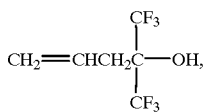

and the like.

The ethylenic monomer copolymerizable with the fluorine-containing ethylenic monomer (a) having functional group can be optionally selected from known monomers. From the viewpoint of giving water-repellency, stain-proofing property, non-sticking property, sliding property, weather resistance, chemical resistance and heat resistance to the polymer, the copolymerizable ethylenic monomer is selected from the fluorine-containing ethylenic monomers (b).

Examples of the fluorine-containing ethylenic monomer (b) are tetrafluoroethylene, a monomer represented by the formula (3):

$$CF_2=CF\text{-}R_f^3 \qquad (3)$$

wherein $R_f^3$ is $CF_3$ or $OR_f^4$, in which $R_f^4$ is a perfluoroalkyl group having 1 to 5 carbon atoms, hexafluoropropylene, chlorotrifluoroethylene, vinylidene fluoride, vinyl fluoride, perfluoro(alkyl vinyl ethers), hexafluoroisobutene,

wherein both of $X^2$ are selected from hydrogen atom, fluorine atom and chlorine atom, both of n are an integer of 1 to 5, and the like.

In addition to the fluorine-containing ethylenic monomer (a) having functional group and the fluorine-containing ethylenic monomer (b), an ethylenic monomer having no fluorine atom may be added in the range of not lowering water-repellency, heat resistance and non-sticking property. In that case, it is preferable that the ethylenic monomer having no fluorine atom is selected from ethylenic monomers having not more than 5 carbon atoms in order not to lower water-repellency and heat resistance. Examples of such an ethylenic monomer are ethylene, propylene, 1-butene, 2-butene, and the like.

A content of the fluorine-containing ethylenic monomer (a) having functional group in the fluorine-containing ethylenic polymer (A) having functional group which is used in the coating composition of the present invention can be optionally selected depending on kinds of the metal oxide sol (B-1) in the composition and the metal oxide (B) forming the coating film, a proportion of the fluorine-containing polymer (A) having functional group to the metal oxide sol (B-1), a solid content, a percentage of the fluorine-containing polymer (A) having functional group in the coating film, and further depending on purposes and applications. The content of the fluorine-containing ethylenic monomer (a) having functional group is preferably from 0.05 to 50% by mole, more preferably from 0.1 to 20% by mole, particularly preferably from 0.1 to 10% by mole.

When the content of the fluorine-containing ethylenic monomer (a) having functional group is less than 0.05% by mole, dispersion stability of the coating composition becomes insufficient, the composition is precipitated and the coating film is tinged with white. Also interfacial adhesion between the metal oxide in the coating film and the fluorine-containing polymer (A) having functional group which is dispersed in the coating film becomes insufficient, and the fluorine-containing polymer (A) having functional group is removed by friction, etc., and thus water-repellency is lowered.

On the contrary when the content of the fluorine-containing ethylenic monomer (a) having functional group exceeds 50% by mole, inherent water-repellency of the fluorine-containing polymer (A) having functional group is lost, its heat resistance is lowered, and when baking at high temperature, thermal decomposition, coating film defects such as coloring, foaming and pin hole, and lowering of water-repellency easily occur.

Examples of the preferred fluorine-containing ethylenic polymer (A) having functional group used in the coating composition of the present invention are as follows.

(I) A polymer comprising 0.05 to 50% by mole of the fluorine-containing ethylenic monomer (a) having functional group and 50 to 99.95% by mole of tetrafluoroethylene. For example, there is polytetrafluoroethylene having functional group (reactive PTFE).

(II) A polymer comprising 0.05 to 50% by mole of the fluorine-containing ethylenic monomer (a) having functional group based on the total amount of monomers, and based on the total amount of monomers except the monomer (a), 85 to 99.7% by mole of tetrafluoroethylene and 0.3 to 15% by mole of a monomer represented by the formula (3):

wherein $R_f^3$ is $CF_3$ or $OR_f^4$, in which $R_f^4$ is a perfluoroalkyl group having 1 to 5 carbon atoms. For example, there is a tetralluoroethylene-perfluoro(allyl vinyl ether) polymer having functional group (reactive PFA) or a tetrafluoroethylene-hexafluoropropylene polymer having functional group (reactive FEP).

(III) A polymer comprising 0.05 to 50% by mole of the fluorine-containing ethylenic monomer (a) having functional group based on the total amount of monomers, and based on the total amount of monomers except the monomer (a), 40 to 80% by mole of tetrafluoroethylene, 20 to 60% by mole of ethylene and 0 to 15% by mole of other copolymerizable monomer. For example, there is an ethylene-tetrafluoroethylene polymer having functional group (reactive ETFE).

Those fluorine-containing polymers (A) having functional group have a high melting point of not less than 200° C., and are preferable from the point that when producing a coating film which comprises the fluorine-containing polymer (A) having functional group and the metal oxide (B) and contains fine particles of the fluorine-containing polymer (A) having functional group in dispersed state, the polymer (A) does not melt even at baking at high temperature and can be maintained in the form of fine particles in the coating film.

The fluorine-containing ethylenic polymer (A) having functional group which can be used in the present invention can be prepared by copolymerizing the fluorine-containing ethylenic monomer (a) having functional group and the ethylenic monomer (b) through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer (A) is regulated by a concentration of the monomers used in the polymerization, a concentration of the initiator, and a concentration and temperature of a chain transfer agent. Amounts of components of the prepared polymer can be regulated by amounts of monomers used.

Also the present invention relates to the metal oxide coating film which comprises the matrix metal oxide (B) and fine particles of the fluorine-containing ethylenic polymer (A) having functional group and contains the above-mentioned fine particles in dispersed state.

The metal oxide (B) which forms a matrix in the coating film obtained in the present invention is preferably one which is obtained by hydrolyzing and polycondensating, for example, an organic compound or inorganic compound of metal as a starting material in the solvent (C) mentioned hereinafter, or the like.

As the so-obtained metal oxide (B), there can be used various ones depending on purposes and applications. For example, there are oxides of metals (M) in the Periodic Table of Elements such as:

Ia group: Li, Na,
Ib group: Cu,
IIa group: Ca, Sr, Ba,
IIb group: Zn,
IIIa group: Y,
IIIb group: B, Al, Ga,
IVa group: Ti, Zr,
IVb group: Si, Ge,
Va group: V, Ta,
Vb group: P, Sb,
VIa group: W,
Lanthanide group: La, Nd, and the like. Also there can be used metals having two or more valences, namely metal oxides (R-MO) in which an organic group (R) such as an alkylene group having a functional group, for example, alkyl, fluorine-containing alkyl, amino, epoxy, hydroxyl, etc. is directly bonded to metal (M). More concrete examples of the metal oxide (B) are mentioned later.

As the above-mentioned metal (M), various ones can be selected depending on purposes and applications. Paticularly preferable is metal selected from Si, Al, Ti and Zr from the point of making it possible to form a transparent coating film having high hardness and excellent durability.

In the present invention, a proportion (A)/ (B) (volume ratio) of the fluorine-containing ethylenic polymer (A) having functional group to the metal oxide (B) in the coating film formed on a surface of a substrate mentioned later is preferably 1 to 85/99 to 15, particularly preferably 5 to 75/25 to 95 from the viewpoints of transparency and strength of the coating film. When an amount of the fluorine-containing polymer (A) having functional group is too much, transparency of the coating film is lowered and the coating film becomes fragile. On the contrary, when too small, excellent inherent characteristics of the fluorine-containing resin such as water-repellency, non-sticking property and stain-proofing property are lowered.

The coating film of the present invention is a metal oxide coating film obtained by so-called sol-gel method, and can be formed by applying, on a substrate, the coating composition comprising fine particles of the fluorine-containing ethylenic polymer (A) having functional group, the metal oxide sol (B-1) (hydrolysate or lower molecular weight condensate before gelling) which is a precursor of the metal oxide (B) and the solvent (C).

Accordingly the present invention also relates to such a coating composition.

As the solvent (C) which can be used in the coating composition of the present invention, there are various solvents. From the point that a homogeneous solution of the metal oxide sol (B-1) can be prepared, there are mainly used the solvent selected from alcohols such as methanol, ethanol, propanol, isopropanol, butanol and isobutanol and water for accelerating the hydrolyzing.

When the metal compound insoluble in those solvents is used as a starting material for the metal oxide sol (B-1) (namely metal oxide coating film), ethylene glycol, ethylene oxide, triethanolamine, xylene or the like may be used. Also for preventing cracking of the coating film, there may be used formamide, dimethylformamide, dioxane, oxalic acid and other solvents having high boiling point.

In the coating composition of the present invention, a proportion of the fluorine-containing ethylenic polymer (A) having functional group, metal oxide sol (B-1) and the solvent (C) can be selected optionally depending on purposes and applications. Amounts of the fluorine-containing polymer (A) having functional group and metal oxide sol (B-1) are preferably 1 to 85% by weight and 15 to 99% by weight, respectively based on the total amount of the polymer (A) and the metal oxide sol (B-1), more preferably 10 to 75% by weight and 25 to 90% by weight, respectively.

Also the total amount of the fluorine-containing polymer (A) having functional group and metal oxide sol (B-1) in the whole composition is from 0.1 to 70% by weight, preferably from 0.5 to 50% by weight.

In the coating composition of the present invention, the fluorine-containing ethylenic polymer (A) having functional group is preferably in the form of fine particles, and after coated, is dispersed in the form of fine particles in the metal oxide coating film and can provide the coating film having particularly excellent abrasion resistance and water-repellency.

An average particle size of fine particles of the fluorine-containing ethylenic polymer (A) having functional group is from about 0.01 µm to about 1.0 µm, preferably not more than 0.6 µm. In this range, particularly when transparency is required, the average particle size is preferably not more than 0.4 µm. Also when dispersion stability and storage stability of the coating composition and transparency of the coating film are required, the average particle size is most preferably not more than 0.2 µm.

The fine particles of the fluorine-containing polymer (A) having functional group are prepared by various methods, and are preferably prepared by emulsion polymerization from the point that the particle size can be regulated to be fine and uniform. In that case, the coating composition of the present invention can be prepared by directly mixing an aqueous dispersion of fine particles of the fluorine-containing polymer (A) having functional group obtained by emulsion polymerization with a previously prepared solution of the metal oxide sol (B-1) or by hydrolyzing and poly-condensating the metal compound in a solvent containing an aqueous dispersion of fine particles of the fluorine-containing polymer (A) having functional group.

To the coating composition of the present invention can be added additives, for example, a surfactant, pigment, dye, thickener, etc.

The coating film of the present invention is formed by applying the coating composition (solution in the form of sol) containing the fine particles of the fluorine-containing ethylenic polymer (A) having functional group and metal oxide sol (B-1) on various substrates mentioned later of ceramics such as glass and pottery, metal, synthetic resin, etc. Then by baking (gelling) (namely sol-gel method) the coating film, the poly-condensation of the metal oxide sol (B-1) further advances and the hard coating film of the metal oxide (B) having high strength is formed. The obtained coating film of the metal oxide contains the uniformly dispersed fluorine-containing polymer (A) in the form of particles.

Since the fine particles of the fluorine-containing polymer (A) are uniformly distributed up to the inside of the metal oxide coating film of the present invention, even if the surface of the coating film is abraded and shaved off, excellent characteristics (water-repellency, etc.) of the fluorine-containing resin are exhibited even in the coating film and are not lowered.

The mentioned baking is preferably carried out at a temperature of not more than the melting point of the fluorine-containing polymer (A) in order to uniformly disperse the particles thereof in the metal oxide coating film. However when a polymer which has a high melt viscosity and is not melted (for example, PTFE, etc.) is used in the form of fine particles, the baking can be carried out at a temperature higher than the melting point unless the temperature exceeds the thermal decomposition temperature of the fluorine-containing polymer (A).

A thickness of the metal oxide coating film of the present invention varies depending on purposes and applications, and is from 0.01 to 100 µm.

Further the present invention relates to a method for producing the mentioned coating film. The coating film can be produced, for example, by using the aqueous dispersion containing fine particles of the fluorine-containing polymer (A) having functional group prepared by emulsion polymerization and the metal oxide sol (B-1) obtained by hydrolyzation and condensation reaction of at least one starting material selected from the group consisting of a metal alkoxide, metal acetylacetate, metal carboxylate, metal nitrate and metal chloride. The method comprises the steps of:

(1) preparing a coating solution by mixing the metal oxide sol (B-1) and the aqueous dispersion, (2) forming the coating film by applying the coating solution to a substrate, and (3) baking the coating film to obtain the film containing the fine particles of the fluorine-containing polymer (A) having functional group in dispersed state.

(Preparation of solution of metal oxide sol)

The above-mentioned metal oxide sol (B-1) can be prepared by hydrolyzing and poly-condensating a corresponding metal alkoxide, metal acetylacetate, metal carboxylate, metal nitrate, metal chloride or a mixture of two or more thereof.

Among them, metal alkoxide is preferred since it is highly reactive and easily forms a polymer (metal oxide) having metal-oxygen bond by the hydrolyzation and poly-condensation reaction.

In case where no proper metal alkoxide is available, namely when synthesizing of the metal alkoxide is difficult or when the metal alkoxide is insoluble in commonly used solvents such as water and alcohol (for example, copper alkoxide, etc.), a carboxylate such as metal acetylacetate or metal acetate, an oxylate, etc. can be used.

Further in case where proper metal alkoxide and other organic metal compound are not available, inorganic metal compounds such as metal nitrate, metal chloride and metal oxide can be used.

The metal alkoxide is a compound represented by M(OR)n, in which M is metal, R is alkyl, n is a figure corresponding to a valence of the metal. In general, the metal M can be optionally selected depending on purposes and applications of a finally obtained coating film containing a corresponding metal oxide. The alkyl R can be selected depending on purposes in consideration of solubility and insolubility in a solvent, hydrolyzability, poly-condensation reactivity, etc.

Examples of the metal alkoxide are, for instance, $LiOCH_3$, $NaOCH_3$, $Cu(OCH_3)_2$, $Ca(OCH_3)_2$, $Sr(OC_2H_5)_2$, $Ba(OC_2H_5)_2$, $Zn(OC_2H_6)_2$, $Y(OC_4H_9)_3$, $B(OCH_3)_3$, $Al(OCH_3)_3$, $Al(OC_2H_5)_3$, $Al(iso\text{-}OC_3H_7)_3$, $Al(OC_4H_9)_3$, $Ga(OC_2H_5)_3$, $Ti(OCH_3)_4$, $Ti(OC_2H_5)_4$, $Ti(iso\text{-}OC_3H_7)_4$, $Ti(OC_4H_9)_4$, $Zr(OCH_3)_4$, $Zr(OC_2H_5)_4$, $Zr(OC_3H_7)_4$, $Zr(OC_4H_9)_4$, $Si(OCH_3)_4$, $Si(OC_2H_5)_4$, $Si(iso\text{-}OC_3H_7)_4$, $Si(t\text{-}OC_4H_9)_4$, $Ge(OC_2H_5)_4$, $Pb(OC_4H_9)_4$, $P(OCH_3)_3$, $Sb(OC_2H_5)_3$, $VO(OC_2H_5)_3$, $Ta(OC_3H_7)_5$, $W(OC_2H_5)_6$, $La(OC_3H_7)_3$, $Nb(OC_2H_5)_3$, $La[Al(iso\text{-}OC_3H_7)_4]_3$, $Mg[Al(iso\text{-}OC_3H_7)_4]_2$, $Mg[Al(sec\text{-}OC_4H_9)_4]_2$, $Ni[Al(iso\text{-}OC_3H_7)_4]_2$, $(C_3H_7O)_2Zr[Al(OC_3H_7)_4]_2$, $Ba[Zr_2(OC_2H_5)_9]_2$, and the like.

As the metal alkoxide, there can be used not only a compound prepared by bonding only an alkoxyl group to metal but also a compound obtained by substituting a part of an alkoxyl group with an alkyl group such as methyl or ethyl, a compound obtained by substituting a part of an alkoxyl group with a fluorine-containing alkyl group, and a compound obtained by substituting a part of an alkoxyl group with an alkylene group, having a functional group such as amino, epoxy, hydroxyl or mercapto.

Examples of those compounds are
$CH_3Si\text{-}(OC_2H_5)_3$, $C_2H_5Si\text{-}(OC_2H_5)_2$,
$CF_3\text{-}(CF_2)_5CH_2CH_2Si(OCH_3)_3$,
$CF_3\text{-}(CF_2)_7CH_2CH_2Si(OCH_3)_3$, $H_2N-(CH_2)_3Si(OCH_3)_3$, $HO-(CH_2)_3Si(OCH_3)_3$,

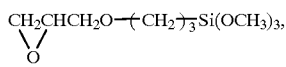

$HS-(CH_2)_3Si(OCH_3)_3$,
and the like.

Examples of other organic metal compound are metal acetylacetates, for instance, $Zr(COCH_2CH_3)_4$, $In(COCH_2COCH_3)_3$ and $Zn(COCH_2COCH_3)_2$, metal carboxylates, for instance, $Pb(CH_3COO)_2$, $Y(C_{17}H_{35}COO)_3$ and $Ba(HCOO)_2$, and the like.

Examples of the inorganic metal compound are metal nitrates, for instance, $Y(NO_3)_3\cdot 6H_2O$ and $Ni(NO_3)_2\cdot 3H_2O$, metal oxychlorides, for instance, $ZrOCl_2$ and $AlOCl$, metal chlorides, for instance, $TiCl_4$, and the like. Also it is possible to make sol again and carry out sol-gel method by using a metal compound such as a fumed silica.

In preparing a solution of the metal oxide sol (B-1), at first a metal compound corresponding to metal of a desired metal oxide is selected from the above-mentioned compounds and then dissolved in an alcoholic solvent. In that case, it is desirable that the metal compound is dissolved in the solvent uniformly, and it is preferable to select a metal compound which dissolves in the solvent.

By adding water and acid or alkali as a catalyst to the solution of metal compound, hydrolyzation and poly-condensation occur and particles of the metal compound are generated, thus giving a solution of metal oxide sol (B-1).

Examples of the acid which can be used generally as the catalyst are, for instance, hydrochloric acid, sulfuric acid, nitric acid, acetic acid, hydrofluoric acid, etc. For the alkali as the catalyst, there can be used preferably, for example, an ammonia which can be removed by evaporation after the treatment.

A reaction temperature when preparing a solution of the metal oxide sol varies depending on kind of metal, kind of metal compound used, degree of polymerization of a desired sol, etc. The reaction temperature is in general from room temperature to 100° C., preferably from room temperature to about 80° C. A solid content is preferably from 0.5 to 50% by weight.

As the case demands, it is possible to prepare the metal oxide sol (B-1) by carrying out the hydrolyzation and poly-condensation slowly with moisture in the air without adding water and catalyst. (Preparation of aqueous dispersion of fluorine-containing polymer (A) having functional group)

The fine particles of the fluorine-containing polymer (A) having functional group which are mixed with the metal oxide sol (B-1) can be prepared by various methods.

For example, there are:
(i) a method for finely pulverizing a powder of the fluorine-containing polymer (A) having functional group obtained by suspension polymerization, etc., adding the finely pulverized powder together with a surfactant, etc. into a solution of the metal oxide sol (B-1) and then mixing uniformly (In this case, a coating solution mentioned later is generated at the same time as in the dispersion),
and
(ii) a method for preparing an aqueous dispersion of the fluorine-containing polymer (A) having functional group at the same time of the polymerization by emulsion polymerization (In this case, it is possible to mix directly with the solution of the metal oxide sol (B-1)). From the viewpoints of productivity and quality (making particle size smaller and uniform), it is preferable to prepare an aqueous dispersion by emulsion polymerization and mix the aqueous dispersion as it is directly with the solution of the metal oxide sol (B-1). The aqueous dispersion of fine particles of the fluorine-containing polymer (A) having functional group usually has 1 to 70% by weight, preferably 5 to 50% by weight of solid content.

(Step for preparing coating solution)

As the method for preparing a solution (coating solution) of the metal oxide sol (B-1) containing fine particles of the fluorine-containing polymer (A) having functional group, there can be adopted any of:
(iii) a method for preparing a coating solution by hydrolyzing and poly-condensating a metal compound in an alcohol solution containing an aqueous dispersion of fine particles of the fluorine-containing polymer (A) having functional group to form the metal oxide sol (B-1), and
(iv) a method for preparing a coating solution by mixing an aqueous dispersion of fine particles of the fluorine-containing polymer (A) having functional group with a solution of the metal oxide sol (B-1) previously prepared by hydrolyzation and poly-condensation.

The present inventors have found that the dispersion of fine particles of the fluorine-containing polymer (A) having functional group has high dispersion stability to an alcoholic solvent or other non-aqueous solvent by an effect of a functional group which the polymer possesses and therefore even in the step of preparing the coating solution by any of the above-mentioned methods, neither sedimentation nor precipitation of the fine particles occurs. Also prior to the coating, a solid content in the coating solution may be adjusted depending on a desired thickness and kind and shape of a substrate, and a viscosity of the coating solution may be adjusted by adding a thickener or by other method.

(Coating step)

Depending on purposes and applications, the coating solution can be applied to various substrates of not only glass and metal but also resin, ceramic, etc. mentioned later.

The coating can be carried out by known methods such as dip coating, spin coating, spray coating, brush coating and roll coating.

(Baking step)

The coating film is baked to form a film containing fine particles of the fluorine-containing polymer (A) having functional group in dispersed state. In usual case, prior to the baking, drying for removing water and solvent is carried out at a temperature of from room temperature to 100° C., preferably from room temperature to about 80° C.

The baking temperature varies depending on purpose, application and kind of the fluorine-containing polymer (A) having functional group. The baking temperature is not less than 100° C. and lower than the decomposition temperature of the fluorine-containing polymer (A), preferably not less than 150° C. and lower than the melting point of the fluorine-containing polymer (A) having functional group. When the baking temperature is not more than 100° C., since the condensation polymerization (gelling) of the metal oxide does not advance sufficiently, crosslinking is insufficient and a coating film having high hardness and strength cannot be obtained.

Also when the baking temperature exceeds the decomposition temperature of the fluorine-containing polymer (A), not only foaming and coloring occur but also excellent properties of the fluorine-containing resin such as water-repellency are lost.

In order to disperse the fluorine-containing polymer (A) having functional group in the form of particles in the coating film comprising the metal oxide (B) and fine particles of the fluorine-containing polymer (A), it is preferable to carry out the baking at a temperature of not more than the melting point of the fluorine-containing polymer (A). However in case where fine particles of a polymer which has a high melt viscosity and is not melted (for example, PTFE, etc.) are used, the baking can be carried out even at a temperature of not less than the melting point unless the temperature exceeds the decomposition temperature of the fluorine-containing polymer (A).

In the coating composition of the present invention comprising fine particles of the fluorine-containing polymer (A) having functional group, metal oxide (B) and solvent (C), since the fine particles have water-repellency, stain-proofing property, non-sticking property, sliding property, weather resistance and heat resistance, a multi-functional coating composition can be obtained, and further by coating the composition on a substrate and then baking, a coating film excellent particularly in water-repellency, stain-proofing property, non-sticking property, sliding property, weather resistance and heat resistance can be formed on the substrate.

Examples of the preferred fine particles of the fluorine-containing polymer (A) having functional group are in general those of a polymer, in which a contact angle of water of the fluorine-containing polymer (A) itself is not less than 80 degrees, particularly not less than 95 degrees. Also a fluorine-containing polymer which is neither thermally decomposed nor melted in the baking step at high temperature is preferable in order to maintain the form of fine particles of the fluorine-containing polymer (A) in the coating film comprising the metal oxide (B) and fine particles of the fluorine-containing polymer (A). Particularly a polymer having a melting point of not less than 150° C., preferably not less than 200° C., particularly preferably not less than 250° C. is used.

Examples of the particularly preferable fluorine-containing polymer (A) giving a coating film excellent in water-repellency, stain-proofing property, non-sticking property, sliding property, weather resistance and heat resistance are the above-mentioned polymers (I), (II), (III) and the like.

Also it is particularly preferable that a content of the fluorine-containing ethylenic monomer (a) having functional group in those fluorine-containing polymers (A) is from 0.1 to 10% by mole.

In the present invention, since the coating film has water-repellency, stain-proofing property, non-sticking property, sliding property, weather resistance and heat resistance, a multi-functional composite material comprising the coating film and a substrate can be obtained. Therefore the present invention relates to such a multi-functional composite material.

Examples of the substrate on which the coating film of the present invention can be formed are a metallic substrate, non-metallic inorganic substrate, synthetic resin substrate, and the like.

Metals of the metallic substrate encompass metal, alloys of two or more metals, metal oxide, metal hydroxide, metal salts such as carbonate and sulfate, etc. Among them, metal, metal oxide and alloys are more preferable from the viewpoint of adhesive property.

Examples of the metallic substrate are metals and metal compounds of aluminum, iron, nickel, titanium, molybdenum, magnesium, manganese, copper, silver, lead, tin, chromium, beryllium, tungsten and cobalt, alloys of two or more thereof, etc.

Examples of the alloys are alloy steels such as carbon steel, Ni steel, Cr steel, Ni-Cr steel, Cr-Mo steel, stainless steel, silicon steel and Permalloy; aluminum alloys such as Al-Cl, Al-Mg, Al-Si, Al-Cu-Ni-Mg and Al-Si-Cu-Ni-Mg; copper alloys such as brass, bronze, silicon bronze, silicon brass, nickel silver and nickel bronze; nickel alloys such as nickel manganese (D nickel), nickel-aluminum (Z nickel), nickel-silicon, Monel metal, Constantan, nichrome Inconel and Hastelloy; and the like.

Further as the aluminum-based metal, there can be used pure aluminum; aluminum oxide; and aluminum alloys for casting and expanding such as Al-Cu, Al-Si, Al-Mg, Al-Cu-Ni-Mg, Al-Si-Cu-Ni-Mg alloys, high tensile aluminum alloy and corrosion resistant aluminum alloy.

Also as the iron-based metals, there can be used pure iron, iron oxide, carbon steel, Ni steel, Cr steel, Ni-Cr steel, Cr-Mo steel, Ni-Cr-Mo steel, stainless steel, silicon steel, Permalloy, non-magnetic steel, magnet steel, cast steel, etc.

Also the coating composition of the present invention can be adhered to a substrate which was subjected to, for the purpose of preventing corrosion of metal, coating of other metal by electroplating, hot. dipping, chromatizing, siliconizing, colorizing, sheradizing, metal spraying, etc.; forming a phosphate film by phosphatization; forming metal oxide by anodizing or heat-oxidizing; or electrochemical corrosion prevention.

Further for the purpose of enhancing adhesion to a coating film, the surface of metallic substrate may be subjected to chemical preparation with a phosphoric acid, sulfuric acid, chromic acid, oxalic acid, etc., or may be subjected to surface roughening by sand blasting, shot blasting, grit blasting, honing, paper scratching, wire scratching, hair line finishing, etc. For the purpose of exhibiting clear surface pattern of the substrate, the metal surface may be subjected to coloring, printing, etching, etc.

In case of the above-mentioned aluminum or aluminum alloy substrate, in order to enhance corrosion resistance, surface hardness and adhesive property of the substrate, it is possible to form an oxide film (alumite) on the substrate by anodizing with caustic soda, oxalic acid, sulfuric acid or chromic acid and also use the aluminum or aluminum alloy substrate subjected to other surface treatments mentioned above.

Further there may be used a substrate plated, on its surface, other metal as mentioned above, for example, steel plate subjected to hot-dip zinc-plating, hot-dip zinc alloy plating, aluminum plating, zinc-nickel plating, zinc-aluminum plating, or the like; a substrate coated with other metal by diffusion coating or thermal spraying; a substrate, on which an oxide film is formed by chemical conversion treatment with chromic acid or phosphoric acid or heat-treatment; a substrate subjected to electric corrosion preventing treatment (for example, galvanized steel plate); or the like.

Examples of the non-metallic inorganic substrate are, for instance, glass, pottery, porcelain, etc.

Components of glass are not particularly limited. Examples are silica glass, lead glass, alkali glass, non-alkali glass, etc.

Examples of the synthetic resin substrate are, for instance, an acrylic resin, polycarbonate, artificial marble, heat resistant engineering plastic, thermosetting resin, etc.

The above-mentioned substrate in the present invention may be in the form of sheet, film, tube, pipe, plate or bar or in the other irregular form. However it is preferable that the form of the substrate is the same as or similar to a form of a finished product from the viewpoint of processability.

The multi-functional composite material of the present invention obtained in the above-mentioned manner can be used as various multi-functional composite materials depending on applications and composite materials for specific products in various fields since it has not only water-repellency but also excellent stain-proofing property, non-sticking property, sliding property, weather resistance and heat resistance and further since fine particles of the fluorine-containing ethylenic polymer (A) having functional group are uniformly dispersed in the coating film comprising the matrix metal oxide (B) because of their excellent interfacial adhesion and the coating film has enough hardness, transparency and adhesive property. Explained hereinafter are embodiments of the multi-functional composite materials of the present invention, but the present invention is not limited to them.

EMBODIMENT 1

(Water-repellent composite material)

Cooking apparatuses and tablewares which are used in a watery place, for example, in a kitchen and get wet at the time of washing have been hitherto required to have water-repellency so as to be easily dried, namely use of water-repellent material has been required. Also in the field of automobiles, use of water-repellent material on a windshield and fender mirror of cars has been required in order to repel rain water and make field of view good in rainy days.

Most generally available water-repellent materials are fluorine-containing materials, particularly fluorine-containing resins which are actually used.

However the above-mentioned fluorine-containing resins have substantive problem that due to their excellent non-sticking property, adhesion to a substrate such as metal or glass is not sufficient.

In order to comply with such requirements, for a composite material used, for example, for cooking apparatuses, etc., a fluorine-containing polymer which is excellent in heat resistance, chemical resistance, corrosion resistance, weather resistance, surface properties (non-sticking property and low friction property) and electric insulating property has been used. Such a composite material is used on a heating surface of cooking apparatuses such as rice cooker or electric griddle. However the fluorine-containing polymer has insufficient adhesion to metal surface due to its excellent non-sticking property. Therefore it is necessary to (1) use an adhesive or (2) carry out, on a surface of a substrate, sand-blasting or etching by electrochemical method to make the surface rough for adhering by anchor effect.

However it is not possible to make the best use of transparency of a glass substrate and color tone such as metal gloss of a metal substrate and thus there is a problem with property for exhibiting clear surface pattern of a substrate since in the method using an adhesive like the method (1), no transparent adhesive having heat resistance and high adhesive property is available and also since in the method for making the substrate surface rough like the method (2), the substrate surface is made rough significantly. Further even if a transparent adhesive is developed, since a fluorine-containing polymer composing a coating film on a heating surface of cooking appliances, etc. is soft, the coating film on the heating surface is injured, for example, due to a long term use or by cleaning with a spatula or brush, and thus lowering transparency and making surface pattern of a substrate unclear. Also for example, due to abrasion of a windshield by a wiper, etc., inherent non-sticking property and water-repellency of a fluorine-containing polymer are lowered.

To solve those problems, there have been made attempts to endow the coating film comprising a fluorine-containing polymer with hardness by adding a glassy or aluminum-based inorganic filler. However there were problems that the coating film becomes fragile, transparency is lowered, surface pattern of a substrate becomes unclear and even water-repellency itself is lowered.

To cope with these problems, the proposals mentioned above have been made (in JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, JP-A-7-157335).

However as mentioned above, even by these conventional sol-gel methods, water-repellent coating films having excellent non-sticking property, abrasion resistance, heat resistance, oil-repellency and scratch resistance have not been obtained.

The water-repellent composite material obtained by applying the coating composition of the present invention to the substrate can be used on various articles, equipment, appliances, building materials, etc. firstly because excellent water-repellency can be maintained for a long period of time, secondly because fine particles of the fluorine-containing ethylenic polymer (A) having functional group are dispersed uniformly in the coating film comprising the metal oxide (B) because of their good interfacial adhesion and the coating film has enough hardness, transparency and adhesive property, and thirdly because the coating film comprising the fluorine-containing ethylenic polymer (A) having functional group and the metal oxide (B) has good heat resistance, abrasion resistance, scratch resistance, non-sticking property, water-repellency and anti-bacterial property.

The present invention can provide the water-repellent composite material comprising a substrate and, on a surface of the substrate, a coating film which comprises the metal oxide (B) and fine particles of the fluorine-containing ethylenic polymer (A) having functional group and prepared by copolymerizing:

(a) 0.05 to 50% by mole of at least one of fluorine-containing ethylenic monomers having at least one functional group selected from the group consisting of hydroxyl, carboxyl, a carboxylic salt group, a carboxylic ester group and epoxy, and (b) 50 to 99.95% by mole of a fluorine-containing ethylenic monomer having no functional group mentioned above; the fine particles of the polymer (A) is dispersed in the metal oxide (B) layer.

Also the present invention can provide the water-repellent, composite material, in which the above-mentioned fluorine-containing ethylenic monomer (a) having functional group is at least one of fluorine-containing ethylenic monomers having functional group and represented by the formula (1):

$$CX_2=CX^1-R_f-Y \qquad (1)$$

wherein Y is —$CH_2OH$, —COOH, a carboxylic salt group, a carboxylic ester group or epoxy, X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the water-repellent composite material, in which the above-mentioned fluorine-containing polymer (A) having functional group is the polymer (I).

Also the present invention can provide the water-repellent composite material, in which the above-mentioned fluorine-containing polymer (A) having functional group is the polymer (II).

Also the present invention can provide the water-repellent composite material, in which the above-mentioned fluorine-containing polymer (A) having functional group is the polymer (III).

Also the present invention can provide the water-repellent composite material, in which the above-mentioned metal oxide (B) is a silicon oxide.

Also the present invention can provide the water-repellent. composite material, in which the above-mentioned metal oxide (B) is an aluminum oxide.

Also the present invention can provide the water-repellent composite material, in which the above-mentioned metal oxide (B) is a titanium oxide.

Also the present invention can provide the water-repellent composite material, in which the above-mentioned substrate is a metallic substrate.

Also the present invention can provide the water-repellent composite material, in which the above-mentioned substrate is a non-metallic inorganic substrate.

Also the present invention can provide the water-repellent composite material, in which the above-mentioned substrate is a glass substrate.

Also the present invention can provide the water-repellent composite material, in which the above-mentioned substrate is a concrete substrate.

Also the present invention can provide the water-repellent composite material, in which the above-mentioned substrate is a cement substrate.

Also the present invention can provide the water-repellent composite material, in which the above-mentioned substrate is a tile substrate.

Also the present invention can provide the water-repellent composite material, in which the above-mentioned substrate is a ceramic substrate.

Also the present invention can provide the water-repellent composite material, in which the above-mentioned substrate is a synthetic resin substrate.

Also the present invention can provide glass for cars produced by using the water-repellent composite material.

In principle the above-mentioned descriptions regarding the coating composition, coating film and methods for production thereof are applied to the water-repellent composite material of the present invention. Explained below are particularly preferable embodiments thereof.

Examples of the substrate usually used for the water-repellent composite material of the present invention are metallic plates of aluminum, stainless steel, iron and titanium; metallic plates subjected to hot-dip zinc coating, aluminum plating, etc.; metallic plates subjected to chemical conversion treatment such as oxidation with chromic acid, phosphoric acid, etc.; alumite-treated metallic plates subjected to anodizing; and the like.

Examples of the non-metallic inorganic substrate used usually are glass substrates such as crystallized glass, foam glass, heat reflecting glass, heat absorbing glass and multi-layered glass; ceramic substrates such as tile, large size pottery plate, ceramic panel and brick; natural stones such as granite and marble; concrete substrates such as high strength concrete, glass fiber-reinforced concrete (GRC), carbon fiber-reinforced concrete (CFRC), lightweight aerated concrete (ALC) and composite ALC; cement substrates such as extrusion molded cement and composite molded cement; asbestos slate; enamelled steel plate; and the like.

Further examples of the synthetic resin substrate used are polycarbonate, polyester resin, acrylic resin, vinyl chloride resin, artificial marble (mainly comprising unsaturated polyester resin or acrylic resin), steel plates coated with vinyl chloride resin, acrylic resin or urethane resin, and the like.

Among them, where transparency is required, the non-metallic inorganic substrate of glass and the synthetic resin substrates of acrylic resin and polycarbonate, etc. are usually used.

A thickness of the metal oxide coating film of the above-mentioned water-repellent composite material varies depending on kind and portion of appliances and utensils to which the film is applied. The thickness is from 0.01 to 100 $\mu$m, preferably from 0.01 to 50 $\mu$m, particularly preferably from 0.02 to 20 $\mu$m.

Appliances, utensils, building materials and portions thereof where the water-repellent composite material of the present invention can be used suitably are raised and classified below by the fields applied, but are not limited to them.

[1] Cooking apparatuses and utensils (including tablewares)

Cooking apparatuses and utensils require particularly water-repellency. Raised below are non-restricted typical examples thereof.

① Pot (a) Inner surface, inner lid, etc. of electric pots including electric water heater In these applications, water-repellency, non-sticking property (stain-proofing property for fur), hot water resistance and anti-bacterial property of the water-repellent composite material of the present invention can be used particularly effectively.

(b) Inner surface of inner pot, inner lid, etc. of gas and electric rice cooker and rice cooker with rice washing mechanism, etc.

In these applications, water-repellency, non-sticking property (for rice and scorching), stain-proofing property and heat resistance of the water-repellent composite material of the present invention can be used particularly effectively. Further it is possible to inhibit lowering of the characteristics due to abrasion, scratch, etc. of the coating film when cleaning with brush, etc.

② Cooking apparatuses (a) Surfaces of frying pan, vat, household hand mixer for cooking, crate, kitchen knife, molder for bread, reverse sheet for bread, dough dividing and rounding machine for making bread, etc., inner surfaces of mixing bowl, rice chest, etc. and blade of the above-mentioned mixer In these applications, water-repellency, non-sticking property (scorching and cohering stains), stain-proofing property and heat resistance of the water-repellent composite material of the present invention can be used particularly effectively. Further it is possible to inhibit lowering of the characteristics due to abrasion, scratch, etc. of the coating film by metal spatula, etc.

(b) Inner surface, blade, etc. of electric food processors such as electric food crusher for domestic use, electric food crusher, electric meat grinder for kitchen use, electric blender for kitchen use and electric mixer for kitchen use In these applications, water-repellency, non-sticking property (for vegetable and meat juice) and stain-proofing property of the water-repellent composite material of the present invention can be used particularly effectively.

③ Gas ovens with grill (a) Top plate, side plate and surface of gas heaters such as gas container built-in type gas oven, surface of drip pan cover thereof, etc.

In these applications, water-repellency, non-sticking property (for oil stains), heat resistance and transparency (property for exhibiting clear surface color and pattern) of the water-repellent composite material of the present invention can be used particularly effectively. Further it is possible to inhibit lowering of the characteristics due to abrasion, scratch, etc. of the coating film by cleaning with brush, etc.

④ Ranges with oven including toaster, range, etc.

(a) Inner surfaces (metallic portion) of ovens (range for kitchen use) such as oven for shop use, electric oven (including oven for shop use), electric oven with heating cabinet for shop use, cooking oven for shop use and cooking range for shop use; ovens for making bread such as baking oven for shop use and automatic baking appliance for domestic use; electric oven and toaster such as toaster and toaster for bread; microwave range such as microwave range for shop use and microwave range with oven; and pans for ranges In these applications, water-repellency, non-sticking property (for oil and scorching), stain-proofing property and heat resistance of the water-repellent composite material of the present invention can be used particularly effectively. Further it is possible to inhibit abrasion and scratch of the coating film by spatula, brush, etc.

(b) Inner surface of doors of ranges with oven raised in above (a)

In these applications, water-repellency, non-sticking property, heat resistance and transparency of the water-repellent composite material of the present invention can be used particularly effectively. In case of a microwave range, energy ray resistance can be used particularly effectively.

⑤ Pots and pans (a) Inner surface of pots and pans such as glass pot, enamel pot, aluminum pot, electric frying pot, electric Tempura pot, electric pressure pot and electric pressure pot for stew, etc.

In these applications, water-repellency, non-sticking property (for scorching, cohering stains and oil in case of the frying pot and Tempura pot) and heat resistance of the water-repellent composite material of the present invention can be used particularly effectively. Further it is possible to inhibit abrasion and scratch of the coating film by spatula, brush, etc.

(b) Lids of pots and pans raised in above (a)

In these applications, not only the characteristics in above (a) but also transparency of the water-repellent composite material of the present invention can be used particularly effectively.

⑥ Garbage disposer

Inner surface, etc. of garbage treating machines such as garbage disposer for domestic use and garbage (waste) disposer for making compost In these applications, water-repellency, non-sticking property and stain-proofing property of the water-repellent composite material of the present invention can be used particularly effectively.

⑦ Other heating apparatuses for cooking (a) Heating surface, lid, etc. of griddle In these applications, water-repellency, non-sticking property (for scorching and cohering stains) and heat resistance of the water-repellent composite material of the present invention and transparency in case of the lid can be used particularly effectively. Further it is possible to inhibit lowering of the characteristics and appearance due to abrasion and scratch of the coating film by metal spatula, etc.

(b) Cooking surface, etc. of electromagnetic cooking apparatuses such as electromagnetic range and oven In these applications, water-repellency, non-sticking property, heat resistance and transparency of the water-repellent composite material of the present invention can be used particularly effectively, and it is possible to inhibit abrasion and scratch of the coating film by brush, etc.

(c) Inner surface, door inside, lid, etc. of electric steamer such as food steamer for shop use In these applications, water-repellency, non-sticking property, stain-proofing property, heat resistance and steam resistance of the water-repellent composite material of the present invention can be used particularly effectively, and it is possible to inhibit abrasion and scratch of the coating film by brush, etc.

(d) Inner surface, lid, etc. of noodle boiler for shop use

In these applications, water-repellency, non-sticking property, stain-proofing property, heat resistance and hot water resistance of the water-repellent composite material of the present invention can be used particularly effectively, and it is possible to inhibit abrasion and scratch of the coating film by brush, etc.

(e) Inner surface, inner surface (metallic portion) and door inner surface of cooking roaster for shop use, pan for range, etc.

In these applications, water-repellency, non-sticking property (for scorching and cohering stains) and heat resistance of the water-repellent composite material of the present invention can be used particularly effectively, and it is possible to inhibit abrasion and scratch of the coating film by brush, etc.

(f) Inner surface, etc. of tableware and can washer for shop use

In these applications, water-repellency, non-sticking property, stain-proofing property and hot water resistance of the water-repellent composite material of the present invention can be used particularly effectively.

(g) Inner surface, door inner surface, etc. of heating cabinet for shop use

In these applications, water-repellency, non-sticking property, stain-proofing property, transparency and heat resistance of the water-repellent composite material of the present invention can be used particularly effectively.

Further examples of cooking apparatuses other than those mentioned above, to which the water-repellent composite material of the present invention can be preferably applied are as follows.

Examples of cooking apparatuses within the range of above ①

(b) are rice gruel cooker, rice warmer, etc.

Examples of cooking apparatuses within the range of above ② (a) are various cooking utensils (for slicing), cooking utensils, cooking appliance, cooking machine (for food, etc.), iron plate for cooking, cooking appliances and facilities, barbecue utensils, food processing machine (with press machine, etc.), chocolate manufacturing machine and ancillary temperature adjusting equipment thereof for starting material, etc.

Examples of cooking appliances within the range of above ②(b) are cooking appliance for mixing, vegetable slicer, food slicer, peeler, machine for cutting into cubes, food cutter, meat chopper, meat slicer, meat tenderizer, cutter mixer, mixer, food mixer, blender, apple processor, continuous egg opening machine, soy bean curd cutter, food molder, bread crumb coating machine, vegetable washer, etc.

Examples of cooking apparatuses within the range of above ③ are range, portable heater, electric range, gas range, gas oven with grill, electric oven with grill, etc.

Examples of cooking apparatuses within the range of above ④ are gas salamander, electric salamander, convention oven, baking oven for making bread, etc.

Examples of cooking apparatuses within the range of above ⑤ are wok set for Chinese dishes, one-handed pot, double-handed pot, gas fryer, Tempura fryer, oil filter unit, buckwheat pot, rotary pot, etc.

Examples of cooking apparatuses within the range of above ⑦ are fryer for dumpling stuffed with minced meat, electromagnetic range, gas steamer, electric steamer, etc.

[2] Building material

Building materials also require water-repellency. Mentioned below are examples of building materials and effects exhibited in addition to water-repellency.

① Building glass

Building glass, polished flat glass for building (window glass), window of stained glass, windshield glass, light shielding ratio adjustable glass, etc.

In these applications, transparency, scatter preventing property, stain-proofing property and flame retardancy of the water-repellent composite material of the present invention can be exhibited particularly effectively.

② Outer wall material, roofing material and interior and exterior material (made of metal)
  (a) Exterior metallic building material for wall, metallic building material, interior and exterior metallic panel for building, metallic fence, metallic tile, metallic panel for building, etc.
  (b) Metallic roofing material, solar system built-in roofing material, etc.
  (c) Metallic door, metallic grating, metallic shutter, metallic fence, metallic porch (for building), etc.
  (d) Metallic blind (for outdoor use), gutter, sash, rain door, etc.
  (e) Metallic ceiling panel, metallic floor tile, metallic wall panel coated with decorative vinyl chloride sheet, etc.
  (f) Metallic parking facilities for cars, metallic object of art, etc.

In these applications, weather resistance, stain-proofing property and transparency (property for exhibiting clear surface pattern) of the water-repellent composite material of the present invention can be used particularly effectively.

③ Outer wall material, roofing material and interior and exterior material (non-metallic inorganic material)
  (a) Segmental concrete block or concrete block bonded with a tile or sliced natural stone, segmental concrete road pavement board or concrete road pavement board having a surface of rubber material, concrete board which may be reinforced with GRC (fiber-reinforced concrete) wall material
  (b) Extrusion-molded cement such as cement having tile-like surface
  (c) Building stone such as artificial stone
  (d) Building tile, luster-finished tile, floor tile, ceramic tile and border tile made of pottery
  (e) Exterior materials for building and for wall such as non-metallic exterior material for building, building material, building panel and wall tile for building
  (f) Roofing material such as solar system built-in roofing material made of ceramic
  (g) Gravestone and grave-post
  (h) Small sculpture, standing sculpture, image, bust and other object of art made of stone, concrete or marble In these applications, weather resistance, stain-proofing property, water-proof property, transparency (property for exhibiting clear surface pattern), processability and adhesive property of the water-repellent composite material of the present invention, abrasion resistance thereof in case of above (c) and weathering preventing property thereof in cases of (g) and (h) can be used particularly effectively.

④ Outer wall material, roofing material and interior and exterior material (resinous)
  (a) Floor panel, ceiling panel, etc.
  (b) Grating, gutter, blind and door including those for indoor use, etc.
  (c) Plastic panel for concrete
  (d) Gasket for building
  (e) Curtain, cover and sunshield with an insect-proofing, ultraviolet ray and heat shielding and scatter preventing film
  (f) Flooring material made of stone or flooring material made of polyvinyl chloride and having a surface of stone pattern
  (g) Solar system built-in plastic roofing material
  (h) Sectional polyvinyl chloride tile having clearance and being capable of draining water
  (i) Synthetic resin sash
  (j) Decorative board for counter, furniture, sill, wall panel, bucksplash, baseboard, walls of bathroom and shower room, etc.
  (k) Prefabricated assembly set for washstand, shower room, lavatory, transferable toilet, public toilet, etc.
  (l) Prefabricated assembly set for sauna room, garage, etc.

In these applications, weather resistance, stain-proofing property, transparency (property for exhibiting clear surface pattern), water resistance, processability and adhesive property of the water-repellent composite material of the present invention can be used particularly effectively.

⑤ Outer wall material and roofing material (made of wood)
  (a) Timber for household utensils, wooden board and decorative board for building such as veneer and wooden panel, etc.
  (b) Wooden fence, interior door and window frame, etc.
  (c) Wooden panel for building produced by adhering elastic rubber material on the back of plywood
  (d) Wooden assembly set for building In these applications, weather resistance, stain-proofing property, transparency (property for exhibiting clear surface pattern), water resistance, processability and adhesive property of the water-repellent composite material of the present invention can be used particularly effectively.

⑥ Furniture
  (a) Glass showcase, wagon, display wagon, display panel, display stand, meal conveying wagon, flower stand, etc.
  (b) Shelf, screen, desk, sofa, shelf for chest of drawers, etc.
  (c) Telephone booth made of metal or various materials In these applications, stain-proofing property, transparency (property for exhibiting clear surface pattern), water resistance and processability of the water-repellent composite material of the present invention and further property for preventing paper from being pasted, adhesive property and abrasion resistance thereof in case of above (c) can be used particularly effectively.

⑦ Apparatuses for household and shop uses
(a) Gas oven with grill, range hood, ventilation hood, etc.
(b) Metallic duct for central heating, ventilator, air conditioner, etc.

In these applications, stain-proofing property, processability and adhesive property of the water-repellent composite material of the present invention can be used particularly effectively.

⑧ Housing apparatuses and facilities
(a) Coordinated kitchen units including range for kitchen (oven), sink, etc.
(b) Electrically heated, gas heated and oil heated water heaters (including instantaneous water heater)
(c) Wall-mounted washbasin, washstand, hair washing appliance for domestic use, washstand with hair washing function, washbasin for washstand, washbasin with cover, bow window type washstand, etc.
(d) Flush toilet stool, small size chamber pot for car, urinal, toilet stool with urinalyzer, toilet stool for little children, toilet stool with hot water washing function, toilet seat with deodorizing unit and water tank for flush toilet In these applications, stain-proofing property, property for exhibiting clear surface pattern (transparency), processability, abrasion resistance and anti-bacterial property of the water-repellent composite material of the present invention can be used particularly effectively.

(e) Lining for bathrooms including shower room, sauna bath for domestic and shop uses, bath tubs such as prefabricated bath tub and bath tub with bubble generator and bath utensils such as handle mounted on bath tub and soap holder
(f) Escalator, elevator (including those for private houses), etc.

In these applications, stain-proofing property, property for exhibiting clear surface pattern (transparency) and processability of the water-repellent composite material of the present invention and further heat resistance thereof in case of above (a), (b) and (e), abrasion resistance thereof in case of above (c) to (e) and sliding property and corrosion resistance thereof in case of above (f) can be used particularly effectively.

⑨ Construction
(a) Sign for bus stop, sign for street, sign mounted on guardrail, etc.
(b) Signals such as luminous signal and mechanical signal
(c) Guardrail produced by using various materials
(d) Utility pole produced by using various materials
(e) Sound-proof wall
(f) Plastic molding panel for concrete for building and construction In these applications, weather resistance, stain-proofing property, transparency, processability and adhesive property of the water-repellent composite material of the present invention and further mold-release property thereof in case of above (f) can be used particularly effectively.

[3] Cars

There are many parts of car which require water-repellency against rain water and water used for washing. Exemplified below are parts for car which require water-repellency, and other characteristics to be exhibited in addition to water repellency are also referred to. The present invention also relates to these parts and cars.

① Glass for car
Application: Windshield glass, window glass, glass for sunroof, glass with heating coil, etc.
Substrate: Glass and polycarbonate
Fluorine-containing polymer having functional group: I, II, III
Applying method: Coating In these applications, transparency, stain-proofing property, resistance to abrasion and scratch by a wiper, etc. and weather resistance of the water-repellent composite material of the present invention can be used particularly effectively.

② Mirror for car
Application: Rearview mirror, room mirror, door mirror, etc.
Substrate: Mirror and glass
Fluorine-containing polymer having functional group: I, II, III
Applying method: Coating In these applications, transparency, stain-proofing property, scratch resistance, etc. of the water-repellent composite material of the present invention can be used particularly effectively.

③ Car body
Application: Side body, hood, roof plate, fender, spoiler, bumper, etc.
Substrate: Steel sheet, surfaces coated with acrylic resin, etc., polypropylene (PP), urethane, and polyester
Fluorine-containing polymer having functional group: I, II, III
Applying method: Coating In these applications, transparency, stain-proofing property, abrasion resistance, scratch resistance, etc. of the water-repellent composite material of the present invention can be used particularly effectively.

④ Light and cover for light
Application: Cover, lamp, etc. for headlight, turn signal, brake light, taillight, fog lamp and backup light
Substrate: Glass and polycarbonate
Fluorine-containing polymer having functional group: I, II, III
Applying method: Coating In these applications, transparency, stain-proofing property, scratch resistance, etc. of the water-repellent composite material of the present invention can be used particularly effectively.

[4] Others
① Glass for train
Application: Outer surface of window glass
Substrate: Glass
Fluorine-containing polymer having functional group: I, II, III
Applying method: Coating In these applications, transparency, stain-proofing property, etc. of the water-repellent composite material of the present invention can be used particularly effectively.

② Insulator and pantograph
Application: Surface
Substrate: Pottery
Fluorine-containing polymer having functional group: I, II, III Applying method: Coating In these applications, water repellency, stain-proofing property, scratch resistance, insulating property, etc. of the water-repellent composite material of the present invention can be used particularly effectively.

③ Bulb, bulb cover material (particularly for exterior use)

Application: Bulb surface, cover surface and shade surface

Substrate: Glass, PP and polycarbonate

Fluorine-containing polymer having functional group: I, II, III

Applying method: Coating

In these applications, water-repellency, stain-proofing property, scratch resistance, insulating property, etc. of the water-repellent composite material of the present invention can be used particularly effectively.

Among the water-repellent composite materials, by applying the coating composition particularly to glass, a water-repellent glass having high hardness and transparency can be obtained. Water-repellent glass which is produced by applying, to glass, the water-repellent coating composition of the present invention comprising the water-repellent fine particles of the fluorine-containing polymer (A) having functional group and the metal oxide (B) and has a coating film containing the dispersed water-repellent fine particles therein, is excellent particularly in transparency and abrasion resistance. For example, when the water-repellent glass is used as a windshield glass for car, its water-repellency is hardly lowered even due to abrasion by a wiper.

In the water-repellent coating composition used for producing water-repellent glass of the present invention, for example, it is preferable that the fluorine-containing polymer (A) comprises the above-mentioned water-repellent fine particles having water repellency, namely fine particles selected from above (I), (II) and (III), that the metal oxide (B) comprises mainly a silica sol prepared by hydrolyzing and poly-condensating a silane compound such as alkoxysilane and as the case demands, contains an oxide of Al, Zr, Ti, or the like and that the solvent (C) is selected from alcohols and water.

The water-repellent glass of the present invention can be produced by preparing, by the above-mentioned preparation process, the composition comprising mainly water-repellent fine particles of the fluorine-containing polymer (A) having functional group and the silica sol, applying the composition to the glass and then baking the coated glass.

Glass used as a substrate can be selected from silicate glass such as silica glass, alkaline silicate glass, alkaline lead glass, soda-lime glass, potash lime glass or barium glass, boro-silicate glass containing $B_2O_3$ and $SiO_2$, phosphate glass containing $P_2O_5$, etc.

Also the glass used may be colored glass, tempered glass, laminated glass or glass for mirror. Though enough adhesion of the water-repellent coating film even to the smooth surface of glass is obtained, in order to enhance adhesion of the water-repellent coating film, it is possible to carry out hydrofluoric acid treatment or plasma etching so as to make the glass surface finely rough.

The water-repellent coating film of water-repellent glass of the present invention is, for example, a coating film which comprises the water-repellent fine particles of the fluorine-containing polymer (A) having functional group and silica ($SiO_2$) and contains the water-repellent fine particles of the fluorine-containing polymer (A) having functional group in dispersed state.

Based on the whole coating film, a content of the fluorine-containing polymer (A) having functional group in the water-repellent coating film is from 5 to 85% by weight, preferably from 10 to 80% by weight and a content of silica is from 15 to 95% by weight, preferably from 20 to 90% by weight.

A thickness of the above-mentioned water-repellent coating film varies depending on purposes and applications and is from 0.01 to 2 μm, preferably from 0.02 to 1 μm, particularly preferably from 0.1 to 1 μm.

EMBODIMENT 2

(stain-proofing composite material)

Lowering of original functions and appearances occurs in building materials, for example, exterior materials such as outer wall and roof, interior materials such as inner wall, ceiling and floor, etc. due to adhesion of dust, smoke and soot thereon; in cooking appliances for processing and heating of foods or tablewares due to adhesion of edible oil thereon; in office apparatuses using toner and represented by an electrostatic process copying machine due to adhesion of toner and fingerprint thereon; and further in domestic electric appliances such as ventilation fan due to adhesion of dust, nicotine and oil thereon. Therefore it is required that stain-proofing material is applied to these portions where the mentioned adhesion possibly occurs.

In order to comply with such requirement, for example, with respect to building materials such as building glass, various inner and exterior wall materials, roofing materials and interior and outer materials and construction-related materials such as sign, signal, guardrail, utility pole and sound-proof wall, since they are used exposed to environment, the surfaces thereof are required to have weather resistance, stain-proofing property against dust, exhaust gas and rain water, transparency and property for exhibiting clear surface pattern. Also various furnitures, kitchen apparatuses such as gas oven with grill and range hood, and housing facilities such as coordinated kitchen units, washstand, lavatory and bath room are required to have heat resistance, and non-sticking property and stain-proofing property against oil, scorch and fur. In Embodiment 2, all the mentioned products are referred to as "building material". The substrates of these building materials are made of glass, metal, ceramic, synthetic resin, concrete, or the like. Some of them are not subjected to any treatment on their surfaces, but to cope with the mentioned requirement, to composite materials used for these building materials is applied a fluorine-containing polymer having excellent heat resistance, chemical resistance, corrosion resistance, weather resistance, surface characteristics (non-sticking property, low friction property, etc.), electric insulating property, etc. However since the fluorine-containing polymer has not enough adhesion to a surface of substrate such as metal due to its excellent non-sticking property, it is necessary to (1) use an adhesive or (2) carry out, on a surface of a substrate, sand blasting or etching by electrochemical method to make the surface rough for adhering by an anchor.

However it is not possible to make the best use of transparency of a glass substrate and color tone such as metal gloss of a metal substrate and thus there is a problem with property for exhibiting clear surface pattern, since in the method of using an adhesive in above (1), no transparent adhesive having heat resistance and high adhesive property is available and also since in the method of roughening the surface of substrate in above (2), the surface is significantly roughened. Further even if a transparent adhesive is developed, since a fluorine-containing polymer composing the coating film on the surface of the building material is in general soft, the surface of the coating film is injured, for example, during a long term use or by cleaning with a brush, etc. to lower transparency and property for exhibiting clear surface pattern and also inherent weather resistance, stain-proofing property, water-repellency and non-sticking property of the fluorine-containing polymer are lowered due to abrasion of the film. Further since the polymer is soft, when the coating film is applied to an exterior building material, foreign matters, dusts and stains easily enter the coating film and therefore there is a case where stains are difficult to be removed.

To solve that, an attempt to endow the coating film comprising the fluorine-containing polymer with hardness by adding a glassy or aluminum-based inorganic filler has been made, but there was a problem that the coating film becomes fragile and transparency and property for exhibiting clear surface pattern are lowered.

Also various studies for giving water-repellency to glass have been made for the purpose to repel rain water on a window glass or fender mirror of car in rainy days and make field of view good. It is considered that the results of such studies are used in the fields requiring stain-proofing property.

In this regard, there are proposals as cited above (JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, and JP-A-7-157335).

However as mentioned above, even by these conventional sol-gel methods, a stain-proofing coating film having excellent transparency, abrasion resistance, heat resistance, oil- and water-repellency and scratch resistance has not been obtained.

The stain-proofing composite material obtained by applying the coating composition of the present invention to a substrate can be used for various apparatuses, utensils and building materials firstly because excellent stain-proofing property can be maintained for a long period of time, secondly because the fine particles of the fluorine-containing ethylenic polymer (A) having functional group are uniformly dispersed in the coating film comprising the metal oxide (B) due to their good interfacial adhesion and the coating film has enough hardness, transparency and adhesive property, and thirdly because the coating film comprising the fluorine-containing ethylenic polymer (A) having functional group and metal oxide (B) has good heat resistance, weather resistance, abrasion resistance, scratch resistance, non-sticking property, water-repellency, anti-bacterial property, etc.

The present invention can provide the stain-proofing composite material comprising a substrate and, on a surface of the substrate, a coating film which comprises the metal oxide (B) and fine particles of the fluorine-containing ethylenic polymer (A) having functional group prepared by copolymerizing (a) 0.05 to 50% by mole of at least one of fluorine-containing ethylenic monomers having at least one functional group selected from hydroxyl, carboxyl, a carboxylic salt group, a carboxylic ester group and epoxy and (b) 50 to 99.95% by mole of at least one of fluorine-containing ethylenic monomers having no functional group mentioned above; the fine particles of the polymer (A) are dispersed in the metal oxide (B) layer.

Also the present invention can provide the above-mentioned stain-proofing composite material, in which the fluorine-containing ethylenic monomer (a) having functional group is at least one of fluorine-containing ethylenic monomers having functional group and represented by the formula (1):

$$CX_2=CX^1-R_f-Y \qquad (1)$$

wherein Y is —$CH_2OH$, —COOH, a carboxylic salt group, a carboxylic ester group or epoxy, X and $X^1$ are the same or different and each is hydrogen atom or fluorine atom, $R_f$ is a divalent fluorine-containing alkylene group having 1 to 40 carbon atoms, a fluorine-containing oxyalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the above-mentioned stain-proofing composite material, in which the fluorine-containing ethylenic polymer (A) having functional group is the above-mentioned polymer (I).

Also the present invention can provide the above-mentioned stain-proofing composite material, in which the fluorine-containing ethylenic polymer (A) having functional group is the above-mentioned polymer (II).

Also the present invention can provide the above-mentioned stain-proofing composite material, in which the fluorine-containing ethylenic polymer (A) having functional group is the above-mentioned polymer (III).

Also the present invention can provide the above-mentioned stain-proofing composite material, in which the metal oxide (B) is a silicon oxide.

Also the present invention can provide the above-mentioned stain-proofing composite material, in which the metal oxide (B) is an aluminum oxide.

Also the present invention can provide the above-mentioned stain-proofing composite material, in which the metal oxide (B) is a titanium oxide.

Also the present invention can provide the above-mentioned stain-proofing composite material, in which the substrate is a metallic substrate.

Also the present invention can provide the above-mentioned stain-proofing composite material, in which the substrate is a non-metallic inorganic substrate.

Also the present invention can provide the above-mentioned stain-proofing composite material, in which the non-metallic inorganic substrate is a glass, concrete, cement, tile or pottery substrate.

Also the present invention can provide the above-mentioned stain-proofing composite material, in which the substrate is a synthetic resin substrate.

In principle the above-mentioned descriptions regarding the coating composition, coating film and methods for production thereof are applied to the stain-proofing composite material of the present invention. Explained below are particularly preferable embodiments thereof.

Examples of the substrate used usually for the stain-proofing composite material of the present invention are metallic plates of aluminum, stainless steel, iron and titanium; metallic plates subjected to hot-dip zinc plating, aluminum plating, etc.; metallic plates subjected to chemical conversion treatment such as oxidation with chromic acid, phosphoric acid, etc.; alumite-treated metallic plates subjected to anodizing; and the like.

Examples of the non-metallic inorganic substrate used usually are glass substrates such as crystallized glass, foamed glass, heat reflecting glass, heat absorbing glass and multi-layered glass; ceramic substrates such as tile, large size pottery plate, ceramic panel and brick; natural stones such as granite and marble; concrete substrates such as high strength concrete, glass fiber-reinforced concrete (GRC), carbon fiber-reinforced concrete (CFRC), lightweight aerated concrete (ALC) and composite ALC; cement substrates such as extrusion molded cement and composite molded cement; asbestos cement; enamelled steel plate; and the like.

Further examples of the synthetic resin substrate used are polycarbonate, polyester resin, acrylic resin, vinyl chloride resin, artificial marble (mainly comprising unsaturated polyester resin or acrylic resin), steel plates coated with vinyl chloride resin, acrylic resin or urethane resin, and the like.

Among them, where transparency is required, the non-metallic inorganic substrate of glass and the synthetic resin substrate of acrylic resin and polycarbonate are usually used.

A thickness of the metal oxide coating film of the above-mentioned stain-proofing composite material of the present invention varies depending on kind and portion of appliances and utensils to which the film is applied. The thickness is from 0.01 to 100 μm, preferably from 0.01 to 70 μm, particularly preferably from 0.02 to 50 μm.

Appliances, utensils, building materials and portions thereof where the stain-proofing composite material of the present invention can be used suitably are raised and classified below by the fields applied, but are not limited to them.

[1] Cooking apparatuses and utensils (including tablewares)

Cooking apparatuses and utensils require particularly stain-proofing property because in many cases sticky oil and foods are used. Raised below are non-restricted typical examples thereof.

① Pot (a) Inner surface, inner lid, etc. of electric pots including electric water heater In these applications, stain-proofing property (for fur), hot water resistance and anti-bacterial property of the stain-proofing composite material of the present invention can be used particularly effectively.

(b) Inner surface of inner pot, inner lid, etc. of gas and electric rice cookers and rice cooker with rice washing mechanism, etc.

In these applications, stain-proofing property (for rice and scorching) and heat resistance of the stain-proofing composite material of the present invention can be used particularly effectively. Further it is possible to inhibit lowering of the characteristics due to abrasion, scratch, etc. of the coating film by cleaning with brush, etc.

② Cooking apparatuses (a) Surfaces of frying pan, vat, household hand mixer for cooking, crate, kitchen knife, molder for bread, reverse sheet for bread, dough dividing and rounding machine for making bread, etc., inner surface of mixing bowl, rice chest, etc. and blade of the above-mentioned mixer In these applications, stain-proofing property (scorching and cohering stains) and heat resistance of the stain-proofing composite material of the present invention can be used particularly effectively. Further it is possible to inhibit lowering of the characteristics due to abrasion, scratch, etc. of the coating film by metal spatula, etc.

(b) Inner surface, blade, etc. of electric food processors such as electric food crusher for domestic use, electric food crusher, electric meat grinder for kitchen use, electric blender for kitchen use and electric mixer for kitchen use In these applications, stain-proofing property (for vegetable and meat juice) of the stain-proofing composite material of the present invention can be used particularly effectively.

③ Gas oven with grill (a) Surfaces of top plate, side plate and surface of gas ovens such as gas container built-in type oven, and drip pan cover thereof, etc.

In these applications, stain-proofing property (for oil stains), heat resistance and transparency (property for exhibiting clear color and pattern) of the stain-proofing composite material of the present invention can be used particularly effectively. Further it is possible to inhibit lowering of the characteristics due to abrasion, scratch, etc. of the coating film by cleaning with brush, etc.

④ Ranges with oven including toaster, range, etc.

(a) Inner surfaces (metallic portion) of ovens (range for kitchen use) such as oven for shop use, electric oven (including oven for shop use), electric oven with heating cabinet for shop use, cooking oven for shop use and cooking range for shop use; ovens for making bread such as baking oven for shop use and automatic baking apparatus for domestic use; electric oven and toaster such as toaster and toaster for bread; and microwave range such as microwave range for shop use and microwave range with oven; pans for ranges; and the like.

In these applications, stain-proofing property (for oil and scorching) and heat resistance of the stain-proofing composite material of the present invention can be used particularly effectively. Further it is possible to inhibit abrasion and scratch of the coating film by spatula, brush, etc.

(b) Inner surface of door of ranges with oven raised in above (a)

In these applications, stain-proofing property, heat resistance and transparency of the stain-proofing composite material of the present invention can be used particularly effectively. In case of microwave range, energy ray resistance can be used particularly effectively.

⑤ Pots and pans (a) Inner surface of pots and pans such as glass pot, enamel pot, aluminum pot, electric frying pot, electric Tempura pot, electric pressure pot and electric pressure pot for stew, etc.

In these applications, stain-proofing property (for scorching, cohering stains and oil in case of the frying pot and Tempura pot) and heat resistance of the stain-proofing composite material of the present invention can be used particularly effectively. Further it is possible to inhibit abrasion and scratch of the coating film by spatula, brush, etc.

(b) Lids of pots and pans raised in above (a)

In these applications, not only the characteristics in above (a) but also transparency of the stain-proofing composite material of the present invention can be used particularly effectively.

⑥ Garbage disposer

Inner surface, etc. of garbage treating machines such as garbage disposer for domestic use and garbage (waste) disposer for making compost In these applications, stain-proofing property of the water-repellent composite material of the present invention can be used particularly effectively.

⑦ Other heating apparatuses for cooking (a) Heating surface, lid, etc. of griddle In these applications, stain-proofing property (for scorching and cohering stains) and heat resistance of the stain-proofing composite material of the present invention and transparency thereof in case of the lid can be used particularly effectively. Further it is possible to inhibit lowering of the characteristics and appearance due to abrasion and scratch of the coating film by metal spatula, etc.

(b) Cooking surface, etc. of electromagnetic cooking apparatuses such as electromagnetic range and oven In these applications, stain-proofing property, heat resistance and transparency of the stain-proofing composite material of the present invention can be used particularly effectively, and it is possible to inhibit abrasion and scratch of the coating film by brush, etc.

(c) Inner surface, door inside, lid, etc. of electric steamer such as food steamer for shop use In these applications, stain-proofing property, heat resistance and steam resistance of the stain-proofing composite material of the present invention can be used particularly effectively, and it is possible to inhibit abrasion and scratch of the coating film by brush, etc.

(d) Inner surface, lid, etc. of noodle boiler for shop use

In these applications, stain-proofing property, heat resistance and hot water resistance of the stain-proofing composite material of the present invention can be used particularly effectively, and it is possible to inhibit abrasion and scratch of the coating film by brush, etc.

(e) Inner surface, inner surface (metallic portion) and door inner surface of cooking roaster for shop use, pan for range, etc.

In these applications, stain-proofing property (for scorching and cohering stains) and heat resistance of the stain-proofing composite material of the present invention can be used particularly effectively, and it is possible to inhibit abrasion and scratch of the coating film by brush, etc.

(f) Inner surface, etc. of tableware and can washer for shop use

In these applications, stain-proofing property and hot water resistance of the stain-proofing composite material of the present invention can be used particularly effectively.

(g) Inner surface, door inner surface, etc. of heating cabinet for shop use

In these applications, stain-proofing property, transparency and heat resistance of the stain-proofing composite material of the present invention can be used particularly effectively.

Further as the cooking apparatuses other than those mentioned above, to which the stain-proofing composite material of the present invention can be used preferably, there can be raised the same ones as exemplified in the above-mentioned Embodiment 1.

[2] Office automation-related apparatuses

In office automation-related apparatuses, in addition to parts where toner is used, there are many other portions which are apt to be easily damaged by stain attributable to tobacco smoke, foreign matter, fingerprint, dust, etc. Mentioned below are non-restricted typical examples thereof.

(1) Electrophotographic copying machine, facsimile machine, word processor, printer and other apparatuses with printing mechanism The stain-proofing composite material is suitable as a material used for parts where toner is used or toner possibly adheres. Examples of such parts are mentioned below.

① Fixing roll (a) For monochromatic printing

Substrate: Aluminum- or SUS-made substrate

When the stain-proofing composite material of the present invention comprising the above-mentioned substrate is used, a fixing roll having excellent stain-proofing property, durability and heat resistance can be obtained. Since the fluorine-containing polymer having functional group itself has excellent adhesive property, no primer need be provided, and processability in production is excellent.

(b) For both monochromatic printing and color printing

Substrate: Metallic substrate coated with silicon rubber or urethane rubber and further with silicon oil for mold releasing When the stain-proofing composite material of the present invention comprising the above-mentioned substrate is used, a fixing roll having excellent stain-proofing property, mold release property of paper and abrasion resistance can be obtained. Since the fluorine-containing polymer having functional group itself has excellent adhesive property, no primer need be provided, and processability in production is excellent.

② Press roll (for both color and monochromatic printing)

Substrate: Metallic substrate coated with silicon rubber or urethane rubber

When the stain-proofing composite material of the present invention comprising the above-mentioned substrate is used, a press roll having excellent stain-proofing property and abrasion resistance can be obtained. Since the fluorine-containing polymer having functional group itself has excellent adhesive property, no primer need be provided, and processability in production is excellent because of excellent adhesive property.

③ Charged roll (for both color and monochromatic printing)

Substrate: Urethane rubber-made substrate

When the stain-proofing composite material of the present invention comprising the above-mentioned substrate is used, a charged roll having excellent stain-proofing property, mold release property of paper and abrasion resistance can be obtained. Since the fluorine-containing polymer having functional group itself has excellent adhesive property, no primer need be provided, and processability in production is excellent.

④ Transfer roll (for both color and monochromatic printing)

Substrate: Urethane rubber-made substrate

When the stain-proofing composite material of the present invention comprising the above-mentioned substrate is used, a transfer roll having excellent stain-proofing property, mold release property of paper, abrasion resistance and elasticity can be obtained. Since the fluorine-containing polymer having functional group itself has excellent adhesive property, no primer need be provided, and processability in production is excellent.

⑤ Transfer belt (for both color and monochromatic printing)

Substrate: Polyimide-made substrate

When the stain-proofing composite material of the present invention comprising the above-mentioned substrate is used, a transfer belt having excellent stain-proofing property and abrasion resistance can be obtained. Since the fluorine-containing polymer having functional group itself has excellent adhesive property, no primer need be provided, and processability in production is excellent.

⑥ Separating claw and fixing bearing (surface)

Substrate: Heat resistant resin-made substrate (for example, polyphenylene sulfide (PPS), polyamideimide, polyether imide, polyoxymethylene (POM), polyether ether ketone (PEEK), or the like)

When the stain-proofing composite material of the present invention comprising the above-mentioned substrate is used, a separating claw having excellent stain-proofing property, abrasion resistance and paper feed property and hardly injuring a roll and a fixing bearing having low friction property and excellent abrasion resistance and heat resistance can be obtained. Since the fluorine-containing polymer having functional group itself has excellent adhesive property, no primer need be provided, and processability in production is excellent.

⑦ Paper delivery roll and paper delivery guide

Substrate: Resin-made substrate (for example, PPS, polyamideimide, polyether imide, POM, PEEK, or the like)

When the stain-proofing composite material of the present invention comprising the above-mentioned substrate is used, a paper delivery roll and paper delivery guide having excellent stain-proofing property and abrasion resistance can be obtained. Since the fluorine-containing polymer having functional group itself has excellent adhesive property, no primer need be provided, and processability in production is excellent.

Also the stain-proofing composite material of the present invention can be used on the following parts for office automation-related apparatuses particularly by making the use of its good transparency.

⑧ Cathode ray tube, liquid crystal panel and plasma display (front surface)

Substrate: Glass

Fluorine-containing polymer having functional group: I, II, III

Applying method: Coating

When this stain-proofing composite material is used, a cathode ray tube, liquid crystal panel and plasma display having excellent transparency and stain-proofing property against dust, fingerprint, etc. can be obtained. No primer need be provided, and processability in production is excellent.

⑨ Contact glass (surface)

Substrate: Glass

When the stain-proofing composite material of the present invention comprising the above-mentioned substrate is used, a contact glass having excellent transparency and stain-proofing property against dust, fingerprint, etc. and excellent stain-proofing property against ink eraser, marking ink, etc. can be obtained. Since the fluorine-containing polymer having functional group itself has excellent adhesive property, no primer need be provided, and processability in production is excellent.

[3] Building material

Some of building materials also require stain-proofing property. Mentioned below are examples of those building materials and effects exhibited in addition to stain-proofing property.

① Glass for building

Building glass, polished flat glass for building (window glass), window of stained glass, windshield glass, light shielding ratio adjustable glass, etc.

In these applications, transparency, non-sticking property and flame retardancy of the stain-proofing composite material of the present invention can be used particularly effectively.

② Outer wall material, roofing material and interior and exterior material (made of metal)

(a) Exterior metallic building material for wall, metallic building material, interior and exterior metallic panels for building, metallic fence, metallic tile, metallic building panel, etc.

(b) Metallic roofing material, solar system built-in roofing material, etc.

(c) Metallic door, metallic grating, metallic shutter, metallic fence, metallic porch (for building), etc.

(d) Metallic blind (for outdoor), gutter, sash, rain door, etc.

(e) Metallic ceiling panel, metallic floor tile, metallic wall panel coated with vinyl chloride decorative sheet, etc.

(f) Metallic parking facilities for cars, metallic object of art, etc.

In these applications, weather resistance, non-sticking property and transparency (property for exhibiting clear surface pattern) of the stain-proofing composite material of the present invention can be used particularly effectively.

③ Outer wall material, roofing material and interior and exterior material (non-metallic inorganic material)

(a) Segmental concrete block or concrete block bonded with a tile or sliced natural stone, segmental concrete road pavement board or concrete road pavement board having a surface of rubber material, concrete board which may be reinforced with GRC (fiber-reinforced concrete) wall material, etc.

(b) Extrusion-molded cement such as cement having tile-like surface (c) Building stone such as artificial stone (d) Tiles such as building tile, luster-finished tile, floor tile, ceramic tile and border tile made of pottery (e) Exterior material for building and for wall such as non-metallic exterior material for building, building material, building panel and wall tile for building (f) Roofing material such as solar system built-in roofing material made of ceramic (g) Gravestone and grave-post (h) Small sculpture, standing sculpture, image, bust and other object of art made of stone, concrete or marble In these applications, weather resistance, non-sticking property, water-proof property, transparency (property for exhibiting clear surface pattern), processability and adhesive property of the stain-proofing composite material of the present invention, abrasion resistance thereof in case of above (c) and weathering preventing property thereof in cases of (g) and (h) can be used particularly effectively.

④ Outer wall material, roofing material and interior and exterior material (made of resin)

(a) Floor panel, ceiling panel, etc.

(b) Grating, gutter, blind and door including those for indoor use, etc.

(c) Plastic molding panel for concrete (d) Gasket for building (e) Curtain, cover, sunshield, etc. with an insect-proof, ultraviolet ray and heat shielding and scatter preventing film (f) Flooring material made of stone or flooring material made of polyvinyl chloride and having a surface of stone pattern (g) Solar system built-in plastic roofing material (h) Sectional polyvinyl chloride tile having clearance and being capable of draining water (i) Synthetic resin sash (j) Decorative board for counter, furniture, sill, wall panel, bucksplash, baseboard, and walls of bathroom and shower room (k) Prefabricated assembly set for washstand, shower room, lavatory, transferable toilet, public toilet, etc.

(l) Prefabricated assembly set for sauna room, garage, etc.

In these applications, weather resistance, non-sticking property, transparency (property for exhibiting clear surface pattern), water resistance, processability and adhesive property of the stain-proofing composite material of the present invention can be used particularly effectively.

⑤ Outer wall material and roofing material (made of wood)
  (a) Timber for household utensils, wooden board and decorative board for building such as plywood and wooden panel, etc.
  (b) Wooden fence, interior door and window frame, etc.
  (c) Wooden panel for building produced by adhering elastic rubber material on the back of plywood
  (d) Wooden assembly set for building In these applications, weather resistance, non-sticking property, transparency (property for exhibiting clear surface pattern), water resistance, processability and adhesive property of the stain-proofing composite material of the present invention can be used particularly effectively.

⑥ Furniture
  (a) Glass showcase, wagon, display wagon, display panel, display stand, meal conveying wagon, flower stand, etc.
  (b) Shelf, screen, desk, sofa, shelf for chest of drawers, etc.
  (c) Telephone booth made of metal or various materials In these applications, non-sticking property, transparency (property for exhibiting clear surface pattern), water resistance and processability of the stain-proofing composite material of the present invention and further property for preventing paper from being pasted, adhesive property and abrasion resistance thereof in case of above (c) can be used particularly effectively.

⑦ Apparatuses for household and shop uses
  (a) Gas oven with grill, range hood, ventilation hood, etc.
  (b) Metallic duct for central heating, ventilator, air conditioner, etc.

In these applications, non-sticking property, processability and adhesive property of the stain-proofing composite material of the present invention can be used particularly effectively.

⑧ Housing apparatuses and facilities
  (a) Coordinated kitchen units including kitchen range (oven), sink, etc.
  (b) Electrically heated, gas heated and oil heated water heaters (including instantaneous water heater)
  (c) Wall-mounted washbasin, washstand, hair washing appliance for domestic use, washstand with hair washing function, washbasin for washstand, washbasin with cover, bow window type washstand, etc.
  (d) Flush toilet stool, small size chamber pot for car, urinal, toilet stool with urinalyzer, toilet stool for little children, toilet stool with hot water washing function, toilet seat with deodorizing unit and water tank for flush toilet In these applications, non-sticking property, property for exhibiting clear surface pattern (transparency), processability, abrasion resistance and anti-bacterial property of the stain-proofing composite material of the present invention can be used particularly effectively.

(e) Lining for bathrooms including shower room, sauna bath for domestic and shop uses, bath tubs such as prefabricated bath tub and bath tub with bubble generator and bath utensils such as handle mounted on bath tub and soap holder
  (f) Escalator, elevator (including those for private houses), etc.

In these applications, non-sticking property, property for exhibiting clear surface pattern (transparency) and processability of the stain-proofing composite material of the present invention, heat resistance thereof in cases of above (a), (b) and (e), abrasion resistance thereof in cases of above (c) to (e) and sliding property and corrosion resistance thereof in case of above (f) can be used particularly effectively.

⑨ Construction
  (a) Sign for bus stop, sign for street, sign mounted on guardrail, etc.
  (b) Signals such as luminous signal and mechanical signal
  (c) Guardrail produced by using various materials
  (d) Utility pole produced by using various materials
  (e) Sound-proof wall
  (f) Plastic molding panel for concrete for building and construction, etc.

In these applications, weather resistance, non-sticking property, transparency, processability and adhesive property of the stain-proofing composite material of the present invention and further mold-release property thereof in case of above (f) can be used particularly effectively.

[4] Car-related articles (including motorbike)

Stains on exterior members of car such as body and window glass due to foreign matters in the air, mud, dusts, oil, etc. can be prevented. Also with respect to interior of car, there are the same effects as in the above-mentioned housing facilities. In addition, the same effects are obtained with respect to parts such as wheel, mirror and light.

① Body of car
Application: Surface of body, bumper, spoiler
Substrate: Acrylic resin-coated surface, steel sheet, PP, urethane resin, polyester
Fluorine-containing polymer having functional group: I, II, III
Applying method: Coating
Effect: Stain-proofing property against dusts and soots, transparency, property for exhibiting clear surface pattern and scratch resistance ② Window of car
Application: Windshield glass, side window glass, rearview glass, window glass for train
Substrate: Glass
Fluorine-containing polymer having functional group: I, II, III
Applying method: Coating
Effect: Stain-proofing property against dusts, soots and finger-print, water-repellency, transparency, abrasion resistance for wiper ③ Light (headlight, taillight, turn signal, etc.)
Application: Cover surface and bulb surface
Substrate: Polycarbonate, glass
Fluorine-containing polymer having functional group: I, II, III
Applying method: Coating
Effect: Stain-proofing property against dusts and soots, water-repellency, transparency, scratch resistance ④ Interior material of car
Application: Dashboard, front panel, rear panel, trunk room
Substrate: Urethane resin, PP
Fluorine-containing polymer having functional group: I, II, III Applying method: Coating
Effect: Stain-proof property against nicotine, dusts and finger-print, transparency, property for exhibiting clear surface pattern ⑤ Mirrors
Application: Fender mirrors, rearview mirror
Substrate: Glass
Fluorine-containing polymer having functional group: I, II, III
Applying method: Coating
Effect: Stain-proofing property against dusts and soots, water-repellency, transparency ⑥ Wheel
Application: Surface
Substrate: Aluminum, cast iron, PP, ABS, PA, PC, PPE, alloys
Fluorine-containing polymer having functional group: I, II, III
Applying method: Coating
Effect: Stain-proofing property against dusts and mud, scratch resistance against stone, etc., transparency, property for exhibiting clear surface pattern

[5] Domestic electric appliances

The stain-proofing composite material of the present invention can be used on not only the above-mentioned electric apparatuses for kitchen use but also parts of various electric appliances where stains become a problem. Typical examples thereof are mentioned below.

① Air conditioner (including cooling and heating)
Application: Louver of indoor unit, exterior of outdoor unit, aluminum fin, propeller
Substrate: PP, aluminum, galvanized steel sheet, galvanized steel plate
Fluorine-containing polymer having functional group: I, II, III
Applying method: Coating
Effect: Stain-proofing property and removing property against dusts, soots and nicotine, transparency, property for exhibiting clear surface pattern, processability ② Ventilation fan
Application: Fan, frame, cover
Substrate: PP, aluminum, galvanized steel sheet, galvanized steel plate
Fluorine-containing polymer having functional group: I, II, III
Applying method: Coating
Effect: Stain-proofing property against oil and cohering stain, transparency, property for exhibiting clear surface pattern, abrasion resistance and scratch resistance for use of brush, etc. for cleaning ③ Electric bulb (or shade thereof)
Application: Surfaces of bulb, cover and shade
Substrate: Glass, PP
Fluorine-containing polymer having functional group: I, II, III
Applying method: Coating
Effect: Stain-proofing property against dusts and soots, transparency, scratch resistance ④ Refrigerator
Application: Inside and outside surfaces
Substrate: PP, aluminum, SUS, galvanized steel sheet, galvanized steel plate
Fluorine-containing polymer having functional group: I, II, III
Applying method: Coating
Effect: Stain-proofing property against food and seasoning, cohered stain removing property, transparency, property for exhibiting clear surface pattern, processability

[6] Others
① Insulator, pantograph
Application: Surface
Substrate: Ceramic
Fluorine-containing polymer having functional group: I, II, III
Applying method: Coating
Effect: Stain-proofing property against dusts and soots, scratch resistance, processability ② Bolt
Application: Surface
Substrate: Iron, SUS
Fluorine-containing polymer having functional group: I, II, III
Applying method: Coating
Effect: Stain-proofing property, rust-proof property, impact resistance, processability

EMBODIMENT 3

(Non-sticking composite material)

In cooking apparatuses for processing and heating foods and tablewares, office machines using toner such as an electrostatic process copying machine and domestic electric appliances such as a ventilation fan, when foods, toner, oil, etc. adhere to apparatuses, appliances and parts thereof, inherent functions and appearance thereof are lost. Therefore it is required that a non-sticking material is applied to parts where such adhesion possibly occurs.

As the non-sticking material, fluorine-containing materials, particularly fluorine-containing resins are generally known and actually used.

However the above-mentioned fluorine-containing resins have substantial problem that they do not have enough adhesion to a substrate of metal, glass, etc. because of their excellent non-sticking property.

To satisfy such requirement, a fluorine-containing polymer having excellent heat resistance, chemical resistance, corrosion resistance, weather resistance, surface characteristics (non-sticking property, low friction property, etc.), electric insulating property, etc. is used for a composite material used, for example, for cooking apparatuses, particularly heating surfaces of rice cooker, electric griddle, etc. However the fluorine-containing polymer do not have enough adhesion to a metal surface due to its excellent non-sticking property, and therefore it is necessary to (1) use an adhesive or (2) carry out sand blasting or electrochemical etching on a substrate surface to make the surface rough for adhering by anchor effect.

However it is not possible to make the best use of transparency of a glass substrate and color tone such as metal gloss of a metal substrate and thus there is a problem with property for exhibiting clear surface pattern, since in the method of using an adhesive in above (1), no transparent adhesive having excellent heat resistance and high adhesive property is available and since in the method of roughening the surface of substrate in above (2), the surface is significantly roughened. Further even if a transparent adhesive is developed, since a fluorine-containing polymer contained in the coating film on the heating surface is in general soft, the surface of the coating film is injured during a long term use or by cleaning with a spatula, brush, etc. to lower transparency and property for exhibiting clear surface pattern and also inherent non-sticking property and water-repellency of the fluorine-containing polymer are lowered due to abrasion of the film.

To solve that, an attempt to endow the coating film comprising the fluorine-containing polymer with hardness by adding an inorganic filler of glass or aluminum has been made, but there was a problem that the coating film became fragile, transparency was lowered and a surface pattern of a substrate became unclear.

Also various studies for giving water-repellency to glass have been made for the purpose to repel rain water on a window glass or fender mirror of car in rainy days and make field of view good. It is considered that the results of such studies are used in the fields requiring non-sticking property.

In this regard, there are proposals as cited above (JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, and JP-A-7-157335).

However as mentioned above, even by those conventional sol-gel methods, a non-sticking coating film having excellent transparency, abrasion resistance, heat resistance, water- and oil-repellency and scratch resistance has not been obtained.

The non-sticking composite material obtained by applying the coating composition of the present invention to a substrate can be used for various apparatuses, utensils and building materials firstly because excellent non-sticking property can be maintained for a long period of time, secondly because the fine particles of the fluorine-containing ethylenic polymer (A) having functional group are uniformly dispersed in a coating film comprising the metal oxide (B) due to their good interfacial adhesion and the coating film has enough hardness, transparency and adhesive property, and thirdly because the coating film comprising the fluorine-containing ethylenic polymer (A) having functional group and metal oxide (B) has good heat resistance, abrasion resistance, scratch resistance, stain-proofing property, water repellency, anti-bacterial property, etc.

The present invention can provide the non-sticking composite material comprising a substrate and, on a surface of the substrate, a coating film which comprises the metal oxide (B) and fine particles of the fluorine-containing ethylenic polymer (A) having functional group prepared by copolymerizing (a) 0.05 to 50% by mole of at least one of fluorine-containing ethylenic monomers having at least one functional group selected from hydroxyl, carboxyl, a carboxylic salt group, a carboxylic ester group and epoxy and (b) 50 to 99.95% by mole of at least one of fluorine-containing ethylenic monomers having no functional group mentioned above; the fme particles of the polymer (A) are contained in dispersed state in the metal oxide (B) layer.

Also the present invention can provide the above-mentioned non-sticking composite material, in which the fluorine-containing ethylenic monomer (a) having functional group is at least one of fluorine-containing ethylenic monomers having functional group and represented by the formula (1):

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the above-mentioned non-sticking composite material, in which the fluorine-containing ethylenic polymer (A) having functional group is the above-mentioned polymer (I).

Also the present invention can provide the above-mentioned non-sticking composite material, in which the fluorine-containing ethylenic polymer (A) having functional group is the above-mentioned polymer (II).

Also the present invention can provide the above-mentioned non-sticking composite material, in which the fluorine-containing ethylenic polymer (A) having functional group is the above-mentioned polymer (III).

Also the present invention can provide the above-mentioned non-sticking composite material, in which the metal oxide (B) is a silicon oxide.

Also the present invention can provide the above-mentioned non-sticking composite material, in which the metal oxide (B) is an aluminum oxide.

Also the present invention can provide the above-mentioned non-sticking composite material, in which the metal oxide (B) is a titanium oxide.

Also the present invention can provide the above-mentioned non-sticking composite material, in which the substrate is a metallic substrate.

Also the present invention can provide the above-mentioned non-sticking composite material, in which the substrate is a glass substrate.

Also the present invention can provide the above-mentioned non-sticking composite material, in which the substrate is a synthetic resin substrate.

Also the present invention can provide the above-mentioned non-sticking composite material, in which the substrate is a ceramic substrate.

In principle the above-mentioned descriptions regarding the coating composition, coating film and methods for production thereof are applied to the non-sticking composite material of the present invention. Explained below are particularly preferable embodiments thereof.

Examples of the substrate which can be used for the non-sticking composite material of the present invention are all the substrates mentioned above, and examples of the metallic substrate used particularly in many cases are, for instance, ① Cold rolled steel sheet
② Plated steel plates, for example, Zn-plated steel plate, Zn alloy-plated steel plate, Al-plated steel plate, Al alloy-plated steel plate, Cr-plated steel plate (TFS), Ni-plated steel plate, Cu-plated steel plate, galvanized steel plate, etc.
③ Aluminum plate
④ Titanium plate
⑤ Stainless steel plate, and the like.

In addition, where transparency is required, the ceramic substrate of glass and the synthetic resin substrate of acrylic resin and polycarbonate are usually used.

A thickness of the metal oxide coating film of the non-sticking composite material of the present invention varies depending on kind and portion of appliances and utensils to which the film is applied. The thickness is from 0.01 to 100 μm, preferably from 0.01 to 50 μm, particularly preferably from 0.02 to 20 μm.

Apparatuses, utensils, building materials and portions thereof where the non-sticking composite material of the present invention can be used are raised and classified below by the fields applied, but are not limited to them.

[1] Cooking apparatuses and utensils (including tablewares)

Cooking apparatuses and utensils require particularly non-sticking property because sticky oil and foods are used in many cases. Raised below are non-restricted typical examples thereof.

① Pot (a) Inner surface, inner lid, etc. of electric pots including electric water steamer In these applications, non-sticking property (stain-proofing property for fur), hot water resistance and antibacterial property of the non-sticking composite material of the present invention can be used particularly effectively.

(b) Inner surface of inner pot, inner lid, etc. of gas and electric rice cookers and rice cooker with rice washing mechanism, etc.

In these applications, non-sticking property (for rice and scorching), stain-proofing property and heat resistance of the non-sticking composite material of the present invention can be used particularly effectively. Further it is possible to inhibit lowering of the characteristics due to abrasion, scratch, etc. of the coating film by cleaning with brush, etc.

② Cooking apparatuses p1 (a) Surfaces of frying pan, vat, household hand mixer for cooking, crate, kitchen knife, molder for bread, reverse sheet for bread, dough dividing and rounding machine for making bread, etc., inner surface of mixing bowl, rice chest, etc. and blade of the above-mentioned mixer In these applications, non-sticking property (scorching and cohering stains), stain-proofing property and heat resistance of the non-sticking composite material of the present invention can be used particularly effectively. Further it is possible to inhibit lowering of the characteristics due to abrasion, scratch, etc. of the coating film by metal spatula, etc.

(b) Inner surface, blade, etc. of electric food processors such as electric food crusher for domestic use, electric food crusher, electric meat grinder for kitchen use, electric blender for kitchen use and electric mixer for kitchen use In these applications, non-sticking property (for vegetable and meat juice) and stain-proofing property of the non-sticking composite material of the present invention can be used particularly effectively.

③ Gas oven with grill (a) Top panel, side panel and surface of gas oven such as gas container built-in type oven, surface of drip pan cover thereof, etc.

In these applications, non-sticking property (for oil stains), heat resistance and transparency (property for exhibiting clear color and pattern) of the non-sticking composite material of the present invention can be used particularly effectively. Further it is possible to inhibit lowering of the characteristics due to abrasion, scratch, etc. of the coating film by cleaning with brush, etc.

④ Range with oven including toaster, range, etc.

(a) Inner surfaces (metallic portion) of ovens such as oven for shop use, electric oven (including oven for shop use), electric oven with heating cabinet for shop use, cooking oven for shop use and cooking range for shop use; ovens for making bread such as baking oven for shop use and automatic baking appliance for domestic use; electric oven and toaster such as toaster and toaster for bread; microwave range such as microwave range for shop use and microwave range with oven; pans for ranges; and the like.

In these applications, non-sticking property (for oil and scorching), stain-proofing property and heat resistance of the non-sticking composite material of the present invention can be used particularly effectively. Further it is possible to inhibit abrasion and scratch of the coating film by spatula, brush, etc.

(b) Inner surface of door of ranges with oven raised in above (a)

In these applications, non-sticking property, heat resistance and transparency of the non-sticking composite material of the present invention can be used particularly effectively. In case of microwave range, energy ray resistance can be used particularly effectively.

⑤ Pots and pans (a) Inner surface of pots and pans such as glass pot, enamel pot, aluminum pot, electric frying pot, electric Tempura pot, electric pressure pot and electric pressure pot for stew, etc.

In these applications, non-sticking property (for scorching, cohering stains and oil in case of the frying pot and Tempura pot) and heat resistance of the non-sticking composite material of the present invention can be used particularly effectively. Further it is possible to inhibit abrasion and scratch of the coating film by spatula, brush, etc.

(b) Lids of pots and pans raised in above (a)

In these applications, not only the characteristics in above (a) but also transparency of the non-sticking composite material of the present invention can be used particularly effectively.

⑥ Garbage disposer

Inner surface, etc. of garbage treating machines such as garbage disposer for domestic use and garbage (waste) disposer for making compost In these applications, non-sticking property and stain-proofing property of the non-sticking composite material of the present invention can be used particularly effectively.

⑦ Other heating apparatuses for cooking (a) Heating surface, cover, etc. of electric griddle In these applications, non-sticking property (for scorching and cohering stains) and heat resistance of the non-sticking composite material of the present invention and transparency thereof in case of the cover can be used particularly effectively. Further it is possible to inhibit lowering of the characteristics and appearance due to abrasion and scratch of the coating film by metal spatula, etc.

(b) Cooking surface, etc. of electromagnetic cooking apparatuses such as electromagnetic range and oven In these applications, non-sticking property, heat resistance and transparency of the non-sticking composite material of the present invention can be used particularly effectively, and it is possible to inhibit abrasion and scratch of the coating film by brush, etc.

(c) Inner surface, door inner surface, cover, etc. of electric steamer such as food steamer for shop use In these applications, non-sticking property, stain-proofing property, heat resistance and steam resistance of the non-sticking composite material of the present invention can be used particularly effectively, and it is possible to inhibit abrasion and scratch of the coating film by brush, etc.

(d) Inner surface, cover, etc. of noodle boiler for shop use

In these applications, non-sticking property, stain-proofing property, heat resistance and hot water resistance of the non-sticking composite material of the present invention can be used particularly effectively, and it is possible to inhibit abrasion and scratch of the coating film by brush, etc.

(e) Inner surface, inner surface (metallic portion) and door inner surface of cooking roaster for shop use, pan for range, etc.

In these applications, non-sticking property (for scorching and cohering stains) and heat resistance of the non-sticking composite material of the present invention can be used particularly effectively, and it is possible to inhibit abrasion and scratch of the coating film by brush, etc.

(f) Inner surface, etc. of tableware and can washer for shop use

In these applications, non-sticking property, stain-proofing property and hot water resistance of the non-sticking composite material of the present invention can be used particularly effectively.

(g) Inner surface, door inner surface, etc. of heating cabinet for shop use

In these applications, non-sticking property, stain-proofing property, transparency and heat resistance of the non-sticking composite material of the present invention can be used particularly effectively.

Further as the cooking apparatuses other than above, to which the non-sticking composite material of the present invention can be used preferably, there can be raised the same ones as exemplified in the above-mentioned Embodiment 1.

[2] Office automation-related appliances

In office automation-related appliances, in addition to parts where toner is used, there are many other portions which are apt to be easily damaged by particularly adhesion of dusts, etc. Mentioned below are non-restricted typical examples thereof.

(1) Electrophotographic copying machine, facsimile machine, word processor, and other apparatuses with printer mechanism The non-sticking composite material is suitable as a material used for parts, where toner is used or toner possibly adheres. Examples of such parts are mentioned below.

① Fixing roll (a) For monochromatic printing

When the non-sticking composite material of the present invention which comprises the metallic substrate such as aluminum and SUS and is in the form of roll is used, a fixing roll having excellent non-sticking property against toner and heat resistance can be obtained. Since the coating film of the present invention has excellent adhesive property, no primer need be provided, and processability in production is excellent. Further the coating film has high surface hardness and excellent durability such as abrasion resistance.

(b) For both monochromatic printing and color printing

Substrate: Metallic substrate coated with silicon rubber or urethane rubber and further with silicon oil for mold releasing Fluorine-containing polymer having functional group: I, II, III Applying method: Coating or in the form of tube or sheet When the non-sticking composite material of the present invention is used, a fixing roll having excellent non-sticking property against toner, mold release property of paper and abrasion resistance can be obtained. Since the coating film of the present invention has excellent adhesive property, no primer need be provided, and processability in production is excellent.

② Press roll (for both color and monochromatic printing)

Substrate: Metallic substrate coated with silicon rubber or urethane rubber

When the non-sticking composite material of the present invention comprising the above-mentioned substrate is used, a press roll having excellent non-sticking property against toner and abrasion resistance can be obtained. No primer need be provided for the coating film of the present invention, and processability in production is excellent because the coating film has good adhesive property.

③ Charged roll (for both color and monochromatic printing)

Substrate: Urethane rubber-made substrate

When the non-sticking composite material of the present invention comprising the above-mentioned substrate is used, a charged roll having excellent non-sticking property against toner, mold release property of paper and abrasion resistance can be obtained. Since the coating film of the present invention has excellent adhesive property, no primer need be provided, and processability in production is excellent.

④ Transfer roll (for both color and monochromatic printing)

Substrate: Urethane rubber-made substrate

When the non-sticking composite material of the present invention comprising the above-mentioned substrate is used, a transfer roll having excellent non-sticking property against toner, mold release property of paper and abrasion resistance can be obtained. Since the coating film of the present invention has excellent adhesive property, no primer need be provided, and processability in production is excellent.

⑤ Transfer belt (for both color and monochromatic printing)

Substrate: Polyimide-made substrate

When the non-sticking composite material of the present invention comprising the above-mentioned substrate is used, a transfer belt having excellent non-sticking property against toner and abrasion resistance can be obtained. Since the coating film of the present invention has excellent adhesive property, no primer need be provided, and processability in production is excellent.

⑥ Separating claw and fixing bearing (surface)

Substrate: Heat resistant resin-made substrate (for example, PPS, polyamideimide, polyether imide, POM, PEEK, or the like)

When the non-sticking composite material of the present invention comprising the above-mentioned substrate is used, a separating claw having excellent non-sticking property against toner, abrasion resistance and paper feed property and hardly injuring a roll and a fixing bearing having low friction property and excellent abrasion resistance and heat resistance can be obtained. Since the coating film of the present invention has excellent adhesive property, no primer need be provided, and processability in production is excellent.

⑦ Paper delivery roll and paper delivery guide

Substrate: Resin-made substrate (for example, PPS, polyamideimide, polyether imide, POM, PEEK, or the like)

When the non-sticking composite material of the present invention comprising the above-mentioned substrate is used, a paper delivery roll and paper delivery guide having excellent non-sticking property against toner and abrasion resistance can be obtained. Since the coating film of the present invention has excellent adhesive property, no primer need be provided, and processability in production is excellent.

Also the non-sticking composite material of the present invention can be used on the following parts for office automation-related apparatuses particularly by making the use of its good transparency.

⑧ Cathode ray tube, liquid crystal panel and plasma display (front surface)

When this non-sticking composite material is used, a cathode ray tube, liquid crystal panel and plasma display having excellent transparency, non-sticking property and stain-proofing property against dust, fingerprint, etc. can be obtained. No primer need be provided, and processability in production is excellent. Further the coating film has high surface hardness and excellent abrasion resistance and scratch resistance.

⑨ Contact glass (surface)

When the non-sticking composite material of the present invention is used, a contact glass having excellent transparency, non-sticking property and stain-proofing property against dust, fingerprint, etc., and excellent non-sticking property against ink eraser, marking ink, etc. can be obtained. Since the coating film of the present invention has excellent adhesive property, no primer need be provided, and processability in production is excellent. Further the coating film has high surface hardness and excellent abrasion resistance and scratch resistance.

[3] Building material

There are also some building materials which require non-sticking property. Mentioned below are examples of such building materials and effects exhibited in addition to non-sticking property.

① Glass for building

Building glass, polished flat glass for building (window glass), window of stained glass, windshield glass, light shielding ratio adjustable glass, etc.

In these applications, transparency, stain-proofing property and flame retardancy of the non-sticking composite material of the present invention can be particularly effectively exhibited.

② Outer wall material, roofing material and interior and exterior materials (made of metal)
  (a) Exterior metallic building material for wall, metallic building material, interior and exterior metallic panel for building, metallic fence, metallic tile, metallic building panel, etc.
  (b) Metallic roofing material, solar system built-in roofing material, etc.
  (c) Metallic door, metallic grating, metallic shutter, metallic fence, metallic porch (for building), etc.
  (d) Metallic blind (for outdoor use), gutter, sash, rain door, etc.
  (e) Metallic ceiling panel, metallic floor tile, metallic wall panel coated with decorative vinyl chloride sheet, etc.
  (f) Metallic parking facilities for cars, metallic object of art, etc.

In these applications, weather resistance, stain-proofing property and transparency (property for exhibiting clear surface pattern) of the non-sticking composite material of the present invention can be used particularly effectively.

③ Outer wall material, roofing material and interior and exterior materials (non-metallic inorganic material)
  (a) Segmental concrete block or concrete block bonded with a tile or sliced natural stone, segmental concrete road pavement board or concrete road pavement board having a surface of rubber material and concrete board which may be reinforced with GRC (fiber-reinforced concrete) wall material, etc.
  (b) Extrusion-molded cement such as cement having tile-like surface
  (c) Building stone such as artificial stone
  (d) Building tile, luster-finished tile, floor tile, ceramic tile and border tile made of pottery
  (e) Exterior material for building and for wall such as non-metallic exterior material for building, building material, building panel and wall tile for building
  (f) Roofing material such as solar system built-in roofing material made of ceramic
  (g) Gravestone and grave-post
  (h) Small sculpture, standing sculpture, image, bust and other object of art made of stone, concrete or marble In these applications, weather resistance, stain-proofing property, water-proofing property, transparency (property for exhibiting clear surface pattern), processability and adhesive property of the non-sticking composite material of the present invention, abrasion resistance thereof in case of above (c) and weathering preventing property thereof in cases of (g) and (h) can be used particularly effectively.

④ Outer wall material, roofing material and interior and exterior materials (made of resin)
  (a) Floor panel, ceiling panel, etc.
  (b) Grating, gutter, blind and door including those for indoor use, etc.
  (c) Plastic panel for concrete
  (d) Gasket for building
  (e) Curtain, cover, sunshield, etc. with an insect-proofing, ultraviolet ray and heat shielding and scatter preventing film
  (f) Flooring material made of stone or flooring material made of polyvinyl chloride and having a surface of stone pattern
  (g) Solar system built-in plastic roofing material
  (h) Sectional polyvinyl chloride tile having clearance and being capable of draining water
  (i) Synthetic resin sash
  (j) Decorative board for counter, furniture, sill, wall panel, bucksplash, baseboard, and wall of bathroom and shower room
  (k) Prefabricated assembly set for washstand, shower room, lavatory, transferable toilet, public toilet, etc.
  (l) Prefabricated assembly set for sauna room, garage, etc.

In these applications, weather resistance, stain-proofing property, transparency (property for exhibiting clear surface pattern), water resistance, processability and adhesive property of the non-sticking composite material of the present invention can be used particularly effectively.

⑤ Outer wall material and roofing material (made of wood)
  (a) Timber for household utensils, timber and decorative board for building such as veneer and wooden panel, etc.
  (b) Wooden fence, interior door and window frame, etc.
  (c) Wooden panel for building produced by adhering elastic rubber material on the back of plywood
  (d) Wooden assembly set for building In these applications, weather resistance, stain-proofing property, transparency (property for exhibiting clear surface pattern), water resistance, processability and adhesive property of the non-sticking composite material of the present invention can be used particularly effectively.

⑥ Furniture
  (a) Glass showcase, wagon, display wagon, display panel, display stand, meal conveying wagon, flower stand, etc.
  (b) Shelf, screen, desk, sofa, shelf for chest of drawers, etc.
  (c) Telephone booth made of metal or various materials In these applications, stain-proofing property, transparency (property for exhibiting clear surface pattern), water resistance and processability of the non-sticking composite material of the present invention and further property for preventing paper from being pasted, adhesive property and abrasion resistance thereof in case of above (c) can be used particularly effectively.

⑦ Apparatuses for household and shop uses
  (a) Gas oven with grill, range hood, ventilation hood, etc.
  (b) Metallic duct for central heating, ventilator, air conditioner, etc.

In these applications, stain-proofing property, processability and adhesive property of the non-sticking composite material of the present invention can be used particularly effectively.

⑧ Housing facilities and apparatuses
  (a) Coordinated kitchen units including kitchen range (oven), sink, etc.
  (b) Electrically heated, gas heated and oil heated water heaters (including instantaneous water heater)
  (c) Wall-mounted washbasin, washstand, hair washing appliance for domestic use, washstand with hair washing function, washbasin for washstand, washbasin with cover, bow window type washstand, etc.
  (d) Flush toilet stool, small size chamber pot for car, urinal, toilet stool with urinalyzer, toilet stool for little children, toilet stool with hot water washing function, toilet seat with deodorizing unit and water tank for flush toilet In these applications, stain-proofing property, property for exhibiting clear surface pattern (transparency), processability, abrasion resistance and anti-bacterial property of the non-sticking composite material of the present invention can be used particularly effectively.

(e) Lining for bathrooms including shower room, sauna bath for domestic and shop uses, bath tubs such as prefabricated bath tub, bath tub with bubble generator and bath utensils such as handle mounted on bath tub and soap holder
  (f) Escalator, elevator (including those for private houses), etc.

In these applications, stain-proofing property, property for exhibiting clear surface pattern (transparency) and processability of the non-sticking composite material of the present invention, heat resistance thereof in cases of above (a), (b) and (e), abrasion resistance thereof in cases of above (c) to (e) and sliding property and rust preventing property thereof in case of above (f) can be used particularly effectively.

⑨ Construction
  (a) Sign for bus stop, sign for street, sign mounted on guardrail, etc.
  (b) Signals such as luminous signal and mechanical signal
  (c) Guardrail produced by using various materials
  (d) Utility pole produced by using various materials
  (e) Sound-proof wall
  (f) Plastic molding panel for concrete for building and construction, etc.

In these applications, weather resistance, stain-proofing property, transparency, processability and adhesive property of the non-sticking composite material of the present invention and further mold-release property thereof in case of above (f) can be used particularly effectively.

[4] Household electric appliances (excluding cooking apparatuses)

In household electric appliances excluding cooking apparatuses, there are many parts thereof which require non-sticking property against dusts, oil, etc. Typical examples thereof are mentioned below.

① Ventilation fan (fan, frame, cover, etc.)
  Substrate: Resin (PP, etc.), aluminum, galvanized steel sheet, galvanized steel plate, etc.

When the non-sticking composite material of the present invention comprising the above-mentioned substrate is used, excellent non-sticking property and removing property against oil stain, cohering stain, etc. can be effectively utilized. Particularly the coating film is excellent in transparency and property for exhibiting clear surface pattern, and abrasion and scratching resulting from cleaning with a brush, etc. can be inhibited.

② Air conditioner (louver and filter of indoor unit, exterior, louver and propeller of outdoor unit, etc.)
  Substrate: Resin (PP, etc.), aluminum, galvanized steel sheet, galvanized steel plate When the non-sticking composite material of the present invention comprising the above-mentioned substrate is used, excellent non-sticking property and removing property against stains such as dusts, soots and nicotine can be effectively utilized. Particularly transparency, property for exhibiting clear surface pattern and processability can be improved.

③ Refrigerator (inside and outside surfaces)
  Substrate: Resin (PP), aluminum, SUS, galvanized steel, sheet, galvanized steel plate, etc.

When the non-sticking composite material of the present invention comprising the above-mentioned substrate is used, excellent non-sticking property and removing property against foods, seasoning, cohering stains, etc. can be effectively utilized. Particularly transparency, property for exhibiting clear surface pattern and processability can be improved.

EMBODIMENT 4

(Weather resistant composite material)

With respect to building materials such as building glass, various interior and exterior wall materials, roofing materials and interior and exterior materials and construction-related materials such as sign, signal, guardrail, utility pole and sound-proof wall, since they are used exposed to environment, the surfaces thereof have been required to have weather resistance particularly and, stain-proofing property against dust, exhaust gas and rain water, transparency and property for exhibiting clear surface pattern. The substrates for these building materials are made of glass, metal, ceramic, synthetic resin or concrete. Some of them are not subjected to any treatment on their surfaces, but to cope with the mentioned requirement, to a surface of the composite materials used for these building materials is applied a fluorine-containing polymer having excellent weather resistance, heat resistance, chemical resistance, corrosion resistance, surface characteristics (non-sticking property, low friction property, etc.), electric insulating property, etc. However since the fluorine-containing polymer has not enough adhesion to a surface of substrate such as metal due to its excellent non-sticking property, it is necessary to (1) use an adhesive or (2) to carry out, on a surface of the substrate, sand-blasting or electrochemical etching to make the surface rough for adhering by anchor effect.

However it is not possible to make the best use of transparency of a glass material and color tone such as metal gloss of a metallic substrate, and thus there is a problem with property for exhibiting clear surface pattern, since in the method of using an adhesive in above (1), no transparent adhesive having high adhesion and heat resistance is not available and also since in the method of roughening the surface of substrate in above (2), the surface is significantly roughened. Further even if a transparent adhesive is developed, since a fluorine-containing polymer contained in the coating film on the surface of the building material is in general soft, when it is applied to an exterior building material, etc., foreign matters, dusts and stains easily enter the coating film and therefore cause staining easily. Also the stains are difficult to be removed, and thus transparency is lowered and surface pattern of a substrate becomes unclear.

To solve that, an attempt to endow the coating film comprising the fluorine-containing polymer with hardness by adding a glassy or aluminum-based inorganic filler has been made, but there was a problem that the coating film became fragile, transparency was lowered and surface pattern of a substrate became unclear.

Also various studies for giving water-repellency to glass have been made for the purpose to repel rain water on a window glass or fender mirror of car and make field of view good in rainy days. It is considered that the results of such studies are used in the fields requiring weather resistance.

In this regard, there are proposals as cited above (JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, and JP-A-7-157335).

However as mentioned above, even by those conventional sol-gel methods, a weather resistant coating film having excellent transparency, abrasion resistance, heat resistance, water- and oil-repellency and scratch resistance has not been obtained.

The weather resistant composite material obtained by applying the coating composition of the present invention to a substrate can be used for various appliances, utensils and building materials firstly because excellent weather resistance can be maintained for a long period of time, secondly because the fine particles of the fluorine-containing ethylenic polymer (A) having functional group are uniformly dispersed in the coating film comprising the metal oxide (B) due to their good interfacial adhesion and the coating film has enough hardness, transparency and adhesive property, and thirdly because the coating film comprising the fluorine-containing ethylenic polymer (A) having functional group and metal oxide (B) has good heat resistance, abrasion resistance, scratch resistance, stain-proofing property, water-repellency, anti-bacterial property, etc.

The present invention can provide the weather resistant composite material comprising a substrate and, on a surface of the substrate, a coating film which comprises fine particles of the fluorine-containing ethylenic polymer (A) having functional group prepared by copolymerizing (a) 0.05 to 50% by mole of at least one of fluorine-containing ethylenic monomers having at least one functional group selected from hydroxyl, carboxyl, a carboxylic salt group, a carboxylic ester group and epoxy and (b) 50 to 99.95% by mole of at least one of fluorine-containing ethylenic monomers having no functional group mentioned above and the metal oxide (B); the fine particles of the polymer (A) are contained in dispersed state in the metal oxide (B) layer.

Also the present invention can provide the above-mentioned weather resistant composite material, in which the fluorine-containing ethylenic monomer (a) having functional group is at least one of fluorine-containing ethylenic monomers having functional group and represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the above-mentioned weather resistant composite material, in which the fluorine-containing ethylenic polymer (A) having functional group is the above-mentioned polymer (I).

Also the present invention can provide the above-mentioned weather resistant composite material, in which the fluorine-containing ethylenic polymer (A) having functional group is the above-mentioned polymer (II).

Also the present invention can provide the above-mentioned weather resistant composite material, in which the fluorine-containing ethylenic polymer (A) having functional group is the above-mentioned polymer (III).

Also the present invention can provide the above-mentioned weather resistant composite material, in which the metal oxide (B) is a silicon oxide.

Also the present invention can provide the above-mentioned weather resistant composite material, in which the metal oxide (B) is an aluminum oxide.

Also the present invention can provide the above-mentioned weather resistant composite material, in which the metal oxide (B) is a titanium oxide.

Also the present invention can provide the above-mentioned weather resistant composite material, in which the substrate is a metallic substrate.

Also the present invention can provide the above-mentioned weather resistant composite material, in which the substrate is a non-metallic inorganic substrate.

Also the present invention can provide the above-mentioned weather resistant composite material, in which the substrate is a glass substrate.

Also the present invention can provide the above-mentioned weather resistant composite material, in which the substrate is a concrete substrate.

Also the present invention can provide the above-mentioned weather resistant composite material, in which the substrate is a cement substrate.

Also the present invention can provide the above-mentioned weather resistant composite material, in which the substrate is a tile substrate.

Also the present invention can provide the above-mentioned weather resistant composite material, in which the substrate is a ceramic substrate.

Also the present invention can provide the above-mentioned weather resistant composite material, in which the substrate is a synthetic resin substrate.

In principle the above-mentioned descriptions regarding the coating composition, coating film and methods for production thereof are applied to the weather resistant composite material of the present invention. Explained below are particularly preferable embodiments thereof.

Examples of the substrate usually used for the weather resistant composite material of the present invention are metallic plates of aluminum, stainless steel, iron and titanium; metallic plates subjected to hot-dip zinc plating, aluminum plating, etc.; metallic plates subjected to chemical conversion treatment such as oxidation with chromic acid, phosphoric acid, etc.; alumite-treated metallic plates subjected to anodizing; and the like.

Examples of the non-metallic inorganic substrate used usually are glass substrates such as crystallized glass, foam glass, heat reflecting glass, heat absorbing glass and multi-layered glass; ceramic substrates such as tile, large size pottery board, ceramic panel and brick; natural stones such as granite and marble; concrete substrates such as high strength concrete, glass fiber-reinforced concrete (GRC), carbon fiber-reinforced concrete (CFRC), lightweight aerated concrete (ALC) and composite ALC; cement substrates such as extrusion molded cement and composite molded cement; asbestos slate; enamelled steel plate; and the like.

Further examples of the synthetic resin substrate used are polycarbonate, polyester resin, acrylic resin, vinyl chloride resin, artificial marble (mainly comprising unsaturated polyester resin or acrylic resin), steel plates coated with vinyl chloride resin, acrylic resin or urethane resin, and the like.

Among them, where transparency is required, the non-metallic inorganic substrate of glass and the synthetic resin substrate of acrylic resin and polycarbonate are usually used.

A thickness of the metal oxide coating film of the above-mentioned weather resistant composite material of the present invention varies depending on kind and portion of appliances and utensils to which the film is applied. The thickness is from 0.01 to 100 $\mu$m, preferably from 0.1 to 70 $\mu$m, particularly preferably from 1 to 50 $\mu$m.

Appliances, utensils, building materials and portions thereof where the weather resistant composite material of the present invention can be used are raised and classified below by the fields applied, but are not limited to them.

[1] Building material

Building materials are exposed to the sun and weather, and therefore many of them require weather resistance. Mentioned below are examples of building materials and effects exhibited in addition to weather resistance.

① Glass for building

Building glass, polished flat glass for building (window glass), window of stained glass, windshield glass, light shielding ratio adjustable glass, etc.

In these applications, transparency, stain-proofing property and flame retardancy of the weather resistant composite material of the present invention can be used particularly effectively.

② Outer wall material, roofing material and exterior materials (made of metal)
   (a) Exterior metallic building material for wall, metallic building material, exterior metal panel for building, metallic fence, metallic tile, metallic building panel, etc.
   (b) Metallic roofing material, solar system built-in roofing material, etc.
   (c) Metallic door, metallic grating, metallic shutter, metallic fence, metallic porch (for building), etc.
   (d) Metallic blind (for outdoor use), gutter, sash, rain door, etc.
   (e) Metallic ceiling panel, metallic floor tile, metallic wall panel coated with decorative vinyl chloride sheet, etc.
   (f) Metallic parking facilities for cars, metallic object of art, etc.

In these applications, non-sticking property, stain-proofing property and transparency (property for exhibiting clear surface pattern) of the weather resistant composite material of the present invention can be used particularly effectively.

③ Outer wall material, roofing material and exterior material (non-metallic inorganic material)
   (a) Segmental concrete block or concrete block bonded with a tile or sliced natural stone, segmental concrete road pavement board and concrete road pavement board having a surface of rubber material and concrete board which may be reinforced with GRC (fiber-reinforced concrete) wall material, etc.
   (b) Extrusion-molded cement such as cement having tile-like surface
   (c) Building stone such as artificial stone
   (d) Building tile, luster-finished tile, floor tile, ceramic tile and border tile made of pottery
   (e) Non-metallic exterior material for building and for wall such as exterior material for building, building material, building panel and wall tile for building
   (f) Roofing material such as solar system built-in roofing material made of ceramic
   (g) Gravestone and grave post
   (h) Small sculpture, standing sculpture, image, bust and other object of art made of stone, concrete or marble In these applications, non-sticking property, stain-proofing property, water-proofing property, transparency (property for exhibiting clear surface pattern), processability and adhesive property of the weather resistant composite material of the present invention, abrasion resistance thereof in case of above (c) and weathering preventing property thereof in cases of (g) and (h) can be used particularly effectively.

④ Outer wall material, roofing material and exterior material (made of resin)
   (a) Floor panel, ceiling panel, etc.
   (b) Grating, gutter, blind and door including those for indoor use, etc.
   (c) Plastic panel for concrete
   (d) Gasket for building
   (e) Curtain, cover, sunshield, etc. with an insect-proofing, ultraviolet ray and heat shielding and scatter preventing film
   (f) Flooring material made of stone or flooring material made of polyvinyl chloride and having a surface of stone pattern
   (g) Solar system built-in plastic roofing material
   (h) Sectional polyvinyl chloride tile having clearance and being capable of draining water
   (i) Synthetic resin sash In these applications, non-sticking property, stain-proofing property, transparency (property for exhibiting clear surface pattern), water resistance, processability and adhesive property of the weather resistant composite material of the present invention can be used particularly effectively.

⑤ Outer wall material and roofing material (made of wood)

(a) Timber for household utensils, timber and decorative board for building such as veneer and wooden panel, etc.
(b) Wooden fence, interior door and window frame, etc.
(c) Wooden material for building produced by adhering elastic rubber material on the back of plywood
(d) Wooden assembly set for building In these applications, non-sticking property, stain-proofing property, transparency (property for exhibiting clear surface pattern), water resistance, processability and adhesive property of the weather resistant composite material of the present invention can be used particularly effectively.

⑥ Construction
(a) Sign for bus stop, sign for street, sign mounted on guardrail, etc.
(b) Signals such as luminous signal and mechanical signal
(c) Guardrail produced by using various materials
(d) Utility pole produced by using various materials
(e) Sound-proof wall
(f) Plastic molding pane for concrete for building and construction, etc.

In these applications, weather resistance, stain-proofing property, transparency, processability and adhesive property of the weather resistant composite material of the present invention and further mold-release property thereof in case of above (f) can be used particularly effectively.

[2] Solar battery

In the field of solar batteries, since they are used continuously being exposed to the sun and weather, both the whole solar battery module and parts thereof require weather resistance. Mentioned below are examples of the parts of solar batteries to which the weather resistant composite material of the present invention can be applied, and effects exhibited in addition to weather resistance.

① Cover for solar battery
Application: Outermost surface
Substrate: Amorphous silicon, monocrystal, polycrystal silicon, filler layer (EVA, glass, etc.)
Fluorine-containing polymer having functional group: I, II, III
Applying method: Coating
Effect: Transparency, weather resistance, stain-proofing property, flame retardancy

[3] Car

With respect to car-related parts, too, since exterior materials such as body and glass are exposed to the sun and weather like the building materials, weather resistance is required for them. Mentioned below are examples of car-related applications and effects exhibited in addition to weather resistance.

① Car and train
Application: Body
Substrate: Coated surfaces of steel plate, other metal, acrylic resin, etc.
Fluorine-containing polymer having functional group: I, II, III
Applying method: Coating or in the form of film
Effect: Processability, transparency, property for exhibiting clear surface pattern, stain-proofing property, stain removing property ② Glass for car and train
Application: Window, windshield, rear glass, side window
Substrate: Glass
Fluorine-containing polymer having functional group: I, II, II
Applying method: Coating or in the form of film
Effect: Transparency, processability, stain-proofing property, stain removing property, water-repellency, scatter preventing property ③ Lights (headlight, taillight, turn signal)
Application: Surface of cover, bulb surface
Substrate: Glass, polycarbonate
Fluorine-containing polymer having functional group: I, II, III
Applying method: Coating or in the form of film
Effect: Weather resistance, stain-proofing property, processability, water-repellency, ④ Wheel
Application: Surface
Substrate: Aluminum, cast iron, resin (PP, ABS, PC, PPE, alloys)
Fluorine-containing polymer having functional group: I, II, III
Applying method: Coating
Effect: Weather resistance, stain-proofing property, transparency, property for exhibiting clear surface pattern, processability

[4] Others
① Insulators and pantograph
Application: Surface
Substrate: Ceramic
Fluorine-containing polymer having functional group: I, I, III
Applying method: Coating
Effect: Processability, weather resistance, stain-proofing property

EMBODIMENT 5

(Composite Material Having Sliding Property)

In the field of domestic appliances, since, for example, a flat iron is used with its heating surface being pressed and slided on clothes, so-called sliding properties such as low friction property and abrasion resistance are required and it has been desired to use materials having excellent sliding properties for such applications.

To satisfy such requirement, for example, a fluorine-containing polymer having excellent sliding properties such as low friction property, heat resistance, chemical resistance, corrosion resistance, weather resistance, non-sticking property, electric insulating property, etc. has been applied to a heating surface of a flat iron, etc. However the fluorine-containing polymer has insufficient adhesion to a metal surface due to its excellent non-sticking property. Therefore it is necessary to (1) use an adhesive or (2) carry out sand-blasting or etching by electrochemical method on a surface of a substrate to make the surface rough for adhering by anchor effect.

However it is not possible to make the best use of transparency of a glass substrate and color tone of a metallic substrate and thus there is a problem with property for exhibiting clear surface pattern, since in the method using an adhesive like the method (1), no transparent adhesive having heat resistance and high adhesive property is available, and also since in the method for making the substrate surface rough like the method (2), the substrate surface is made rough significantly. Further even if a transparent adhesive is developed, since a fluorine-containing polymer composing a coating film on a sliding surface is soft, for example, due to friction and abrasion during long term use, the coating film on a sliding surface is injured and thus transparency is lowered and a surface pattern of a substrate becomes unclear, or due to abrasion, inherent sliding properties (low friction property), non-sticking property and water-repellency of a fluorine-containing polymer are lowered.

To prevent them, there have been made trials to endow the coating film comprising a fluorine-containing polymer with hardness by adding a glassy or aluminum-based inorganic filler. However there were problems that the coating film became fragile, transparency was lowered and a surface pattern of a substrate became unclear.

Also for the purpose to repel rain water attached to a window glass and fender mirror of a car in rainy days and make field of view clear, various studies have been made to give water-repellency to glass, and it has been considered to use the results thereof in the fields requiring sliding properties (low friction property).

Accordingly, the above-mentioned proposals have been made (in JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, JP-A-7-157335).

However as mentioned above, even by these conventional sol-gel methods, coating films having excellent transparency, heat resistance, water- and oil-repellency, scratch resistance and sliding properties such as low friction property and abrasion resistance have not been obtained.

The composite material having sliding property which is obtained by applying the coating composition of the present invention to the substrate can be used on various appliances, utensils, etc. firstly because excellent sliding property can be maintained for a long period of time, secondly because fine particles of the fluorine-containing ethylenic polymer (A) having functional group are dispersed uniformly because of their good interfacial adhesion in the coating film comprising the metal oxide (B) and the coating film has enough hardness, transparency and adhesive property, and thirdly because the coating film comprising the fluorine-containing ethylenic polymer (A) having functional group and the metal oxide (B) has good heat resistance, scratch resistance, stain-proofing property, water-repellency and anti-bacterial property.

The present invention can provide a composite material having sliding property produced by applying, on a surface of the substrate, a coating film which comprises the metal oxide (B) and the fine particles of the fluorine-containing ethylenic polymer (A) having functional group prepared by copolymerizing:

(a) 0.05 to 50% by mole of at least one of fluorine-containing ethylenic monomers having at least one functional group selected from the group consisting of hydroxyl, carboxyl, a carboxylic salt group, a carboxylic ester group and epoxy, and (b) 50 to 99.95% by mole of a fluorine-containing ethylenic monomer having no functional group mentioned above; the fine particles of the polymer (A) are contained in dispersed state in the metal oxide (B) layer.

Also the present invention can provide a composite material having sliding property, in which the above-mentioned fluorine-containing ethylenic monomer (a) having functional group is at least one of fluorine-containing ethylenic monomers having functional group and represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the composite material having sliding property, in which the above-mentioned fluorine-containing polymer (A) having functional group is the polymer (I).

Also the present invention can provide the composite material having sliding property, in which the above-mentioned fluorine-containing polymer (A) having functional group is the polymer (II).

Also the present invention can provide the composite material having sliding property, in which the above-mentioned metal oxide (B) is a silicon oxide.

Also the present invention can provide the composite material having sliding property, in which the above-mentioned metal oxide (B) is an aluminum oxide.

Also the present invention can provide the composite material having sliding property, in which the above-mentioned metal oxide (B) is a titanium oxide.

Also the present invention can provide the composite material having sliding property, in which the above-mentioned substrate is a metallic substrate.

Also the present invention can provide the composite material having sliding property, in which the above-mentioned substrate is a glass substrate.

Also the present invention can provide the composite material having sliding property, in which the above-mentioned substrate is a synthetic resin substrate.

Also the present invention can provide the composite material having sliding property, in which the above-mentioned substrate is a ceramic substrate.

In principle the above-mentioned descriptions regarding the coating composition, coating film and methods for production thereof are applied to the composite material having sliding property of the present invention. Explained below are particularly preferable embodiments thereof.

As the substrate for the composite material having sliding property of the present invention, all the substrates mentioned above can be used. Examples of the substrate used particularly widely as a metallic substrate are, for instance, ① cold rolled steel sheet,
② plated steel sheet, for example, Zn-plated steel sheet, Zn alloy-plated steel sheet, Al-plated steel sheet, Al alloy-plated steel sheet, Cr-plated steel sheet (TFS), Ni-plated steel sheet, Cu-plated steel sheet, galvanized steel sheet, etc.,
③ aluminum sheet,
④ titanium sheet,
⑤ stainless steel sheet, and the like.

In addition, where transparency is required, the ceramic substrate of glass and the resin substrate of acrylic resin and polycarbonate are usually used.

A thickness of the metal oxide coating film of the composite material having sliding property of the present invention varies depending on kind and portion of appliances and utensils to which the film is applied. The thickness is from 0.01 to 100 μm, preferably from 0.01 to 50 μm, particularly preferably from 0.02 to 20 μm.

Mentioned below are non-restricted examples of appliances, utensils and parts thereof, to which the composite material having sliding property of the present invention can be suitably used. Those appliances, utensils and parts thereof are classified by fields they belong to.

[1] Office automation-related apparatuses

In office automation-related apparatuses, there are many parts such as parts contacting feeding paper, which are desired to have excellent sliding properties such as abrasion resistance and low friction property. Mentioned below are non-restricted examples thereof and effects exhibited in addition to the sliding property.

② Electrophotographic copying machine, facsimile machine

The composite material having sliding property is suitable as a material used for parts for feeding paper. Examples of such parts are mentioned below.

(a) Separating claw and fixing bearing (surface)

Substrate: Heat resistant resin-made substrate (for example, PPS, polyamideimide, polyether imide, POM, PEEK, or the like)

Fluorine-containing polymer having functional group: I, II

Applying method: Coating

When this composite material having sliding property is used, a separating claw having excellent non-sticking property against toner, abrasion resistance and paper feed property and hardly injuring a roll and a fixing bearing having low friction property and excellent abrasion resistance and heat resistance can be obtained. Since the fluorine-containing polymer having functional group has excellent adhesive property, no primer need be provided, and processability in production is excellent.

(b) Paper delivery roll and paper delivery guide

Substrate: Resin-made substrate (for example, polyether sulfide, polyamideimide, polyether imide, POM, PEEK, or the like)

Fluorine-containing polymer having functional group: I, II

Applying method: Coating

When the composite material having sliding property of the present invention is used, a paper delivery roll and paper delivery guide having excellent non-sticking property for toner and abrasion resistance can be obtained. Since the fluorine-containing polymer having functional group has excellent adhesive property, no primer need be provided, and processability in production is excellent.

[2] Domestic electric appliances

With respect to domestic electric appliances, there are many parts thereof which are desired to have sliding properties including abrasion resistance, etc. Mentioned below are examples of the domestic appliance and effects exhibited in addition to the sliding properties. Accordingly the present invention also relates to these parts and domestic electric appliances.

① Flat iron

Application: Heating surface

Substrate: SUS, steel plate

Fluorine-containing polymer having functional group: I, II

Applying method: Coating

In these applications, heat resistance, processability and property for exhibiting clear surface pattern which the composite material having sliding property of the present invention possesses can be used particularly effectively.

[3] Housing facilities and equipment

In the housing facilities and equipment, too, since easy handling when used is desired, there are many parts which are required to have sliding properties including abrasion resistance and low friction property. Mentioned below are examples of the housing facilities and equipment and parts thereof and also effects exhibited in addition to the sliding properties. Accordingly the present invention also relates to these housing facilities and equipment and parts thereof.

① Escalator

Application: Surface of skirt (prevention from being caught into a machine)

Substrate: SUS, steel plate

Fluorine-containing polymer having functional group: I, II

Applying method: Coating

In these applications, processability, property for exhibiting clear surface pattern and weather resistance which the composite material having sliding property of the present invention possesses can be used particularly effectively.

[4] Cars

In engines and gears of cars, there are many parts which are required to have sliding properties, heat resistance and chemical resistance.

① Rotary engine

Application: Inner wall

Substrate: Aluminum, steel plate

Fluorine-containing polymer having functional group: I, II

Applying method: Coating

In these applications, processability, heat resistance, non-sticking property and stain-proofing property which the composite material having sliding property of the present invention possesses can be used particularly effectively.

② Piston, piston ring

Application: Surface

Substrate: Aluminum, steel plate

Fluorine-containing polymer having functional group: I, II

Applying method: Coating

In these applications, processability and heat resistance which the composite material having sliding property of the present invention possesses can be used particularly effectively.

③ Throttle shaft

Application: Surface

Substrate: Aluminum, iron-based metal

Fluorine-containing polymer having functional group: I, II

Applying method: Coating

In these applications, processability and heat resistance which the composite material having sliding property of the present invention possesses can be used particularly effectively.

In addition, the composite material having sliding property of the present invention can give sliding property on steering, hinge pin, gears, brake shoe, bearing retainer, etc. when applied to the surfaces thereof in the form of coating.

[5] Others

① Bolts and nuts

Application: Surface

Substrate: Iron

Fluorine-containing polymer having functional group: I, II

Applying method: Coating

In these applications, processability, rust-proofing property, chemical resistance and workability at low torque which the composite material having sliding property of the present invention possesses can be used particularly effectively.

②  Cutlery such as scissors, saw and knife

Application: Surface of edge

Substrate: Iron

Fluorine-containing polymer having functional group: I, II

Applying method: Coating

In these applications, non-sticking property, stain-proofing property, processability and cutting capability at low load which the composite material having sliding property of the present invention possesses can be used particularly effectively.

③  Parts for pump

Application: Inner surface and outer surface of plunger, gear surface

Substrate: Aluminum, iron

Fluorine-containing polymer having functional group: I, II

Applying method: Coating, film

In these applications, chemical resistance, processability and abrasion resistance which the composite material having sliding property of the present invention possesses can be used particularly effectively.

④  Parts for air conditioner (car air conditioner, room air conditioner, etc.)

Application: Piston ring, tip seal

Substrate: Aluminum, iron

Fluorine-containing polymer having functional group: I, II

Applying method: Coating

In these applications, processability and chemical resistance which the composite material having sliding property of the present invention possesses can be used particularly effectively.

In addition, the composite material having sliding property of the present invention can be applied to parts for vending machine, parts for camera, parts for medical apparatuses (gastocamera, etc.), parts for clock, parts for agricultural machines, oilless bearing for mechanical industry, etc.

EMBODIMENT 6

(Composite Material for Cooking Apparatuses)

With respect to cooking apparatuses represented by griddle and rice cooker, it is desired that cooking can be done at higher temperature for shortening of cooking time and to pursue good taste of cooked dishes. Also it is desired that stains such as oil and scorch can be easily removed so as to clean these apparatuses after the cooking and that the surfaces of the apparatuses are free from scratches by cleaning with a brush, spatula, etc. during long term use. Further good property for exhibiting clear surface pattern is also desired from the viewpoint of appearance thereof.

In order to meet such requirement, as the composite material used for cooking apparatuses, a fluorine-containing polymer which is excellent in heat resistance, chemical resistance, corrosion resistance, weather resistance, surface properties (non-sticking property, low friction property, etc.) and electric insulating property is used on a heating surface of cooking apparatuses such as rice cooker or electric griddle. However the fluorine-containing polymer has insufficient adhesion to a metal surface due to its excellent non-sticking property. Therefore it is necessary to (1) use an adhesive or (2) carry out, on a surface of a substrate, sand-blasting or etching by electrochemical method to make the surface rough for adhering by anchor effect.

However it is not possible to make the best use of transparency of a glass substrate and color tone of a metallic substrate and thus there is a problem with property for exhibiting clear surface pattern, since in the method using an adhesive like the method (1), no transparent adhesive having heat resistance and high adhesion is available, and also since in the method for making the substrate surface rough like the method (2), the substrate surface is made rough significantly. Further even if a transparent adhesive is developed, since a fluorine-containing polymer composing a coating film on a heating surface of cooking apparatuses, etc. is soft, for example, due to long term use or by cleaning with a spatula or brush, the coating film on a heating surface is injured and thus transparency is lowered and a surface pattern of a substrate becomes unclear, or for example, due to abrasion, inherent non-sticking property and water-repellency of a fluorine-containing polymer are lowered.

To solve them, there have been made trials to endow the coating film comprising fluorine-containing polymer with hardness by adding a glassy or aluminum-based inorganic filler. However there were problems that the coating film became fragile, transparency was lowered and a surface pattern of a substrate became unclear.

To cope with these problems, the proposals have been made (in JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, JP-A-7-157335).

However as mentioned above, even by these conventional sol-gel methods, coating films having excellent transparency, abrasion resistance, heat resistance, oil- and water-repellency and scratch resistance have not been obtained.

The composite material for cooking apparatuses which is obtained by applying the coating composition of the present invention to the substrate can be used on various cooking apparatuses firstly because fine particles of the fluorine-containing ethylenic polymer (A) having functional group are dispersed uniformly because of their good interfacial adhesivity in the coating film comprising the metal oxide (B) and the coating film has enough hardness, transparency and adhesive property, and secondly because the coating film comprising the fluorine-containing ethylenic polymer (A) having functional group and the metal oxide (B) has good non-sticking property, heat resistance, abrasion resistance, scratch resistance, stain-proofing property, water-repellency and anti-bacterial property.

The present invention can provide the composite material for cooking apparatuses comprising a substrate and a coating film thereon which comprises the metal oxide (B) and the fine particles of the fluorine-containing ethylenic polymer (A) having functional group prepared by copolymerizing:

(a) 0.05 to 50% by mole of at least one of fluorine-containing ethylenic monomers having at least one functional group selected from the group consisting of hydroxyl, carboxyl, a carboxylic salt group, a carboxylic ester group and epoxy, and (b) 50 to 99.95% by mole of at least one of fluorine-containing ethylenic monomers having no functional group mentioned above; the fine particles of the polymer (A) are contained in dispersed state in the metal oxide (B) layer.

Also the present invention can provide the composite material, in which the above-mentioned fluorine-containing ethylenic monomer (a) having functional group is at least one of fluorine-containing ethylenic monomers having functional group and represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the composite material for cooking apparatuses, in which the above-mentioned fluorine-containing polymer (A) having functional group is the polymer (I).

Also the present invention can provide the composite material for cooking apparatuses, in which the above-mentioned fluorine-containing polymer (A) having functional group is the polymer (II).

Also the present invention can provide the composite material for cooking apparatuses, in which the above-mentioned fluorine-containing polymer (A) having functional group is the polymer (III).

Also the present invention can provide the composite material for cooking apparatuses, in which the above-mentioned metal oxide (B) is a silicon oxide.

Also the present invention can provide the composite material for cookin apparatuses, in which the above-mentioned metal oxide (B) is an aluminum oxide.

Also the present invention can provide the composite material for cooking apparatuses, in which the above-mentioned metal oxide (B) is a titanium oxide.

Also the present invention can provide the composite material for cooking apparatuses, in which the above-mentioned substrate is a metallic substrate.

Also the present invention can provide the composite material for cooking apparatuses, in which the above-mentioned substrate is a glass substrate.

Also the present invention can provide the composite material for cooking apparatuses, in which the above-mentioned substrate is a synthetic resin substrate.

Also the present invention can provide the composite material for cooking apparatuses, in which the above-mentioned substrate is a ceramic substrate.

Also the present invention can provide cooking apparatuses produced by using the composite material for cooking apparatuses.

Also the present invention can provide heating apparatuses for cooking produced by using the composite material for cooking apparatuses.

Also the present invention can provide a griddle produced by using the composite material for cooking apparatuses.

Also the present invention can provide a griddle produced by applying the composite material for cooking apparatuses to its heating surface made of metal.

Also the present invention can provide a griddle produced by applying the composite material for cooking apparatuses to its glass lid.

Also the present invention can provide a range with oven produced by using the composite material for cooking apparatuses.

Also the present invention can provide a range with oven produced by applying the composite material for cooking apparatuses to its inner surface made of metal.

Also the present invention can provide a range with oven produced by using the composite material for cooking apparatuses on its cooking plate.

Also the present invention can provide a range with oven produced by using the composite material for cooking apparatuses on its glass door.

Also the present invention can provide a heating pot produced by using the composite material for cooking apparatuses.

Also the present invention can provide a heating pot produced by applying the composite material for cooking apparatuses to its heating surface made of metal.

Also the present invention can provide a heating pan produced by applying the composite material for cooking apparatuses to its glass lid.

Also the present invention can provide a frying pan produced by using the composite material for cooking apparatuses.

Also the present invention can provide a frying pan produced by applying the composite material for cooking apparatuses to its heating surface made of metal.

Also the present invention can provide a fryer produced by using the composite material for cooking apparatuses.

Also the present invention can provide a fryer produced by applying the composite material for cooking apparatuses to its inner surface made of metal.

Also the present invention can provide a fryer produced by applying the composite material for cooking apparatuses to its inner surface made of glass.

Also the present invention can provide a rice cooker produced by using the composite material for cooking apparatuses.

Also the present invention can provide a rice cooker produced by applying the composite material for cooking apparatuses to its inner surface made of metal.

Also the present invention can provide a rice cooker produced by applying the composite material for cooking apparatuses to its inner lid made of metal.

Also the present invention can provide a pot produced by using the composite material for cooking apparatuses.

Also the present invention can provide a pot produced by applying the composite material for cooking apparatuses to its inner surface made of metal.

Also the present invention can provide a pot produced by applying the composite material for cooking apparatuses to its inner lid made of metal.

Also the present invention can provide a tableware or vessel produced by using the composite material for cooking apparatuses.

Also the present invention can provide a metallic tableware or vessel produced by using the composite material for cooking apparatuses.

Also the present invention can provide a glass tableware or vessel produced by using the composite material for cooking apparatuses.

Also the present invention can provide a cooking apparatus for processing foods which is produced by using the composite material for cooking apparatuses.

Also the present invention can provide a cooking apparatus for mixing foods which is produced by using the composite material for cooking apparatuses.

Also the present invention can provide a cooking apparatus for cutting foods which is produced by using the composite material for cooking apparatuses.

Also the present invention can provide a bakery apparatus produced by using the composite material for cooking apparatuses.

In principle the above-mentioned descriptions regarding the coating composition, coating film and methods for production thereof are applied to the composite material for cooking apparatuses of the present invention. Explained below are particularly preferable embodiments thereof.

Examples of the above-mentioned substrate used usually for the composite material for cooking apparatuses of the present invention as a metallic substrate are, for instance,
① cold rolled steel sheet,
② plated steel sheet, for example, Zn-plated steel sheet, Zn alloy-plated steel sheet, Al-plated steel sheet, Al alloy-plated steel sheet, Cr-plated steel sheet (TFS), Ni-plated steel sheet, Cu-plated steel sheet, galvanized steel sheet, etc.,
③ aluminum sheet,
④ titanium sheet,
⑤ stainless steel sheet, and the like.

In addition, where transparency is required, a ceramic substrate of glass and a resin substrate of acrylic resin and polycarbonate are usually used.

A thickness of the metal oxide coating film of the composite material for cooking apparatuses of the present invention varies depending on kind and portion of cooking apparatuses to which the film is applied. The thickness is from 0.01 to 100 μm, preferably from 0.01 to 50 μm, particularly preferably from 0.02 to 20 μm.

Cooking apparatuses and parts thereof to which the composite material for cooking apparatuses of the present invention is applied are classified by fields they belong to, and exemplified below. Accordingly the present invention also relates to cooking apparatuses and parts thereof mentioned below.

Also these classified cooking apparatuses and parts thereof are shown in Tables 1 to 7.

① Pots and pans
  (a) Inner surface, inner lid, etc. of electric pot including electric water heater In these applications, stain-proofing property (for fur), hot water resistance and anti-bacterial property of the composite material for cooking apparatuses of the present invention can be used particularly effectively.
  (b) Inner surface of inner pot, inner lid, etc. of gas and electric rice cookers and rice cookers with rice washing mechanism, etc.

In these applications, non-sticking property (for rice and scorching), stain-proofing property and heat resistance of the composite material for cooking apparatuses of the present invention can be used particularly effectively. Further it is possible to inhibit lowering of the characteristics due to abrasion, scratch, etc. of the coating film by cleaning with brush, etc.

② Cooking apparatuses
  (a) Surfaces of frying pan, vat, household hand mixer for cooking, crate, kitchen knife, molder for bread, reverse sheet for bread, dough dividing and rounding machine for bread, etc., inner surface of mixing bowl, rice chest, etc. and blade of the above-mentioned mixer In these applications, non-sticking property (scorching and cohering stains), stain-proofing property and heat resistance of the composite material for cooking apparatuses of the present invention can be used particularly effectively. Further it is possible to inhibit lowering of the characteristics due to abrasion, scratch, etc. of the coating film by metal spatula, etc.

(b) Inner surface, blade, etc. of electric food processors such as electric food crusher for domestic use, electric food crusher, electric meat grinder for kitchen use, electric blender for kitchen use and electric mixer for kitchen use In these applications, non-sticking property (for vegetable and meat juice) and stain-proofing property of the composite material for cooking apparatuses of the present invention can be used particularly effectively.

③ Gas oven with grill
  (a) Top panel, side panel, surface of gas ranges such as gas container built-in type oven, and drip pan cover thereof, etc.

In these applications, non-sticking property (for oil stains), heat resistance and transparency (property for exhibiting clear color and pattern) of the composite material for cooking apparatuses of the present invention can be used particularly effectively. Further it is possible to inhibit lowering of the characteristics due to abrasion, scratch, etc. of the coating film by cleaning with brush, etc.

④ Ranges with oven including toaster, range, etc.
  (a) Inner surfaces (metallic portion) of ovens (range for kitchen) such as oven for shop use, electric oven (including oven for shop use), electric oven with heating cabinet for shop use, cooking oven for shop use and cooking range for shop use; ovens for making bread such as baking oven for shop use and automatic baking apparatus for domestic use; electric oven and toaster such as toaster and toaster for bread; and microwave range such as microwave range for shop use and microwave range with oven; and pans for ranges In these applications, non-sticking property (for oil and scorching), stain-proofing property and heat resistance of the composite material for cooking apparatuses of the present invention can be used particularly effectively. Further it is possible to inhibit abrasion and scratch of the coating film by spatula, brush, etc.

(b) Inner surface of door of ranges with oven raised in above (a)

In these applications, non-sticking property, heat resistance and transparency of the composite material for cooking apparatuses of the present invention can be used particularly effectively. In case of microwave range, energy ray resistance can be used particularly effectively.

⑤ Pots and pans
  (a) Inner surface of pots and pans such as glass pot, enamel pot, aluminum pot, electric frying pot, electric Tempura pot, electric pressure pot and electric pressure pot for stew, etc.

In these applications, non-sticking property for scorching, cohering stains and oil in case of the frying pot and Tempura pot) and heat resistance of the composite material for cooking apparatuses of the present invention can be used particularly effectively. Further it is possible to inhibit abrasion and scratch of the coating film by spatula, brush, etc.

(b) Lid, etc. of pots and pans raised in above (a)

In these applications, not only the characteristics in above (a) but also transparency of the composite material for cooking apparatuses of the present invention can be used particularly effectively.

⑥ Garbage disposer
  Inner surface, etc. of garbage disposer for domestic use and garbage (waste) disposer for making compost In these applications, non-sticking property and stain-proofing property of the composite material for cooking apparatuses of the present invention can be used particularly effectively.

⑦ Other heating apparatuses for cooking (a) Heating surface, lid, etc. of griddle In these applications, non-sticking property (for scorching and cohering stains) and heat resistance of the composite material for cooking apparatuses of the present invention and transparency thereof in case of the lid can be used particularly effectively. Further it is possible to inhibit lowering of the characteristics and appearance due to abrasion and scratch of the coating film by metal spatula, etc.

(b) Cooking surface, etc. of electromagnetic cooking apparatuses such as electromagnetic range and oven In these applications, non-sticking property, heat resistance and transparency of the composite material for cooking apparatuses of the present invention can be used particularly effectively, and it is possible to inhibit abrasion and scratch of the coating film by brush, etc.

(c) Inner surface, door inner surface, lid, etc. of electric steamer such as food steamer for shop use In these applications, non-sticking property, stain-proofing property, heat resistance and steam resistance of the composite material for cooking apparatuses of the present invention can be used particularly effectively, and it is possible to inhibit abrasion and scratch of the coating film by brush, etc.

(d) Inner surface, lid, etc. of noodle boiler for shop use

In these applications, non-sticking property, stain-proofing property, heat resistance and hot water resistance of the composite material for cooking apparatuses of the present invention can be used particularly effectively, and it is possible to inhibit abrasion and scratch of the coating film by brush, etc.

(e) Inner surface, inner surface (metallic portion) and door inner surface of cooking roaster for shop use, pan for range, etc.

In these applications, non-sticking property (for scorching and cohering stains) and heat resistance of the composite material for cooking apparatuses of the present invention can be used particularly effectively, and it is possible to inhibit abrasion and scratch of the coating film by brush, etc.

(f) Inner surface, etc. of tableware and can washer for shop use

In these applications, non-sticking property, stain-proofing property and hot water resistance of the composite material for cooking apparatuses of the present invention can be used particularly effectively.

(g) Inner surface, door inner surface, etc. of heating cabinet for shop use

In these applications, non-sticking property, stain-proofing property, transparency and heat resistance of the composite material for cooking apparatuses of the present invention can be used particularly effectively.

Further as the cooking apparatuses other than those mentioned above, to which the composite material for cooking apparatuses of the present invention can be preferably applied, there can be exemplified the same cooking apparatuses as raised in Embodiment 1.

TABLE 1

| Classification of product | Typical finished product | Characteristics needed | Defects of prior art | Effect of the invention |
|---|---|---|---|---|
| Pots | Electric pot | Stain-proofing property for fur, hot water resistance, antibacterial property | Primer is necessary. Processability is not good and surface pattern is unclear. Abrasion and scratching occur easily. (insufficient durability) | Adhesive property processability (no primer required), abrasion resistance, scratch resistance, hardness |
|  | Electric rice cooker | Non-sticking property for scorched face, heat resistance | Primer is necessary. Processability is not good and surface pattern is unclear. Abrasion and scratching occur easily. (insufficient durability) | Adhesive property processability (no primer required), abrasion resistance, scratch resistance, hardness |
| Cooking appliances and utensils | Frying pan | Non-sticking property for scorch and cohered stain, stain-proofing property, heat resistance | Processability and transparency are not good and surface pattern is unclear. Abrasion and scratching occur easily (insufficient durability) | Adhesive property, processability (no primer required), transparency, clearer surface pattern, abrasion resistance, scratch resistance, hardness |
|  | Electric food processor | Non-sticking property for vegetable and juice of meat, stain-proofing property | Processability and transparency are not good and surface pattern is unclear. | Adhesive property, improvement of processability (no primer required), transparency, clearer surface pattern |
| Oven with grill (toaster, range) | Gas oven | Non-sticking property for stained oil, heat resistance transparency, clear surface (color, pattern) | Processability is not good and surface pattern is unclear. Scratching occurs easily. (lowering of appearance). | Adhesive property, processability (no primer required), transparency, clear surface pattern, abrasion resistance, scratch resistance, hardness |
| Range with oven (toaster, range) | Oven (kitchen range) | Non-sticking property for oil and scorch, stain-proofing property, heat resistance, non-sticking property, transparency | Processability, heat resistance and durability are not good. Wipe-off property is not good (No articles treated with fluorine-containing resin are available). Transparency is not good. Abrasion and scratching occur easily. (insufficient durability) | Adhesive property (processability), clear surface pattern, transparency, abrasion resistance, scratch resistance, hardness |
|  | Oven for baking bread | Non-sticking property for oil and scorch, stain-proofing property, heat resistance, non-sticking property, | Processability, heat resistance and durability are not good. Wipe-off property is not good (No articles treated with | Adhesive property (processability), clear surface pattern, |

TABLE 1-continued

| Classification of product | Typical finished product | Characteristics needed | Defects of prior art | Effect of the invention |
| --- | --- | --- | --- | --- |
| | | transparency | fluorine-containing resin are available). Transparency is not good. Abrasion and scratching occur easily. (insufficient durability) | transparency, abrasion resistance, scratch resistance, hardness |
| | Electric oven and toaster | Non-sticking property for oil and scorch, stain-proofing property, heat resistance, non-sticking property, transparency | Processability, heat resistance and durability are not good. Wipe-off property is not good (No articles are not treated with fluorine-containing resin are available). Transparency is not good. Abrasion and scratching occur easily. (insufficient durability) | Adhesive property (processability), (clear surface pattern, transparency, abrasion resistance, scratch resistance, hardness |
| | Microwave oven | Non-sticking property, heat resistance, resistance to energy ray, transparency | Processability, heat resistance and durability are not good. Wipe-off property is not good fluorine-containing resin are available). Transparency good. Abrasion and scratching occur easily. (insufficient durability) | Adhesive property (processability), heat resistance, durability, not maintenance of transparency, abrasion resistance, scratch resistance, hardness |

TABLE 2

| Classification of product | Typical finished product | Characteristics needed | Defects of prior art | Effect of the invention |
| --- | --- | --- | --- | --- |
| Pot and pan | Glass pot | Non-sticking property for scorch and cohering stains, heat resistance, transparency | Wipe-off property is not good (No articles treated with fluorine-containing resin are available). Heat resistance and transparency are not good. Abrasion and scratching occur easily. (insufficient durability) | Adhesive property (processability), transparency, abrasion resistance, scratch resistance |
| | Electric deep fryer | Non-sticking property for heat resistance, oil, transparency | Processability, heat resistance and wipe-off property are not good (No articles treated with fluorine-containing resin are available). Surface pattern is unclear. Transparency is not good. Abrasion and scratching occur easily (insufficient durability). | Adhesive property, processability (no primer required), transparency, abrasion resistance, scratch resistance |
| | Electric pressure cooker | Non-sticking property for scorching and cohering stains, heat resistance, transparency | Processability, heat resistance and wipe-off property are not good (No articles treated with fluorine-containing resin are available). Surface pattern is unclear. Transparency is not good. Abrasion and scratching occur easily (insufficient durability). | Adhesive property, processability (no primer required), transparency, abrasion resistance, scratch resistance |
| | Electric pressure pot for stew | Non-sticking property for scorching and cohering stains, heat resistance, transparency | Processability, heat resistance and wipe-off property are not good (No articles treated with fluorine-containing resin are available). Surface pattern is unclear. Transparency is not good. Abrasion and scratching occur easily (insufficient durability). | Adhesive property, processability (no primer required), transparency, abrasion resistance, scratch resistance |

TABLE 3

| Classification of product | Typical finished product | Characteristics needed | Defects of prior art | Effect of the invention |
| --- | --- | --- | --- | --- |
| Other heating appliances for cooking | Griddle | Non-sticking property for scorch and cohering stains, heat resistance, non-sticking property, transparency | Processability and heat resistance are not good. Abrasion and scratching (durability) occur easily. Wipe-off property is not good | Adhesive property, processability (no primer required), heat resistance, scratch resistance, |

TABLE 3-continued

| Classification of product | Typical finished product | Characteristics needed | Defects of prior art | Effect of the invention |
|---|---|---|---|---|
| | | | (No articles treated with fluorine-containing resin are available). Transparency is not good. | transparency, hardness |
| | Electromagnetic cooking appliance | Non-sticking property, heat resistance, transparency | Processability is not good. Abrasion and scratching occur easily (durability). | Adhesive property, processability (no primer required), transparency, abrasion resistance, scratch resistance, hardness |
| | Electric cooking steamer | Non-sticking property, stain-proofing property, heat resistance, steam resistance | Processability is not good. Abrasion and scratching occur easily (durability). | Adhesive property, processability (no primer required), abrasion resistance, scratch resistance, hardness |
| | Noodles boiling apparatus for shop use | Non-sticking property, stain-proofing property, heat resistance, hot water resistance | Processability is not good. Abrasion and scratching occur easily (durability). | Adhesive property, processability (no primer required), abrasion resistance, scratch resistance, hardness |
| Other heating appliances for cooking | Cooking roaster for shop use | Non-sticking property for scorch and cohering stains, heat resistance | Processability and heat resistance are not good. Abrasion and scratching occur easily (durability). | Adhesive property, processability (no primer required), transparency, abrasion resistance, scratch resistance, hardness |
| | Tablewares and cans washing machine for shop use | Non-sticking property, stain-proofing property, hot water resistance | Processability is not good. Surface pattern is unclear. | Adhesive property, processability (no primer required) |
| | Heat cabinet for shop use | Non-sticking property, stain-proofing property, transparency, heat resistance | Processability and transparency are not good. Surface pattern is unclear. | Adhesive property, processability (no primer required) |
| Garbage disposer | Garbage disposer | Non-sticking property, stain-proofing property | Processability is not good. Surface pattern is unclear. | Adhesive property, processability (no primer required) |

TABLE 4

| Classification of product | Typical finished product | Similar product | Application |
|---|---|---|---|
| Pots | Electric pot | | Inner surface, inner lid |
| | | Electric water heater | Inner surface, inner lid |
| | Electric rice cooker | | Inner surface of inner pot, inner lid |
| | | Rice cooker (gas, electric) | Inner surface of inner pot, inner lid |
| | | Rice cooker (with rice washing mechanism for shop use) | Inner surface of inner pot, inner lid |
| Cooking appliances and utensils | Frying pan | | Surface |
| | | Vat | Surface |
| | | Mixing bowl | Inner surface |
| | | Chopping board | Surface |
| | | Household hand-operated mixer for cooking | Surface, blade |
| | | Crate | Surface |
| | | Cooking knife | Surface |
| | | Mold for making bread | Surface |
| | | Reverse sheet for making bread | Surface |
| | | Dough dividing and rounding machine for making bread | Surface |
| | | Rice chest | primer surface |
| | Electric food processor | | Inner surface, blade |
| | | Household electric food crusher | Inner surface |
| | | | Blade |
| | | Electric food crusher | Inner surface |
| | | | Blade |
| | | Electric meat grinder for kitchen use | Inner surface |
| | | | Blade |
| | | Electric blender for kitchen use | Inner surface |
| | | | Blade |
| | | Electric mixer for kitchen use | Inner surface |
| | | | Blade |

TABLE 4-continued

| Example of substrate | Preferred polymer* | Metal oxide | Applying method | Other similar product |
|---|---|---|---|---|
| Metal (aluminum, galvanized steel plate) | I, II | Si, Al, Ti | Coating | |
| Metal (aluminium, galvanized steel plate) | I, II | Si, Al, Ti | Coating | Rice gruel cooker, rice warmer |
| Metal | | | | |
| Metal | | | | |
| Metal | | | | Cooking utensils |
| SUS, aluminum | | | | Cooking utensils (for slicing) |
| SUS, aluminum | | | | Cooking utensils |
| Resin, wood | | | | Cooking appliances and utensils |
| SUS, resin | | | | Cooking appliances (food) |
| SUS, resin | I, II, III | Si, Al, Ti | Coating | Electric cooking appliances |
| SUS | | | | Cooking iron |
| SUS | | | | Cooking appliances and facilities |
| Metal | | | | Barbecue utensils |
| Metal | | | | Food processing machine and |
| Metal | | | | utensils (with press machine) |
| Metal | | | | Cooking appliances for mixing, |
| Metal | | | | vegetable slicer, food slicer, |
| Metal | | | | peeler, cutter for cutting into |
| Metal, glass | | | | small cubes, food cutter, meat |
| Metal | | | | chopper, meat slicer, meat |
| Metal, glass | I, II, III | Si, Al, Ti | Coating | tenderizer, cutter mixer, mixer, food |
| Metal | | | | mixer, blender, apple processor, |
| Metal, glass | | | | continuous egg opening machine, |
| Metal | | | | soy bean curd cutter, food molder, |
| Metal, glass | | | | bread crumb coating machine, |
| Metal | | | | vegetable washing machine |

*Fluorine-containing ethylenic polymer (A) having functional group of the present invention

TABLE 5

| Classification of product | Typical finished product | Similar product | Application |
|---|---|---|---|
| Gas oven with grill | Gas oven | | Top plate, side plate, outer surface |
| | | Gas container built-in type gas oven | Top plate, side plate, outer surface |
| | | Hood for drip pan of gas oven (made of metal) | Outer surface |
| Range with oven (toaster, range) | Oven (kitchen range) | | Inner surface (metallic portion), pan for range, Inner surface of door |
| | | Oven for shop use | Inner surface (metallic portion), pan for range, Inner surface of door |
| | | Electric oven | Inner surface (metallic portion), pan for range, Inner surface of door |
| | | Electric oven (with heating cabinet for shop use) | Inner surface (metallic portion), pan for range, Inner surface of door |
| | | Electric oven (for shop use) | Inner surface (metallic portion), pan for range, Inner surface of door |
| | | Oven for shop use | Inner surface (metallic portion), pan for range, Inner surface of door |
| | | Cooking oven for shop use | Inner surface (metallic portion), pan for range, Inner surface of door |
| | | Cooking range for shop use | Inner surface (metallic portion), pan for range, Inner surface of door |
| | Oven for baking bread | | Inner surface (metallic portion), pan for range, Inner surface of door |
| | | Oven for baking bread for shop use | Inner surface (metallic portion), pan for range, Inner surface of door |
| | | Bread baker (automatic, for domestic use) | Inner surface (metallic portion), pan for range, Inner surface of door |

| Example of substrate | Preferred polymer* | Metal oxide | Applying method | Other similar product |
|---|---|---|---|---|
| Metal | I, II | Si, Al, Ti | Coating | Portable range, oven with grill, |
| Metal | | | | portable electric range, |
| Metal | | | | electric oven with grill gas range, gas oven with grill |
| Metal | | | | Gas salamander, |
| Metal, glass | | | | electric salamander, |
| Metal | | | | convection |

TABLE 5-continued

| Example of substrate | Preferred polymer* | Metal oxide | Applying method | Other similar product |
|---|---|---|---|---|
| Metal, glass | | | | oven |
| Metal | | | | |
| Metal, glass | | | | |
| Metal | | | | |
| Metal, glass | I, II | Si, Al, Ti | Coating | |
| Metal | | | | |
| Metal, glass | | | | |
| Metal | | | | |
| Metal, glass | | | | |
| Metal | | | | |
| Metal, glass | | | | |
| Metal | | | | Oven for baking bread |
| Metal, glass | | | | |
| Metal | I, II | Si, Al, Ti | Coating | |
| Metal, glass | | | | |
| Metal | | | | |
| Metal, glass | | | | |

*Fluorine-containing ethylenic polymer (A) having functional group of the present invention

TABLE 6

| Classification of product | Typical finished product | Similar product | Application |
|---|---|---|---|
| Range with oven (toaster, range) | Electric oven and toaster | | Inner surface (metallic portion), pan for range, Inner surface of door |
| | | Toaster | Inner surface (metallic portion), pan for range, Inner surface of door |
| | | Toaster for bread | Inner surface (metallic portion), pan for range, Inner surface of door |
| | Microwave oven | | Inner surface (metallic portion), pan for range, Inner surface of door |
| | | Microwave range for shop use | Inner surface (metallic portion), pan for range, Inner surface of door |
| | | Microwave range with oven | Inner surface (metallic portion), pan for range, Inner surface of door |
| | | Rice cooker (for microwave range) | Inner surface |
| Pan and pot | Glass pot | | Inner surface, lid |
| | | Enamel pot | Inner surface, lid |
| | | Aluminum pot | Inner surface, lid |
| | Electric frying pot | | Inner surface of pot, lid |
| | | | Inner surface of pot, lid |
| | | Electric Tempura frying pot | Inner surface of pot, lid |
| | | | Inner surface of pot, lid |
| | Electric pressure cooker | | Inner surface of pot, lid |
| | | | Inner surface of pot, lid |
| | Electric pressure pot for stew | | Inner surface of pot, lid |
| | | | Inner surface of pot, lid |

| Example of substrate | Preferred polymer* | Metal oxide | Applying method | Other similar product |
|---|---|---|---|---|
| Metal | | | | |
| Metal, glass | | | | |
| Metal | | | | |
| Metal, glass | I, II | Si, Al, Ti | Coating | |
| Metal | | | | |
| Metal, glass | | | | |
| Metal | | | | |
| Metal, glass | | | | |
| Metal | | | | |
| Metal, glass | I, II | Si, Al, Ti | Coating | |
| Metal | | | | |
| Metal, glass | | | | |
| Metal | | | | |
| Glass | | | | Wok set for Chinese dishes, one-handed pot, double-handed pot |
| Metal | I, II | Si, Al, Ti | Coating | Gas fryer, electromagnetic fryer, Tempura fryer, oil filter unit |
| Glass | | | | |
| Metal | | | | |
| Glass | | | | |

TABLE 6-continued

| Metal Glass | I, II | Si, Al, Ti | Coating | Buckwheat boiling pot, rotary pot |
|---|---|---|---|---|
| Metal Glass | I, II | Si, Al, Ti | Coating | |

*Fluorine-containing ethylenic polymer (A) having functional group of the present invention

TABLE 7

| Classification of product | Typical finished product | Similar product | Application |
|---|---|---|---|
| Other heating appliance for cooking | Griddle | | Heating surface Lid |
| | Electromagnetic cooking appliance | Electromagnetic range and oven | Cooking surface Cooking surface |
| | Electric cooking steamer | | Inner surface Inner surface of door |
| | | Food steamer for shop use | Inner surface Lid |
| | Noodle boiling apparatus for shop use | | Inner surface Lid |
| | Cooking roaster for shop use | Cooking roaster for shop use | Inner surface   Inner surface of door Inner surface (metallic portion), pan for range |
| | Tablewares and cans washing machine for shop use | | Inner surface |
| | Heating cabinet for shop use | | Inner surface   Inner surface of door |
| Garbage disposer | Garbage disposer | | Inner surface |
| | | Garbage disposer (wastes), garbage disposer for household use, garbage disposer for making compost | Inner surface Inner surface Inner surface |

| Example of substrate | Preferred polymer* | Metal oxide | Applying method | Other similar product |
|---|---|---|---|---|
| Metal Metal, glass | I, II | Si, Al, Ti | Coating | Electric cooking griddle for fried dumpling stuffed with minced pork |
| Metal Metal | I, II | Si, Al, Ti | Coating | Electromagnetic range |
| Metal Metal Metal Metal, glass | I, II | Si, Al, Ti | Coating | Gas cooking steamer, Electric cooking steamer |
| Metal Metal, glass | I, II | Si, Al, Ti | Coating | |
| Metal, glass Metal | I, II | Si, Al, Ti | Coating | |
| Metal | I, II, III | Si, Al, Ti | Coating | |
| Metal, glass | I, II, III | Si, Al, Ti | Coating | Thawing box, food warmer, soup kettle, coffee maker, tea server, juice dispenser, miso soup dispenser, Sake warmer |
| Metal Metal Metal Metal, glass | I, II, III | Si, Al, Ti | Coating | |

*Fluorine-containing ethylenic polymer (A) having functional group of the present invention

EMBODIMENT 7

(Composite Material for Building)

With respect to building materials such as building glass, various interior and exterior wall materials, roofing materials and interior and exterior materials and construction materials such as sign, signal, guardrail, utility pole and sound-proof wall, since they are used exposed to environment, the surfaces thereof are required to have weather resistance, stain-proofing property against dust, exhaust gas and rain water, transparency and property for exhibiting clear surface pattern. Also various furnitures, kitchen apparatuses such as gas oven with grill and range hood, and housing facilities such as coordinated kitchen units, washstand, lavatory and bath room are required to have heat resistance, and non-sticking property and stain-proofing property against oil, scorch and fur. In Embodiment 7, all the above-mentioned products are referred to as "building materials". These building materials are made of glass, metal, ceramic, synthetic resin or concrete. Some of them are not subjected to any treatment on their surfaces, but to meet the mentioned requirements, on composite materials used for these building materials is applied a fluorine-containing polymer having heat resistance, chemical resistance, corrosion resistance, weather resistance, surface characteristics (non-sticking property, low friction property, etc.), electric insulating property, etc. However since the fluorine-containing polymer has not enough adhesion to a surface of substrate such as metal due to its excellent non-sticking property, it is necessary to (1) use an adhesive or (2) carry out sand-blasting or etching by electrochemical method to make a surface of the substrate rough for adhering by anchor.

However it is not possible to make the best use of transparency of a glass substrate and color tone such as metal gloss of a metallic substrate and thus there is a problem with property for exhibiting clear surface pattern, since in the method using an adhesive like the method (1), no transparent adhesive having heat resistance and high adhesivity is available, and also since in the method for making the substrate surface rough like the method (2), the substrate surface is made rough significantly. Further even if a transparent adhesive is developed, since a fluorine-containing polymer composing a coating film on a surface of a building material, etc. is soft, for example, due to long term use or by cleaning with a brush, the coating film is injured and thus transparency is lowered and a surface pattern of a substrate becomes unclear, or for example, due to abrasion, inherent weather resistance, stain-proofing property, water-repellency and non-sticking property of a fluorine-containing polymer are lowered. Further since the polymer is soft, when it is used on exterior building material, foreign matter, dusts, stains, etc. easily enter into a coating film and the coating film is easily stained, and thus there is a case where stains are hardly removed.

To solve them, there have been made trials to endow the coating film comprising the fluorine-containing polymer with hardness by adding a glassy or aluminum-based inorganic filler. However there were problems that the coating film became fragile, transparency was lowered and a surface pattern of a substrate became unclear.

Also there have been made various studies to endow glass with water-repellency for the purpose of repelling rain water on a window glass and fender mirror of cars in rainy days and making field of view clear. It can be considered that the results of such studies are used in the field of building materials.

To cope with these problems, the proposals have been made (in JP-A-4-124047, JP-A-4-325446, JP-A-5-24885, JP-A-4-359086, JP-A-5-170486, JP-A-5-213633, JP-A-5-51238, JP-A-6-329442, JP-A-6-340451, JP-A-7-102207, JP-A-7-157335).

However as mentioned above, even by these conventional sol-gel methods, coating films which are suitable for a composite material for building material and have, in addition to adhesive property and transparency, excellent abrasion resistance, heat resistance, water- and oil-repellency and scratch resistance have not been obtained.

The composite material for building which is obtained by applying the coating composition of the present invention to the substrate can be used on various building materials including building glass, building member, kitchen facilities and apparatuses, housing facilities and appliances and various members in the field of construction firstly because fine particles of the fluorine-containing ethylenic polymer (A) having functional group are dispersed uniformly in the coating film comprising the metal oxide (B) because of their good interfacial adhesivity and the coating film has enough hardness, transparency and adhesive property, and secondly because the coating film comprising the fluorine-containing ethylenic polymer (A) having functional group and the metal oxide (B) has good weather resistance, stain-proofing property, non-sticking property, water-repellency, heat resistance, abrasion resistance and scratch resistance.

The present invention can provide the composite material for building comprising a substrate and, on a surface of the substrate, a coating film which comprises the metal oxide (B) and the fine particles of the fluorine-containing ethylenic polymer (A) having functional group prepared by copolymerizing:

(a) 0.05 to 50% by mole of at least one of fluorine-containing ethylenic monomer having at least one functional group selected from the group consisting of hydroxyl, carboxyl, a carboxylic salt group, a carboxylic ester group and epoxy, and (b) 50 to 99.95% by mole of at least one of fluorine-containing ethylenic monomers having no functional group mentioned above; the fine particles of the polymer (A) are contained in dispersed state in the metal oxide (B) layer.

Also the present invention can provide the composite material for building, in which the above-mentioned fluorine-containing ethylenic monomer (a) having functional group is at least one of fluorine-containing ethylenic monomers having functional group and represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms, a fluorine-containing oxyalkylene group having 1 to 40 carbon atoms, a fluorine-containing alkylene group having ether group and 1 to 40 carbon atoms or a fluorine-containing oxyalkylene group having ether bond and 1 to 40 carbon atoms.

Also the present invention can provide the composite material for building, in which the above-mentioned fluorine-containing polymer (A) having functional group is the polymer (I).

Also the present invention can provide the composite material for building, in which the above-mentioned fluorine-containing polymer (A) having functional group is the polymer (II).

Also the present invention can provide the composite material for building, in which the above-mentioned fluorine-containing polymer (A) having functional group is the polymer (III).

Also the present invention can provide the composite material for building, in which the above-mentioned metal oxide (B) is a silicon oxide.

Also the present invention can provide the composite material for building, in which the above-mentioned metal oxide (B) is an aluminum oxide.

Also the present invention can provide the composite material for building, in which the above-mentioned metal oxide (B) is a titanium oxide.

Also the present invention can provide the composite material for building, in which the above-mentioned substrate is a metallic substrate.

Also the present invention can provide the composite material for building, in which the above-mentioned substrate is a synthetic resin substrate.

Also the present invention can provide the composite material for building, in which the above-mentioned synthetic resin substrate is transparent.

Also the present invention can provide the composite material for building, in which the above-mentioned synthetic resin substrate is a polycarbonate substrate.

Also the present invention can provide the composite material for building, in which the above-mentioned synthetic resin substrate is an artificial marble substrate.

Also the present invention can provide the composite material for building, in which the above-mentioned substrate is a non-metallic inorganic substrate.

Also the present invention can provide the composite material for building, in which the above-mentioned non-metallic inorganic substrate is a glass substrate.

Also the present invention can provide the composite material for building, in which the above-mentioned non-metallic inorganic substrate is a concrete substrate.

Also the present invention can provide the composite material for building, in which the above-mentioned non-metallic inorganic substrate is a cement substrate.

Also the present invention can provide an exterior member for building produced by using the composite material for building.

Also the present invention can provide a curtain wall produced by using the composite material for building.

Also the present invention can provide a roofing member produced by using the composite material for building.

Also the present invention can provide a roofing tile produced by using the composite material for building.

Also the present invention can provide a roofing material produced by using the composite material for building.

Also the present invention can provide a window member produced by using the composite material for building.

Also the present invention can provide sashes produced by using the composite material for building.

Also the present invention can provide a rain trough produced by using the composite material for building.

Also the present invention can provide exteriors produced by using the composite material for building.

Also the present invention can provide a door produced by using the composite material for building.

Also the present invention can provide an outdoor fence produced by using the composite material for building.

Also the present invention can provide an interior member for building produced by using the composite material for building.

Also the present invention can provide a wall material produced by using the composite material for building.

Also the present invention can provide a flooring material produced by using the composite material for building.

Also the present invention can provide a ceiling produced by using the composite material for building.

Also the present invention can provide a material for fixtures produced by using the composite material for building.

Also the present invention can provide an interior door produced by using the composite material for building.

Also the present invention can provide a blind produced by using the composite material for building.

Also the present invention can provide housing facilities and apparatuses produced by using the composite material for building.

Also the present invention can provide bath and toilet utensils produced by using the composite material for building.

Also the present invention can provide a washstand produced by using the composite material for building.

Also the present invention can provide a toilet bowl produced by using the composite material for building.

Also the present invention can provide a bath tub produced by using the composite material for building.

Also the present invention can provide a member for kitchen produced by using the composite material for building.

Also the present invention can provide coordinated kitchen units produced by using the composite material for building.

Also the present invention can provide a gas oven with grill produced by using the composite material for building.

Also the present invention can provide a range hood produced by using the composite material for building.

Also the present invention can provide an elevator produced by using the composite material for building.

Also the present invention can provide an escalator produced by using the composite material for building.

Also the present invention can provide a building material for construction produced by using the composite material for building.

Also the present invention can provide a member for constructing a road produced by using the composite material for building.

Also the present invention can provide a sound-proof wall for construction of a road produced by using the composite material for building.

Also the present invention can provide a sign for construction of a road produced by using the composite material for building.

Also the present invention can provide a guard-rail for construction of a road produced by using the composite material for building.

Also the present invention can provide a signal cover for construction of a road produced by using the composite material for building.

Also the present invention can provide an electric lamp cover for construction of a road produced by using the composite material for building.

Also the present invention can provide water supply and drainage members produced by using the composite material for building.

Also the present invention can provide members for bridge produced by using the composite material for building.

Also the present invention can provide a member for railway construction produced by using the composite material for building.

Also the present invention can provide a bolt for railway construction produced by using the composite material for building.

Also the present invention can provide a signal cover for railway construction produced by using the composite material for building.

Also the present invention can provide a wiring for railway construction produced by using the composite material for building.

Also the present invention can provide a steel tower for railway construction produced by using the composite material for building.

Also the present invention can provide members for power supply plant produced by using the composite material for building.

Also the present invention can provide a glass for power supply plant produced by using the composite material for building.

Also the present invention can provide a utility pole for power supply plant produced by using the composite material for building.

Also the present invention can provide an arm for power supply plant produced by using the composite material for building.

Also the present invention can provide a member for chemical plant produced by using the composite material for building.

In principle the above-mentioned descriptions regarding the coating composition, coating film and methods for production thereof are applied to the composite material for building of the present invention. Explained below are particularly preferable embodiments thereof.

Examples of the substrate usually used for the composite material for building of the present invention are metallic plates of aluminum, stainless steel, iron and titanium; metallic plates subjected to hot-dip zinc coating, aluminum plating, etc.; metallic plates subjected to chemical conversion treatment such as oxidation with chromic acid, phosphoric acid, etc.; alumite-treated metallic plates subjected to anodizing; and the like.

Examples of the non-metallic inorganic substrate used usually are glass substrates such as crystallized glass, foam glass, heat reflecting glass, heat absorbing glass and composite glass; ceramic substrates such as tile, large size pottery plate, ceramic panel and brick; natural stones such as granite and marble; concrete substrates such as high strength concrete, glass fiber-reinforced concrete (GRC), carbon fiber-reinforced concrete (CFRC), lightweight aerated concrete (ALC) and composite ALC; cement substrates such as extrusion molded cement and composite molded cement; asbestos slate; enamelled steel plate; and the like.

Further examples of the synthetic resin substrate used are polycarbonate, polyester resin, acrylic resin, vinyl chloride resin, artificial marble (mainly comprising unsaturated polyester resin or acrylic resin), steel plates coated with vinyl chloride resin, acrylic resin or urethane resin, and the like.

Among them, where transparency is required, the non-metallic inorganic substrate of glass and the synthetic resin substrate of acrylic resin and polycarbonate are usually used.

The substrates used in the present invention may be in the form of sheet, film, tube, pipe, plate or bar or in other irregular form. However it is preferable that the form is the same as or similar to that of a finished product from the viewpoint of processability.

A thickness of the metal oxide coating film of the above-mentioned composite material for building of the present invention varies depending on kind and portion of building materials to which the film is applied. The thickness is from 0.01 to 100 $\mu$m, preferably from 0.1 to 70 $\mu$m, particularly preferably from 1 to 50 $\mu$m.

Building materials and parts thereof which can employ the composite material for building of the present invention are classified by the fields thereof and exemplified below. Accordingly the present invention relates to the building materials and various parts thereof mentioned below.

Those building materials and parts thereof are itemized, classified and shown in Tables 8 to 17. Those mentioned in the column "Metal oxide" are preferable metals (M) composing the metal oxide (B).

① Glass for building

Building glass, polished flat glass for building (window glass), window of stained glass, windshield glass, light shielding ratio adjustable glass, etc.

In these applications, transparency, stain-proofing property and flame retardancy of the composite material for building of the present invention can be used particularly effectively.

② Outer wall material, roofing material and interior and exterior material (made of metal)

(a) Exterior metallic building material for wall, metallic building material, interior and exterior metal panel for building, metal fence, metallic tile, metallic building panel, etc.

(b) Metallic roofing material, solar system built-in roofing material, etc.

(c) Metallic door, metallic grating, metallic shutter, metallic fence, metallic porch (for building), etc.

(d) Metallic blind (for outdoor use), gutter, sash, rain door, etc.

(e) Metallic ceiling panel, metallic floor tile, metallic wall sheet coated with decorative vinyl chloride sheet, etc.

(f) Metallic parking facilities for cars, metallic object of art, etc.

In these applications, weather resistance, stain-proofing property and transparency (property for exhibiting clear surface pattern) of the composite material for building of the present invention can be used particularly effectively.

③ Outer wall material, roofing material and interior and exterior material (non-metallic inorganic material)

(a) Segmental concrete block or concrete block bonded with a tile or sliced natural stone, segmental concrete road pavement board or concrete road pavement board having a surface of rubber material, concrete board which may be reinforced with GRC (fiber-reinforced concrete) wall material, etc.

(b) Extrusion-molded cement such as cement having tile-like surface (c) Building stone such as artificial stone (d) Building tile, luster-finished tile, floor tile, ceramic tile and border tile made of pottery (e) Exterior material for building and for wall such as non-metallic exterior material for building, building material and building panel and wall tile for building (f) Roofing material such as solar system built-in roofing material made of ceramic (g) Gravestone and grave-post (h) Small sculpture, standing sculpture, image, bust and other object of art made of stone, concrete or marble In these applications, weather resistance, stain-proofing property, water-proofing property, transparency (property for exhibiting clear surface pattern), processability and adhesive property of the composite material for building of the present invention, abrasion resistance thereof in case of above (c) and weathering preventing property thereof in cases of (g) and (h) can be used particularly effectively.

④ Outer wall material, roofing material and interior and exterior material (made of resin)

(a) Floor panel, ceiling panel, etc.

(b) Grating, gutter and blind and door for indoor use, etc.

(c) Plastic panel for concrete (d) Gasket for building (e) Curtain, cover and sunshield with an insect-proofing, ultraviolet ray and heat shielding and scatter preventing film (f) Flooring material made of stone or flooring material made of polyvinyl chloride and having a surface of stone pattern (g) Solar system built-in plastic roofing material (h) Sectional polyvinyl chloride tile having clearance and being capable of draining water (i) Synthetic resin sash (j) Decorative board for counter, furniture, sill, wall panel, bucksplash, baseboard, wall of bathroom and shower room (k) Prefabricated assembly set for washstand, shower room, lavatory, transferable toilet, public toilet, etc.

(l) Assembly set of sauna room, garage, etc.

In these applications, weather resistance, stain-proofing property, transparency (property for exhibiting clear surface pattern), water resistance, processability and adhesive property of the composite material for building of the present invention can be used particularly effectively.

⑤ Outer wall material and roofing material (made of wood)

(a) Timber for household utensils and timber and decorative panel for building such as veneer and wooden panel, etc.

(b) Wooden fence, door and window frame for indoor use, etc.

(c) Wooden panel for building produced by adhering elastic rubber material on the back of plywood (d) Wooden assembly set for building In these applications, weather resistance, stain-proofing property, transparency (property for exhibiting clear surface pattern), water resistance, processability and adhesion of the composite material for building of the present invention can be used particularly effectively.

⑥ Furniture (a) Glass showcase, wagon, display wagon, display panel, display stand, meal conveying wagon, flower stand, etc.

(b) Shelf, screen, desk, sofa, shelf for chest of drawers, etc.

(c) Telephone booth made of metal or various materials

In these applications, stain-proofing property, transparency (property for exhibiting clear surface pattern), water resistance and processability of the composite material for building of the present invention and further property for preventing paper from being pasted, adhesive property, abrasion resistance and scratch resistance thereof in case of above (c) can be used particularly effectively.

⑦ Apparatuses for household and shop uses (a) Gas oven with grill, range hood, ventilation hood, etc.

(b) Metallic duct for central heating, ventilator, air conditioner, etc.

In these applications, stain-proofing property, non-sticking property (against oil stains), processability and adhesive property of the composite material for building of the present invention can be used particularly effectively.

⑧ Housing facilities and appliances (a) Coordinated kitchen units including range for kitchen (oven), sink, etc.

(b) Electrically heated, gas heated and oil heated water heaters (including instantaneous water heater)

(c) Wall-mounted washbasin, washstand, hair washing appliance for domestic use, washstand with hair washing function, washbasin for washstand, washbasin with cover, bow window type washstand, etc.

(d) Flush toilet stool, small size chamber pot for car, urinal, toilet stool with urinalyzer, toilet stool for little children, toilet stool with hot water washing mechanism, toilet seat with deodorizing unit and water tank for flush toilet (e) Lining for bathrooms including shower room, sauna bath for domestic and shop uses, bath tubs such as prefabricated bath tub, bath tub with bubble generator and bath utensils such as handle mounted on bath tub and soap holder (f) Escalator, elevator (including those for private houses), etc.

In these applications, stain-proofing property, property for exhibiting clear surface pattern (transparency) and processability of the composite material for building of the present invention, and further heat resistance thereof in cases of above (a), (b) and (e), abrasion resistance and scratch resistance thereof in cases of above (c) to (e) and sliding property and corrosion resistance thereof in case of above (f) can be used particularly effectively.

⑨ Construction (a) Sign for bus stop, sign for street, sign mounted on guardrail, etc.

(b) Signals such as luminous signal and mechanical signal (c) Guardrail produced by using various materials (d) Utility pole produced by using various materials (e) Sound-proof wall (f) Plastic molding frame for forming concrete for building and structure In these applications, weather resistance, stain-proofing property, scratch resistance, transparency (property for exhibiting clear surface pattern), processability and adhesive property of the composite material for building of the present invention and further mold-release property thereof in case of above (f) can be used particularly effectively.

TABLE 8

| Classification | Sub-classification | Typical example of finished product | Characteristics needed | Defects of prior art |
| --- | --- | --- | --- | --- |
| Glass | Building glass | Building glass | Weather resistance, stain-proofing property (stains due to rain water) | Occurrence of staining, insufficient weather resistance (resistance to surface treating agent) |
| Building material | Outer wall material, roofing material and interior and exterior material (made of metal) | Exterior building material made of metal for wall | Weather resistance, stain-proofing property (stains due to rain water) | insufficient adhesive property (to fluorine-containing resin), occurrence of staining and rusting |
| | | Roofing material made of metal | Weather resistance, stain-proofing property (stains due to rain water) | insufficient adhesive property (to fluorine-containing resin), occurrence of staining and rusting |
| | | Metal door | Weather resistance, stain-proofing property (stains due to rain water) | insufficient adhesive property (to fluorine-containing resin), occurrence of staining and rusting |

TABLE 8-continued

| Classification | Sub-classification | Typical example of finished product | Characteristics needed | Defects of prior art |
|---|---|---|---|---|
| | | Metal blind | Weather resistance, stain-proofing property (stains due to rain water) | insufficient adhesive property (to fluorine-containing resin), occurrence of staining and rusting |
| | | Metal shutter | Weather resistance, stain-proofing property (stains due to rain water) | insufficient adhesive property (to fluorine-containing resin), occurrence of staining and rusting |
| | | Metal ceiling panel | Weather resistance, stain-proofing property (transparency) | Insufficient adhesive property (to fluorine-containing resin), occurrence of staining and rusting |
| | | Others | Weather resistance, stain-proofing property, clear surface pattern (transparency) | insufficient adhesive property (to fluorine-containing resin), occurrence of staining and rusting |
| Building material | Outer wall material, roofing material and exterior material excluding those made of metal (inorganic) | Concrete board (with reinforced truss) | Weather resistance, stain-proofing property, water-proofness | Insufficient adhesive property (to fluorine-containing resin), occurrence of staining |
| | | Cement (extraction molding) | Weather resistance, stain-proofing property, water-proofness | Insufficient adhesive property (to fluorine-containing resin), |
| | | Building stone | Weather resistance, stain proofing property, | Insufficient adhesive property (to fluorine-containing resin), occurrence of staining, low abrasion resistance |
| | | Tile (excluding those made of metal) | Weather resistance, stain-proofing property, clear surface pattern (transparency), abrasion resistance | Insufficient adhesive property (to fluorine-containing resin), occurrence of staining, poor transparency, low abrasion resistance |
| | | Exterior building material for wall (excluding those made of metal) | Weather resistance, stain-proofing property (stains due to rain water), water proofness | Insufficient adhesive property (to fluorine-containing resin), occurrence of staining |
| | | Roofing material (excluding those made of metal) | Weather resistance, stain-proofing property, transparency, water proofness | Insufficient adhesive property (to fluorine-containing resin), occurrence of staining |
| | | Grave stone | Weather resistance, stain-proofing property, transparency (clear surface pattern) prevention of weathering | Insufficient adhesive property (to fluorine-containing resin), occurrence of staining |
| | | Sculptures made of stone concrete or marble | Weather resistance, stain-proofing property, transparency (clear surface pattern), prevention of weathering | Insufficient adhesive property (to fluorine-containing resin), occurrence of staining |

TABLE 9

| Classification | Sub-classification | Typical example of finished product | Example of substrate | Preferred polymer* | Metal oxide | Applying method | Effect by polymer* |
|---|---|---|---|---|---|---|---|
| Glass | Building glass | Building glass | Glass | I-III | Si, Al, Ti | Coating | Processability (direct adhesion), prevention of scattering, maintenance of transparency |
| Building material | Outside wall material, roofing material and interior and exterior material (made of metal) | Exterior building material made of metal for wall | Metal, Aluminum | I, III | Si, Al, Ti | Coating | Processability (no primer required) clear surface pattern, transparency |
| | | Roofing material made of metal | Metal, aluminum SUS | I-III | Si, Al, Ti | Coating | Processability (no primer required) |
| | | Metal door | Metal, aluminum, steel plate | I-III | Si, Al, Ti | Coating | Processability (no primer required), clear surface pattern |
| | | Metal blind | Metal, aluminum, steel plate | I-III | Si, Al, Ti | Coating | Processability (no primer required), clear surface pattern |
| | | Metal shutter | Metal, aluminum, steel plate | I-III | Si, Al, Ti | Coating | Processability (no primer required), clear surface pattern |
| | | Metal ceiling panel | Metal, aluminum | I-III | Si, Al, Ti | Coating | Processability (no primer required), |

TABLE 9-continued

| Classification | Sub-classification | Typical example of finished product | Example of substrate | Preferred polymer* | Metal oxide | Applying method | Effect by polymer* |
|---|---|---|---|---|---|---|---|
| | | Others | steel plate Metal | I-III | Si, Al, Ti | Coating | clear surface pattern Processability (no primer required), clear surface pattern |
| Building material | Outside wall material, roofing material and exterior material excluding those made of metal (inorganic) | Concrete board (with reinforced truss) | Ceramic, pottery, rubber, stone, concrete | I-III | Si, Al, Ti | Coating | Processability (no primer required), adhesive property, transparency |
| | | Cement (extraction molding) | Cement | I-III | Si, Al, Ti | Coating | Processability (no primer required), adhesive property, transparency |
| | | Building stone | Resin | I-III | Si, Al, Ti | Coating | Processability (no primer required), adhesive property, transparency. |
| | | Tile (excluding those made of metal) | Ceramic, pottery | I-III | Si, Al, Ti | coating | Processability (no primer required), adhesive property, transparency, abrasion resistance |
| | | Exterior building material for wall (excluding those made of metal) | Concrete, resin, ceramic pottery, wood | I-III | Si, Al, Ti | Coating | Processability (no primer required), adhesive property, transparency |
| | | Roofing material (excluding those made of metal) | Ceramic, metal | I-III | Si, Al, Ti | Coating | Processability (no primer required), adhesive property |
| | | Grave stone | Stone | I-III | Si, Al, Ti | Coating | Processability (no primer required), adhesive property, transparency |
| | | Sculptures made of stone, concrete or marble | Stone, concrete, marble | I-III | Si, Al, Ti | Coating | Processability (no primer required), adhesive property, transparency |

*Fluorine-containing ethylenic polymer having functional group of the present invention

TABLE 10

| Classification | Sub-classification | Typical example of finished product | Similar applications | Applications |
|---|---|---|---|---|
| Glass | Building glass | Building glass | Polished flat glass for building (window glass), stained glass for window, windshield glass, glass with light shield adjusting function | Window glass, glass curtain wall for building |
| Building material | Outer wall material, roofing material and interior and exterior material (made of metal) | Exterior building material made of metal for wall | Metallic building material Interior and exterior metal panels for building Metal fence Metal tile Metal panel for building | Structures such as medium- or high-storied buildings and houses, aluminum curtain wall |
| | | Roofing material made of metal | Roofing material (made of metal with a built-in solar system) | Structures such as houses |
| | | Metal door | Metal grating Metal shutter Metal fence Metal porch (for building) | Structures such as buildings and large-scale building structures, exterior |
| | | Metal blind | Metal blind (for outdoor use) Blind (for outdoor use, made of metal) Blind (made of metal) | Structures such as buildings and houses, interior, exterior, car |

TABLE 10-continued

| Classification | Sub-classification | Typical example of finished product | Similar applications | Applications |
| --- | --- | --- | --- | --- |
| | | Metal shutter | Gutter (made of metal)<br>Sash | Structures such as medium-storied buildings and houses, mansion |
| | | Metal ceiling panel | Metal floor tile<br>Wall panel (made of metal, coated with decorating vinyl chloride sheet) | Structures such as building and houses |
| | | Others | Parking facilities made of metal for cars<br>Metal object of art | |
| Building material | Outer wall material, roofing material and exterior material excluding those made of metal (inorganic) | Concrete board (with reinforced truss) | Concrete block (with tile adhered thereto)<br>Concrete road pavement board (having rubber surface)<br>Concrete block (with sliced natural stone adhered thereto)<br>Concrete road pavement board (segment form)<br>Concrete block (segment form)<br>Wall material made of GRC (fiber-reinforced concrete) | Structures such as medium- or high-storied buildings and houses, road pavement |
| | | Cement (extraction molding) | Cement (Having a tile-like surface) | Structures such as medium- or high-storied buildings and houses |
| | | Building stone | Artificial stone | Structures such as medium- or -high-storied buildings and houses |
| | | Tile (excluding those made of metal) | Building tile (excluding those made of metal)<br>Tile (coated with luster)<br>Floor tile (excluding those made of metal)<br>Ceramic tile<br>Border tile made of pottery | Structures such as medium- or high-storied buildings and houses, floors of bath, swimming pool, road pavement, footpath and stairway |
| Building material | Outer wall material, roofing material and exterior material excluding those made of metal (inorganic) | Exterior building material for wall (excluding those made of metal) | Exterior material for building (excluding those made of metal)<br>Building material (excluding those made of metal)<br>Building panel (excluding those made of metal)<br>Wall tile for building (excluding those made of metal) | Structures such as medium- or high-storied buildings and houses |
| | | Roofing material (excluding those made of metal) | Roofing material (made of ceramic with built-in solar system)<br>Roofing material (made of composite building material with built-in solar system) | Structures such as medium- or high-storied buildings and houses |
| | | Grave stone | Grave stone<br>Grave-post (excluding those made of metal) | |
| | | Sculptures made of stone, concrete or marble | Small sculpture made of stone, concrete or marble<br>Small standing sculpture made of stone, concrete or marble<br>Sculpture made of stone, concrete or marble<br>Art work made of stone, concrete or marble | Monument |

TABLE 11

| Classification | Sub-classification | Typical example of finished product | Characteristics needed | Defects of prior art |
|---|---|---|---|---|
| Building material | Outer wall material, roofing material and exterior material (made of resin) | Ceiling panel (excluding those made of metal) | Stain-proofing property, clear surface pattern (transparency) | Insufficient adhesive property (to fluorine-containing resin), occurrence of staining |
| | | Door (excluding those made of metal) | Weather resistance, stain-proofing property | Insufficient adhesive property (to fluorine-containing resin), occurrence of staining |
| | | Plastic panel for concrete | Weather resistance, stain-proofing property | Insufficient adhesive property (to fluorine-containing resin), |
| | | Gasket for building | Weather resistance, stain-proofing property | Mainly silicon-made gasket (strength, water resistance), Occurrence of staining |
| | | Sun shield with a film for insect proof ultraviolet ray and heat ray shielding and glass scatter prevention | Weather resistance, stain-proofing property, transparency | |
| | | Floor material (made of stone or vinyl chloride resin provided with stone pattern on its surface | Weather resistance, clear surface pattern (transparency) | Insufficient adhesive property (to fluorine-containing resin), occurrence of staining |
| | | Roofing material (made of plastic with built-in solar system) | Weather resistance, stain-proofing property, transparency | Insufficient adhesive property (to fluorine-containing resin), occurrence of staining |
| | | Tile (of sectional type having a gap, being capable of draining water and made of polyvinyl chloride) | Weather resistance, stain-proofing property, transparency | Insufficient adhesive property (to fluorine-containing resin), occurrence of staining |
| | | Synthetic resin sash | Weather resistance, stain-proofing property, transparency | Insufficient adhesive property (to fluorine-containing resin), occurrence of staining |
| Building material | Outer wall material, roofing material and exterior material (made of resin) | Decorative panel (made of thermosetting polymer alloy and used for counter furniture, door sill, wall panel, baseboard for back splash, bath room and shower room walls and wainscot) | Stain-proofing property clear surface pattern (transparency) unclear surface pattern | insufficient adhesive property (to fluorine-containing resin), occurrence of staining, |
| | | Lavatory assembly set (made of plastic) | Weather resistance, stain-proofing property, transparency | Insufficient adhesive property (to fluorine-containing resin), occurrence of staining |
| | | Others | Weather resistance, stain-proofing property transparency | Insufficient adhesive property (to fluorine-containing resin), Occurrence of staining |
| | Outer wall material, roofing material (made of wood) | Panel (wooden panel for building) | Weather resistance, stain-proofing property, transparency water resistance | Insufficient adhesive property (to fluorine-containing resin), occurrence of staining |
| | | Window flame (made of wood) | Weather resistance, stain-proofing property, transparency water resistance | Insufficient adhesive property (to fluorine-containing resin), occurrence of staining |
| | | Wooden building material produced by adhering an elastic rubber material onto a back surface of plywood | Stain-proofing property, clear surface pattern (transparency), water resistance | Insufficient adhesive property (to fluorine-containing resin), Occurrence of staining |
| | | Decorative panel (wooden material) | Stain-proofing property, clear surface pattern (transparency), water resistance | Insufficient adhesive property (to fluorine-containing resin), occurrence of staining |
| | | Others | Weather resistance, stain-proofing property Occurrence of staining | Insufficient adhesive property (to fluorine-containing resin), |
| Building material | Furniture | Metal furniture | Stain-proofing property, (fingerprint, etc.), clear surface pattern (transparency) | Insufficient adhesive property (to fluorine-containing resin), occurrence of staining whether resistance(rusting) |
| | | Showcase | Stain-proofing property, (fingerprint, etc.), clear surface pattern (transparency) | Insufficient adhesive property (to fluorine-containing resin), occurrence of staining, unclear surface pattern |
| | | Shelf plate for a chest of drawers | Stain-proofing property, (fingerprint, etc.), clear surface pattern (transparency) | Occurrence of staining |
| | Telephone booth | Telephone booth (excluding those made of metal) | Weather resistance, Stain-proofing property, transparency. water resistance | Occurrence of staining, weather resistance (rusting), easy occurrence of abrasion |

TABLE 12

| Classification | Subclassification | Typical example of finished product | Example of substrate | Preferred polymer* | Metal oxide | Applying method | Effect by polymer* |
|---|---|---|---|---|---|---|---|
| Building material | Outer wall material, roofing material and exterior material (made of resin) | Ceiling panel (excluding those made of metal) | Resin, wood | III-VI | Si, Al, Ti | Coating | Processability (no primer required) |
| | | Door (excluding those made of metal) | Resin, wood | III, IV, V | Si, Al, Ti | Coating | Processability (no primer required), clear surface pattern |
| | | Plastic panel for concrete | Resin | III, IV V | Si, Al, Ti | Coating | Processability (no primer required), adhesive property |
| | | Gasket for building | Metal concrete, glass | VI | Si, Al, Ti | Coating | Weather resistance, stain-proofing property |
| | | Sun shield with a film for insect proof, ultraviolet ray and heat ray shielding and glass scatter prevention | Resin | III, IV, V | Si, Al, Ti | Coating | Processability (no primer required), adhesive property transparency |
| | | Floor material (made of stone or vinyl chloride resin provided with stone pattern on its surface) | Resin | III, IV, V | Si, Al, Ti | Coating | Processability (no primer required), transparency |
| | | Roofing material (made of plastic with built-in solar system) | Resin | III, IV, V | Si, Al, Ti | Coating | Processability (no primer required), transparency |
| | | Tile (of sectional type having a gap, being capable of draining water and made of polyvinyl chloride) | Resin | III, IV, V | Si, Al, Ti | Coating | Processability (no primer required), transparency |
| | | Synthetic resin sash | Resin | III, IV, V | Si, Al, Ti | Coating | Processability (no primer required), transparency |
| Building material | Outer wall material, roofing material and exterior material (made of resin) | Decorative panel (made of thermosetting polymer alloy and used for counter, furniture, door sill, wall panel, baseboard for back splash, bath room and shower room walls and wainscot) | Resin | III, IV, V | Si, Al, Ti | Coating | Processability (no primer required), transparency, clear surface pattern |
| | | Lavatory assembly set | Resin | | | | Processability |

TABLE 12-continued

| Classification | Subclassification | Typical example of finished product | Example of substrate | Preferred polymer* | Metal oxide | Applying method | Effect by polymer* |
|---|---|---|---|---|---|---|---|
| | | (made of plastic) | artificial marble | II, III, IV, V | Si, Al, Ti | Coating | (no primer required), transparency, adhesive property |
| | Outer wall material, roofing material (made of wood) | Others | Resin, wood | III, IV, V | Si, Al, Ti | Coating | Processability (no primer required) |
| | | Panel (wooden panel for building) | Wood | III, IV, V | Si, Al, Ti | Coating | Processability (no primer required), adhesive property |
| | | Window frame (made of wood) | Wood | III, IV, V | Si, Al, Ti | Coating | Processability (no primer required), adhesive property |
| | | Wooden building material produced by adhering an elastic rubber material onto a back surface of plywood | Wood | III, IV, V | Si, Al, Ti | Coating | Processability (no primer required), adhesive property |
| | | Decorative panel (wooden material) | Wood | III, IV, V | Si, Al, Ti | Coating | Processability (no primer required), adhesive property |
| | | Others | Wood | III, IV, V | Si, Al, Ti | Coating | Processability (no primer required) |
| Building material | Furniture | Metal furniture | Metal | II, III, IV, V | Si, Al, Ti | Coating | Processability (no primer required) |
| | | Showcase | Glass, wood, metal | II, III, IV, V | Si, Al, Ti | Coating | Processability (no primer required), clear surface pattern |
| | | Shelf plate for a chest of drawers | Wood | III, IV, V | Si, Al, Ti | Coating | Processability (no primer required) |
| | | Telephone booth (excluding those made of metal) | Metal, glass, resin, wood | II, III, IV, V | Si, Al, Ti | Coating | Processability (no primer required), transparency |

*Fluorine-containing ethylenic polymer having functional group of the present invention

TABLE 13

| Classification | Sub-classification | Typical example of finished product | Similar application | Application |
|---|---|---|---|---|
| Building material | Outer wall material, roofing material, exterior material (made of resin) | Ceiling panel (excluding those made of metal) Door (excluding those made of metal) | Floor panel (excluding those made of metal) Grating (excluding those made of metal) Trough (excluding those made of metal) Blind (excluding those made of metal) Blind for indoor use (excluding those made of metal, paper and fabric) Blind (excluding those made of metal for outdoor use) | Medium- or high-storied buildings, houses, etc. |
| | | Plastic panel for concrete | | Building and houses |
| | | Gasket for building | | Building and houses |
| | | Sun shield with a film for insect proof, ultraviolet ray and heat ray shielding and glass scatter prevention | Curtain with a film for insect proof, ultraviolet ray and heat ray shielding and glass scattering prevention Sun shield with a film for insect proof, ultraviolet ray and heat ray shielding and glass scattering prevention | Building and houses |
| | | Floor material (made of stone or vinyl chloride resin provided with stone pattern on its surface) | | Building and houses |
| | | Roofing material (made of plastic with built-in solar system) | | Building and houses |
| | | Tile (of sectional type having a gap, being capable of draining water and made of polyvinyl chloride) | | Buildings and houses, floor of bath room or lavatory, floor of veranda |
| | | Synthetic resin sash | | Medium-storied buildings, houses, etc. |
| Building material | Outer wall material, roofing material, exterior material (made of resin) | Decorative panel (made of thermosetting polymer alloy and used for counter, furniture, door sill, wall panel, baseboard for back splash, bathroom and shower room walls and wainscot) | | Surface |
| | | Lavatory assembly kit (made of plastic) | Assembly set (excluding made of metal) (shower room) Toilet room assembly set Toilet room assembly set (made of plastic) Prefabricated toilet assembly set (excluding those made of metal) (transferable type) Prefabricated public toilet assembly set (excluding those made of metal) | Surface |
| | | Others | Assembly set (excluding those made of metal)(sauna room) Assembly set (excluding those made of metal)(garage) | |
| Building material | Outer wall material, roofing material, (made of woods) | Board (wooden board for building) | Timber for producing domestic furniture Veneer Wooden panel Wooden fence Wooden door for indoor use | Building and houses |
| | | Window frame (made of wood) | | Building and houses |
| | | Wooden building material produced by adhering an elastic rubber material onto a back surface of plywood | | Building and houses |
| | | Decorated plate (wooden material) | | Building and houses |
| | | Others | Assembly set (wooden structure) | Building and houses |
| | Furniture | Metal furniture | | Surface |
| | | Display cabinet | Glass display cabinet, wagon, display wagon, display panel, display stand, meal transporting wagon, flower stand | Surface, glass surface |
| | | Shelf plate for a chest of drawers | Shelf, screen, desk, sofa | |
| | | Telephone booth (excluding those made of metal) | Telephone booth (made of metal) | |

TABLE 14

| Classification | Sub-classification | Typical example of finished product | Characteristics needed | Defects of prior art |
|---|---|---|---|---|
| Appliances for kitchen | Gas oven with grill hood for range | Ventilation hood | Stain-proofing property (non-sticking property for stained oil) | Insufficient adhesive property (to fluorine-containing resin), occurrence of staining |
| Housing | Coordinated kitchen | Range for kitchen | Heat resistance, | Insufficient adhesive property |

TABLE 14-continued

| Classification | Sub-classification | Typical example of finished product | Characteristics needed | Defects of prior art |
|---|---|---|---|---|
| facilities and apparatus | units | (oven) | stain-proofing property (oil, scorch), non-sticking property | (to fluorine-containing resin), occurrence of staining |
| | | Sink | Heat resistance, stain-proofing property (oil), non-sticking property | |
| | | Water heater | Heat resistance, stain-proofing property (oil) | Occurrence of staining |
| | Washstand | Washstand | Stain-proofing property (fur), clear surface pattern (transparency) | Occurrence of staining, poor transparency, low abrasion resistance |
| | Lavatory | Toilet bowl | Stain-proofing property, clear surface pattern (transparency) | Occurrence of staining, poor transparency, low abrasion resistance |
| | | Toilet stool | Stain-proofing property, clear surface pattern (transparency) | Occurrence of staining, poor transparency |
| | | Water tank for lavatory | Stain-proofing property (fur), clear surface pattern (transparency) | Occurrence of staining |
| Housing facilities and apparatuses | Bathroom, Bathroom furniture | Lining for bathroom | Heat resistance, stain-proofing property (fur), transparency, (clear surface pattern) | Occurrence of staining, poor transparency |
| | | Bath tub | Heat resistance, stain-proofing property (fur), transparency (clear surface pattern) | Hot water resistance, occurrence of staining, poor transparency, low abrasion resistance |
| | | Handle for bath tub, soap holder | Stain-proofing property (fur), clear surface pattern (transparency) | Occurrence of staining, poor transparency |
| | Others | Escalator | Stain-proofing property, clear surface pattern (transparency), sliding property | Occurrence of staining, low weather resistance, unclear surface pattern |
| | | Elevator | Stain-proofing property (fingerprint, etc.), clear surface pattern (transparency), rust prevention | Occurrence of staining, unclear surface pattern |
| Construction | Sign | Metal road sign | Weather resistance, stain-proofing property (dust, exhaust gas), transparency | Occurrence of staining, poor transparency |
| | Signal | Luminous and mechanical signal | Weather resistance, stain-proofing property (dust, exhaust gas), transparency | Occurrence of staining, poor transparency |
| | Guardrail | Metal guardrail | Weather resistance, stain-proofing property (dust, exhaust gas), transparency | Occurrence of staining |
| | Utility pole | Metal utility pole | Weather resistance, stain-proofing property (dust, exhaust gas), transparency | Occurrence of staining |
| | Sound-proof wall | Sound-proof wall | Weather resistance, stain-proofing property (dust, exhaust gas), transparency | Occurrence of staining, Transparency becomes poor |
| | Others | Plastic structure for building and construction | Mold release property | Poor mold release |

TABLE 15

| Classification | Sub-classification | Typical example of finished product | Example of substrate | Preferred polymer* | Metal oxide | Applying method | Effect by polymer* |
|---|---|---|---|---|---|---|---|
| Appliances for kitchen | Gas oven with grill, hood for range | Ventilation hood | Metal, aluminum, SUS, steel plate | I-III | Si, Al, Ti | Coating | Processability (no primer required), adhesive property |
| Housing facilities and apparatuses | Coordinated kitchen units | Range for kitchen (oven) | Metal, | I-III | Si, Al, Ti | Coating | Processability (no primer required), adhesive property, abrasion resistance |
| | | Sink | Metal, SUS | I-III | Si, Al, Ti | Coating | Processability (no primer required), clear surface pattern |
| | | Water heater | Metal, | I-III | Si, Al, Ti | Coating | Processability |

TABLE 15-continued

| Classification | Sub-classification | Typical example of finished product | Example of substrate | Preferred polymer* | Metal oxide | Applying method | Effect by polymer* |
|---|---|---|---|---|---|---|---|
| | | | steel plate | | | | (no primer required), clear surface pattern |
| | Washstand | Washstand | Pottery, artificial resin, marble | I-III | Si, Al, Ti | Coating | Processability transparency, (no primer required), abrasion resistance |
| | Lavatory | Toilet bowl | Pottery, resin | I-III | Si, Al, Ti | Coating | Processability (no primer required), transparency, abrasion resistance |
| | | Toilet stool | Resin | I-III | Si, Al, Ti | Coating | Processability (no primer required), transparency, abrasion resistance |
| | | Water tank for lavatory | Pottery | I-III | Si, Al, Ti | Coating | Processability (no primer required), abrasion resistance |
| Housing facilities and apparatuses | Bathroom, bathroom furniture | Lining for bathroom | Resin, metal, tile, wood | I-III | Si, Al, Ti | Coating | Processability (no primer required), transparency, adhesive property, abrasion resistance |
| | | Bath tub | Resin, artificial marble | I-III | Si, Al, Ti | Coating | Processability (no primer required), transparency, abrasion resistance |
| | | Handle for bath tub, soap holder | Resin, metal | I-III | Si, Al, Ti | Coating | Processability (no primer required), transparency |
| | Others | Escalator | Metal, SUS, steel plate | I-III | Si, Al, Ti | Coating | Processability (no primer required), clear surface pattern |
| | | Elevator | Metal, SUS | I-III | Si, Al, Ti | Coating | Processability (no primer required), clear surface pattern |
| Construction | Sign | Metal road sign | Metal, steel plate | I-III | Si, Al, Ti | Coating | Processability (no primer required), transparency, adhesive property |
| | Signal | Luminous and mechanical signal | Metal, glass | I-III | Si, Al, Ti | Coating | Processability (no primer required), transparency, adhesive property |
| | Guardrail | Metal guardrail | Metal, resin, polycarbonate | I-III | Si, Al, Ti | Coating | Processability (no primer required), adhesive property |
| | Utility pole | Metal utility pole | Metal, concrete | I-III | Si, Al, Ti | Coating | Processability (no primer required), adhesive property |
| | Sound-proof wall | Sound-proof wall | Metal, resin, polycarbonate | I-III | Si, Al, Ti | Coating | Processability (no primer required), transparency, adhesive property |
| | Others | Plastic structure for building and construction | Resin | I-III | Si, Al, Ti | Coating | Adhesive property |

*Fluorine-containing ethylenic polymer having functional group of the present invention

TABLE 17

| Classification | Sub-classification | Typical example of finished product | Similar application | Application |
|---|---|---|---|---|
| Facilities for kitchen | Gas oven with grill, hood for range | Ventilation hood | Metal duct (for central heating) Metal duct (for ventilator and air conditioner) | Inner surface |
| Housing facilities and apparatuses | Coordinated kitchen units | Range for kitchen (oven) Sink Water heater | Water heater (electric) Water heater (gas) Water heater (instantaneous oil water heater) | Inner surface (metallic portion) Inner surface of door Surface Surface |

TABLE 17-continued

| Classification | Sub-classification | Typical example of finished product | Similar application | Application |
|---|---|---|---|---|
| | Washstand | Washstand | Washstand (wall-mounting type) | Surface |
| | | | Dressing washstand | - |
| | | | Hair washer (for domestic use) | |
| | | | Washstand with hair washing function | |
| | | | Washing bowl (for washstand) | |
| | | | Washing bowl (with a cover) | |
| | | | Washstand (bowl window type) | |
| | | | Hair washing washstand | |
| | Lavatory | Toilet bowl | Toilet bowl | Surface |
| | | | Chamber pot (small size for car) | |
| | | | Chamber pot (urinal) | |
| | | | Chamber pot (with urinalyzer) | |
| | | | Chamber pot (for little children) | |
| | | Toilet stool | Toilet seat with warm water washer | Surface |
| | | | Toilet seat (warm water type) | |
| | | | Toilet seat (with deodorization unit) | |
| | | Water tank for lavatory | | Surface, inside |
| Housing facilities and apparatuses | Bathroom, bathroom furniture | Lining for bathroom | Shower room | Wall surface, ceiling |
| | | | Domestic sauna | |
| | | | Sauna bath (for shop use) | |
| | | Bath tub | Bath tub (prefabricated type) | Surface |
| | | | Bath tub (with bubble generator) | |
| | | Handle for bath tub, soap holder | | Surface |
| | Others | Escalator | | Surface, prevention from being caught in machine |
| | | Elevator | Domestic elevator | Interior |
| Construction | Sign | Metal road sign | Sign (for bus stop) | Surface |
| | | | Sign (for street) | |
| | | | Sign panel (for road, mounted on guardrail) | |
| | Signal | Luminous and mechanical signal | Surface, light transmitting surface | |
| | Guardrail | Metal guardrail | Guardrail (excluding those made of metal) | Surface |
| | Utility pole | Metal utility pole | Utility pole (excluding those made of metal) | Surface |
| | Sound-proof wall | Sound-proof wall | | Surface, light transmitting surface |
| | Others | Plastic structure for building and construction | | Surface |

EXAMPLE

The present invention is then explained by means of Preparation Example and Examples, but the present invention is not limited to them.

Preparation Example 1

Preparation of Aqueous Dispersion Comprising PFA Having Hydroxyl

A 3-liter glass-lined autoclave equipped with a stirrer, valve, pressure gauge and thermometer was charged with 1,500 ml of pure water, 9.0 g of ammonium perfluorooctanoate and 60 g of paraffin. After replacing with nitrogen gas sufficiently, the autoclave was evacuated and charged with 20 ml of ethane gas.

Then 1.9 g of perfluoro-(1,1,1,9,9-tetrahydro-2,5-bistrifluoromethyl-3,6-dioxa-8-nonenol) (formula (7)):

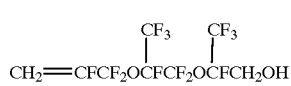

(7)

and 16.1 g of perfluoro(propyl vinyl ether) (PPVE) were fed into the autoclave with pressurized nitrogen, and a temperature inside the system was maintained at 70° C.

Pressurized tetrafluoroethylene gas (TFE) was introduced into the autoclave with stirring so that the inside pressure of the autoclave became 8.5 kgf/cm$^2$G.

Then a solution prepared by dissolving 0.15 g of ammonium persulfate in 5.0 g of water was added with pressurized nitrogen gas to initiate the reaction.

Since the pressure lowered with the advance of the polymerization reaction, it was increased again to 8.5 kgf/cm$^2$G by feeding tetrafluoroethylene gas at the time when it lowered to 7.5 kgf/cm$^2$G. Thus the decreasing and increasing of the pressure was repeated.

With continuing supply of tetrafluoroethylene, every time when about 40 g of tetrafluoroethylene gas was consumed after starting of the polymerization, 0.96 g of the above-mentioned fluorine-containing ethylenic monomer having hydroxyl (compound represented by the formula (7)) was introduced under pressure nine times (8.64 g in total) to continue the polymerization. At the time when about 400 g of tetrafluoroethylene gas was consumed after starting of the polymerization, the supplying thereof was terminated and the autoclave was cooled and the un-reacted monomer was released to give 1,978 g of a bluish semi-transparent aqueous dispersion.

A concentration of the polymer in the obtained aqueous dispersion was 21.1%, and a particle size measured by dynamic light scattering method was 97 nm.

Also a part of the obtained aqueous dispersion was sampled and subjected to freeze coagulation, and the precipitated polymer was rinsed and dried to isolate a white solid. Components and their amounts of the obtained polymer which were determined through $^{19}$F-NMR and IR analyses were TFE/PPVE/(Fluorine-containing ethylenic monomer having hydroxyl and represented by the formula (7))=99.2/0.3/0.5% by mole.

In infrared spectrum, characteristic absorption of —OH was observed at 3,620 to 3,400 cm$^{-1}$.

According to DSC analysis, Tm was 313° C., and according to TGA analysis, 1% decomposition temperature Td was 357° C. A melt low rate measured under conditions of preheating at 372° C. for five minutes at a load of 7 kgf/cm$^2$ by using Koka-type flow tester and nozzles of 2 mm×8 mm length was 1.5 g/ 10 min.

Preparation Example 2

Preparation of Aqueous Dispersion Comprising PFA Having Hydroxyl

The same autoclave as in Preparation Example 1 was charged with 1,500 ml of pure water, 9.0 g of ammonium perfluorooctanoate and 60 g of paraffin. After replacing with nitrogen gas sufficiently, the autoclave was evacuated and charged with 20 ml of ethane gas.

Then 3.6 g of perfluoro-(1,1,9,9-tetrahydro-2,5-bistrifluoromethyl-3,6-dioxa-8-nonenol) (compound of the formula (7)) and 16.5 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure became 8.5 kgf/cm$^2$G.

Then a solution prepared by dissolving 0.15 g of ammonium persulfate in 5.0 g of water was fed with pressurized nitrogen gas to initiate the reaction.

Since the pressure lowered with the advance of the polymerization reaction, at the time when the pressure lowered down to 7.5 kgf/cm$^2$G, it was increased again to 8.5 kgf/cm$^2$G with tetrafluoroethylene gas, and the decreasing and increasing of the pressure were repeated.

With continuing supply of tetrafluoroethylene, every time when 40 g of tetrafluoroethylene gas was consumed after starting of the polymerization, 1.8 g of the fluorine-containing ethylenic monomer having hydroxyl (compound represented by the formula (7)) was introduced nine times (16.2 g in total) under pressure to continue the polymerization. When 400 g of tetrafluoroethylene was consumed after starting of the polymerization, the supplying thereof was terminated. The autoclave was cooled and the un-reacted monomer was released to give 1,997 g of an aqueous dispersion. A concentration of the polymer in the obtained aqueous dispersion was 22.1% and a particle size thereof was 141 nm.

A part of the aqueous dispersion was sampled, and a white solid was isolated in the same manner as in Preparation Example 1.

Analysis of the obtained white solid indicates: TFE/PPVE/(Fluorine-containing monomer having hydroxyl and represented by the formula (7))=98.2/0.7/1.1% by mole Tm=314° C.

1% Thermal decomposition temperature Td=366° C.

Melt flow rate: 1.3 g/10 min

In infrared spectrum, characteristic absorption of —OH was observed at 3,620 to 3,400 cm$^{-1}$.

Preparation Example 3

Preparation of Aqueous Dispersion Comprising PFA Having Hydroxyl

The same autoclave as in Preparation Example 1 was charged with 1,500 ml of pure water, 9.0 g of ammonium perfluorooctanoate and 60 g of paraffin. After replacing with nitrogen gas sufficiently, the autoclave was evacuated and charged with 20 ml of ethane gas.

Then 3.6 g of perfluoro-(1,1,9,9-tetrahydro-2,5-bistrifluoromethyl-3,6-dioxa-8-nonenol) (compound of the formula (7)) and 18.4 g of perfluoro(propyl vinyl ether) (PPVE) were fed into the autoclave with pressurized nitrogen gas, and a temperature inside the system was maintained at 70° C.

Pressurized tetrafluoroethylene (TFE) gas was introduced into the autoclave with stirring so that the inside pressure became 8.5 kgf/cm$^2$G.

Then a solution prepared by dissolving 0.15 g of ammonium persulfate in 5.0 g of water was fed with pressurized nitrogen to initiate the reaction.

Since the pressure lowered with the advance of the polymerization reaction, at the time when the pressure lowered down to 7.5 kgf/cm$^2$G, it was increased again to 8.5 kgf/cm$^2$G, and the decreasing and increasing of the pressure were repeated.

With continuing supply of tetrafluoroethylene, every time when 40 g of tetrafluoroethylene gas was consumed after starting of the polymerization, 3.6 g of the fluorine-containing ethylenic monomer having hydroxyl (compound represented by the formula (7)) was introduced nine times (32.4 g in total) under pressure to continue the polymerization. When 400 g of tetrafluoroethylene was consumed after starting of the polymerization, the supplying thereof was terminated. The autoclave was cooled and the un-reacted monomer was released to give 1,988 g of an aqueous dispersion. A concentration of the polymer in the obtained aqueous dispersion was 22.3% and a particle size thereof was 85 nm.

A part of the aqueous dispersion was sampled, and a white solid was isolated in the same manner as in Preparation Example 1.

Analysis of the obtained white solid indicates: TFE/PPVE/(Fluorine-containing monomer having hydroxyl and represented by the formula (7))=97.3/0.9/1.8% by mole Tm=314° C.

1% Thermal decomposition temperature Td=371° C.

Melt flow rate: 1.1 g/10 min

In infrared spectrum, characteristic absorption of —OH was observed at 3,620 to 3,400 cm$^{-1}$.

Preparation Example 4

Synthesis of Aqueous Dispersion of PFA Having No Functional Group

Emulsion polymerization was carried out in the same manner as in Preparation Example 1 except that paraffin and perfluoro-(1,1,9,9-tetrahydro-2,5-bistrifluoromethyl-3,6-dioxa-8-nonenol) (compound of the formula (7)) were not used, and 1,922 g of an aqueous dispersion of PFA having no functional group was obtained.

A concentration of the polymer in the aqueous dispersion was 21.6%, and a particle size thereof was 156 nm.

A white solid was isolated and analyzed in the same manner as in Preparation Example 1.

TFE/PPVE=99.3/0.7% by mole

Tm=317° C.

1% Thermal decomposition temperature Td=479° C.

Melt flow rate: 19.2 g/10 min

In infrared spectrum, no characteristic absorption of —OH was observed.

Example 1

(1) Preparation of metal oxide sol

A 500 ml beaker was charged with 54 g of tetraethoxysilane, 46 g of triethoxymethylsilane and 200 g of ethanol, followed by stirring at room temperature for one hour. Then 50 g of 0.1 N hydrochloric acid was added, followed by stirring at 50° C. for three hours to give a silica sol solution.

(2) Preparation of coating solution

To 44.8 g of the PFA dispersion obtained in Preparation Example 3 was added 87.5 g of the silica sol solution obtained in above (1), followed by stirring at room temperature for one hour to give a coating solution.

(3) Coating

On a Pyrex glass plate was applied the coating solution obtained in above (2) by using a 10 mil applicator to form a wet coating film.

(4) Baking

After the wet coating film obtained in above (3) was air-dried at room temperature to dry water and ethanol on the glass substrate, followed by baking in the air at 250° C. for 60 minutes to give an about 6 μm thick coating film.

(5) Test

With respect to the coating solution and coating film obtained in Example 1, the following tests were carried out.

① Dispersion stability of coating solution

The coating solution obtained in above (2) was allowed to stand at room temperature for three hours to observe dispersion stability. When the whole solution was transparent or semi-transparent, it was evaluated as "○"; when the whole solution was turbid in white, it was evaluated as "Δ"; and when the fluorine-containing polymer was partly precipitated in the solution or when the whole solution was coagulated, it was evaluated as "X".

② Transparency of coating film

To determine transparency of the coating film obtained in above (4), haze value was measured with a haze meter.

③ Hardness of coating film

Pencil scratch test was carried out according to JIS K5401 at room temperature to measure hardness of pencil.

④ Adhesive property

According to JIS K5400, a hundred squares were cut by cross-cutting the coating film surface, an adhesive tape was stuck to the cross-cut surface and the adhesive tape was strongly pulled up in the direction vertical to the surface to observe state of peeling of the cut squares. The adhesive property is indicated by the number of remaining squares per 100.

⑤ Test for non-sticking property

Measurement was carried out at room temperature. FIG. 1 shows a diagrammatic perspective view of a test piece used for the test for non-sticking property. The test piece 1 was one obtained in above (4), and its length a was not less than 150 mm. Stains on the test piece was wiped off with acetone. Firstly 18 mm wide adhesive tape 2 (JIS Z 1522) was cut to a length of 300 mm. Only a portion of the adhesive tape which is 150 mm length a was put on the test piece 1, and the tape 2 was rubbed with an eraser of JIS S 6050 to give an adhered part 3. To the remaining 150 mm long portion was stuck a paper (not shown in FIG. 1) to make handling easy. After pressing the tape on the test piece, it was allowed to stand for 20 minutes to well adhere the tape 2 to the test piece 1. Then the tape 2 was peeled off only by width b (25 mm) from the end of the test piece 1, and the test piece 1 was mounted on a clamp at a lower part of a tension tester. One end of the partly peeled tape 2 was folded at an angle of 180°, and set on a clamp at an upper part of the tester so that the tape 2 could be peeled off straightly. A force for peeling the tape 2 from the test piece 1 at a tension speed of 20 mm/min was measured. A measured value was determined by averaging a force for peeling the tape 2 smoothly.

⑥ Water repellency of coating film

A contact angle of water on the above-mentioned coating film was measured with a contact angle meter.

⑦ Abrasion resistance test

The above-mentioned coating film was rubbed 3,000 times with a flannel cloth (cotton No. 300) at a load of 1.5 kg/4 cm², and then a contact angle of water was measured in the same manner as in above ⑥.

The results are shown in Table 18.

Example 2

A coating solution comprising components in amounts shown in Table 18 was prepared in the same manner as in Example 1 by using the aqueous dispersion of the fluorine-containing polymer (A) obtained in Preparation Example 2.

Coating, baking and tests were carried out in the same manner as in Example 1 except that the obtained coating solution was coated by using a 6 mil applicator. The results are shown in Table 18.

Example 3

Preparation of a coating solution, coating, baking and tests were carried out in the same manner as in Example 2 except that the aqueous dispersion of the fluorine-containing polymer (A) obtained in Preparation Example 1 was used and a coating solution comprising components in amounts shown in Table 18 was prepared. The results are shown in Table 18.

Comparative Example 1

Preparation of a coating solution, coating, baking and tests were carried out in the same manner as in Example 1 except that the aqueous dispersion of the fluorine-containing polymer having no functional group and obtained in Preparation Example 4 was used and a coating solution comprising components in amounts shown in Table 18 was prepared. The results are shown in Table 18.

Comparative Example 2

Coating, baking and evaluation were carried out in the same manner as in Example 1 by using only a silica sol solution to which no aqueous dispersion of fluorine-containing polymer had been added. The results are shown in Table 18.

TABLE 18

|  | EXAMPLE | | | Comparative Example | |
| --- | --- | --- | --- | --- | --- |
|  | 1 | 2 | 3 | 1 | 2 |
| Aqueous dispersion of fluorine-containing copolymer | Prep. Ex. 3 | Prep. Ex. 2 | Prep. Ex. 1 | Prep. Ex. 4 | — |
| Coating solution |  |  |  |  |  |
| Dispersion of fluorine-containing copolymer (g) | 44.8 | 45.2 | 47.1 | 46.2 | — |
| Silica sol solution (g) | 87.5 | 87.5 | 34.0 | 87.5 | — |
| Dispersion stability of coating solution | ◯ | ◯ | ◯ | Δ-X | ◯ |
| Components in coating film (% by weight) |  |  |  |  |  |
| Fluorine-containing copolymer | 54 | 54 | 75 | 54 | — |
| Silica | 46 | 46 | 25 | 46 | 100 |
| Coating thickness ($\mu$m) | 6 | 3 | 3 | 6 | 5 |
| Transparency of coating film |  |  |  |  |  |
| Haze value (%) | 0.07 | 0.1 | 3.6 | 20 | 0.05 |
| Hardness of coating film | 6H | — | — | 6B | — |
| Adhesive property | 100/100 | 100/100 | 100/100 | 20/100 | — |
| Non-sticking property (gf/18 mm) | 240 | 245 | 230 | Peeled | 300 |
| Water repellency of coating film |  |  |  |  |  |
| Contact angle of water (degree) | 110 | 105 | 110 | 90 | 73 |
| Abrasion resistance of coating film |  |  |  |  |  |
| Contact angle of water after abrasion test (degree) | 88 | 80 | 96 | 51 | 34 |

As is clear from the results shown in Table 18, it is seen that the coating composition of the present invention is excellent in dispersion stability and the coating film obtained from the composition is excellent in transparency, water repellency and abrasion resistance.

Example 4

Preparation of a coating solution, coating and baking were carried out in the same manner as in Example 1 except that instead of the Pyrex glass sheet, a 1.5 mm thick pure aluminum sheet (AlO5OP) degreased with acetone was used, to form a coating film on the aluminum sheet. The obtained coating film was transparent and excellent in property for exhibiting clear surface pattern, and the aluminum surface was seen vividly.

By using the coated sheet, measurement of a coating thickness and tests for adhesive property, non-sticking property and water repellency were carried out in the same manner as in Example 1. Further tests for stain-proofing property and weather resistance were carried out by the methods mentioned below.

⑧ Test for stain-proofness for carbon (Preparation of carbon solution)

To 90 g of ion-exchanged water was added 10 g of a carbon powder (MA100 available from Mitsubishi Chemical Co., Ltd.), followed by dispersing and mixing by using glass beads to give a carbon dispersion.

(Application of carbon)

The above-mentioned carbon dispersion was applied to the coated sheet by spraying at about 50 g/m² and heated at 80° C. for two hours to give a black test piece.

(Evaluation)

The obtained black test piece was exposed to flowing water and cleaned with brush. Then a degree of contamination was observed with naked eyes and evaluated under the following criteria. The results are shown in Table 19.

◯: It is possible to remove contamination by washing. Nearly the same coated sheet as before the coating of carbon dispersion is recovered.

Δ: A part of contamination could be removed by washing, but grey contamination remained over the whole surface of the coated sheet and could not be removed.

X: Black contamination remained over the whole surface of the coated sheet and could not be removed even by cleaning with water.

⑨ Weather resistance test

The above-mentioned coated sheet was put in I-SUPER UV tester (available from Iwasaki Denki Co., Ltd.), and accelerated weather resistance test was carried out. After 500-hour test, a contact angle of water on the coated sheet was measured. The results are shown in Table 19.

Comparative Example 3

After 80 to 120 mesh sand blasting of the same aluminum sheet as in Example 4, a primer (POLYFLON TFE ENAMEL EK-1959 DGN available from Daikin Industries, Ltd.) was spray-coated thereon and dried at 90° C. in an infrared drying oven to form a primer layer.

After electrostatic coating of a PFA powder coating (NEOFLON powder coating ACX-31 available from Daikin Industries, Ltd.) on the primer layer, baking was carried out at 350° C. for 30 minutes to give a coated sheet having a PFA powder coating layer. A coating film having a grayish brown primer layer was obtained.

Also the same tests as in Example 4 were carried out by using the coated sheet having the PFA powder coating film. The results are shown in Table 19.

Comparative Example 4

A paint for clear coating was prepared by mixing 100 g of ZEFFLE GK510 (available from Daikin Industries, Ltd., OH value: 60) which is a varnish for room temperature curing type fluorine-containing resin coating, 10.5 g of CORONATE HX (available from Nippon Polyurethane Co., Ltd.) which is an isocyanate curing agent and 120 g of butyl acetate and then adjusting OH/NCO ratio to 1:1.

After spray-coating of the paint for clear coating on an aluminum sheet which had been sand-blasted in the same manner as in Comparative Example 3, baking was carried out at 120° C. for 30 minutes to give a coated sheet having a coating film thereon. Also the same tests as in Example 4 were carried out by using the coated sheet. The results are shown in Table 19.

Comparative Example 5

A paint was prepared by mixing 100 g of ACRYDIC A801 (available from Dai Nippon Ink Co., Ltd., OH value: 100) which is a varnish for a room temperature curing acrylic resin coating, 17 g of CORONATE HX (same as in Comparative Example 4) which is an isocyanate curing agent and 120 g of butyl acetate and then adjusting OH/NCO ratio to 1:1. The obtained coating was spray-coated on an aluminum sheet and baked in the same manner as in Comparative Example 4 to give a coated sheet having a coating film thereon.

Also the same tests were carried out in the same manner as in Example 4 by using the coated sheet. The results are shown in Table 19.

composite material produced by forming the coating film on various substrates, excellent transparency and abrasion resistance and further water repellency, stain-proofing property, non-sticking property, sliding property, weather resistance and heat resistance.

Further the coating composition of the present invention can be applied to various substrates of not only glass but also metal, resin, ceramic, etc., and can give the coating film having excellent adhesive property. The coating composition can give to various substrates not only water repellency and transparency but also heat resistance, weather resistance, stain-proofing property, chemical resistance, low friction property, non-sticking property, low refraction property, anti-reflection property, etc., and can be used for various applications.

TABLE 19

|  | Ex. 4 | Com. Ex. 3 | Com. Ex. 4 | Com. Ex. 5 |
|---|---|---|---|---|
| Appearance of coating film | Transparent | Grayish brown | Transparent | Transparency |
| Coating thickness ($\mu$m) | 7 | 50 | 20 | 20 |
| Hardness of coating film | 7H | H | H | H |
| Adhesive property | 100/100 | 100/100 | 100/100 | 100/100 |
| Non-sticking property (gf/18 mm) | 235 | 230 | | |
| Water repellency of coating film | | | | |
| Contact angle of water (degree) | 115 | 102 | 92 | 80 |
| Evaluation in test of stain-proofing property for carbon | ○ | — | Δ | Δ |
| Contact angle of water in weather resistance test | 100 | — | 85 | not more than 20 |

INDUSTRIAL APPLICABILITY

The present inventors have found the following effects with respect to the coating composition of the present invention which is obtained by introducing the above-mentioned specific functional group into a fluorine-containing polymer and combining the polymer with a metal oxide and solvent, and a coating film and multi-functional composite material which are obtained by using the coating composition.

① A fluorine-containing resin is inherently low in affinity with water and solvent, and even in a dispersion of fluorine-containing resin particles containing an emulsifying agent, in many cases, the fluorine-containing resin, when added to a solvent, becomes unstable and is precipitated. However as mentioned above, by introducing the specific functional group, dispersion stability of the fluorine-containing polymer (A) dispersion is enhanced and the stable composition which is free from precipitation even in combination use with such an alcohol solvent as used in the coating composition of the present invention can be obtained.

② Also in preparing the solution of the metal oxide sol (B-1) and in the polycondensation reaction after the hydrolysis, the functional group of the fluorine-containing polymer (A) partly takes part in a reaction with a metal compound or metal oxide to enhance dispersion stability of the fluorine-containing polymer (A) in the coating composition.

③ In the process for further advancing the polycondensation of the metal oxide (B) in the baking step after the coating, the same reaction as in above ② occurs, and by the resulting binding, dispersibility and interfacial adhesion of the fluorine-containing polymer (A) with the metal oxide (B) (gel) in the coating film are improved.

By the above-mentioned effects, the coating composition of the present invention comprising the fluorine-containing polymer (A), metal oxide (B) and solvent (C) and the coating film of the composition give, to the multi-functional Particularly when the substrate is glass, transparency of the substrate glass is not lost and water repellency, oil repellency, anti-reflection property, low refraction property, etc. can be given to a surface of the substrate glass. The glass substrate coated with the coating composition can be used for ① glass for cars, ② glass for building, ③ optics-related parts, ④ liquid crystal-related parts, etc. Also corrosion resistance, rust-preventive property, chemical resistance, weather resistance, non-sticking property and sliding property can be given to metallic surfaces of aluminum, iron, alloy, etc., and various applications such as building material, chemical plant, food processing, cooking apparatus, car-related parts and office automation-related parts can be developed.

Further the multi-functional composite material of the present invention can be used preferably in various fields as water-repellent composite material, stain-proofing composite material, non-sticking composite material, weather resistant composite material and composite material having sliding property, and particularly preferably used as a composite material for cooking apparatuses and for building.

What is claimed is:

1. A coating composition comprising
   (A) a fluorine-containing ethylenic polymer which contains a fluorine-containing ethylenic recurring unit having at least one of functional group selected from the group consisting of hydroxyl, carboxyl, a carboxylic salt group and epoxy,
   (B-1) a metal oxide sol, and
   (C) a solvent.

2. The coating composition of claim 1, wherein the fluorine-containing polymer (A) having functional group is in the form of fine particles having an average particle size of from about 0.01 $\mu$m to about 1.0 $\mu$m.

3. A coating film of metal oxide which comprises a metal oxide (B) and the fine particles of the fluorine-containing polymer (A) having functional group of claim 2; said fine particles being dispersed in the coating film.

4. In the method for producing a coating film by using a metal oxide sol (B-1) obtained from at least one selected from the group consisting of a metal alkoxide, a metal acetylacetate, a metal carboxylate, a metal nitrate and a metal chloride and an aqueous dispersion of fine particles of the fluorine-containing polymer (A) having functional group of claim 2 prepared by emulsion polymerization; said method comprising the steps of (1) preparing a coating solution by mixing the metal oxide sol (B-1) and the aqueous dispersion, (2) forming the coating film by applying the coating solution to a substrate, and (3) baking the coating film to obtain the film containing the fine particles of the fluorine-containing polymer (A) having functional group in a dispersed state.

5. The coating composition of claim 2, wherein the fine particles of the fluorine-containing polymer (A) having functional group are water-repellent fine particles having an average particle size of from about 0.01 $\mu$m to about 1.0 $\mu$m.

6. A coating film of metal oxide which comprises a metal oxide (B) and the water-repellent fine particles of the fluorine-containing polymer (A) having functional group of claim 5; said water-repellent fine particles being dispersed in the coating film.

7. A coating composition comprising (A) a fluorine-containing ethylenic polymer having at least one of functional group selected from the group consisting of hydroxyl, carboxyl, a carboxylic salt group and epoxy, (B-1) a metal oxide sol, and (C) a solvent;

said fluorine-containing ethylenic polymer (A) having functional group being obtained by copolymerizing (a) 0.05 to 50% by mole of at least one of fluorine-containing ethylenic monomers having functional group and represented by the formula (1):

$$CX_2=CX^1-R_f-Y \qquad (1)$$

wherein Y is —CH$_2$OH, —COOH, a carboxylic salt group, a carboxylic ester group or epoxy, X and X$^1$ are the same or different and each is hydrogen atom or fluorine atom, R$_f$ is a divalent fluorine-containing alkylene group having 1 to 40 carbon atoms or a divalent fluorine-containing alkylene group having ether bond and 1 to 40 carbon atoms, and (b) 50 to 99.95% by mole of at least one of fluorine-containing ethylenic monomers copolymerizable with the fluorine-containing ethylenic monomer (a) having functional group.

8. The coating composition of claim 7, wherein the fluorine-containing ethylenic monomer (a) having functional group is represented by the formula (2):

$$CH_2=CFCF_2-R_f^1-Y^1 \qquad (2)$$

wherein Y$^1$ is —CH$_2$OH, —COOH, a carboxylic salt group, a carboxylic ester group or epoxy, R$_f^1$ is a divalent fluorine-containing alkylene group having 1 to 39 carbon atoms or OR$_f^2$, in which R$_f^2$ is a divalent fluorine-containing alkylene group having 1 to 39 carbon atoms or a divalent fluorine-containing alkylene group having ether group and 1 to 39 carbon atoms.

9. The coating composition of claim 7, wherein the fluorine-containing ethylenic monomer (b) is tetrafluoroethylene.

10. The coating composition of claim 7, wherein the fluorine-containing ethylenic monomer (b) is a mixture of 85 to 99.7% by mole of tetrafluoroethylene and 0.3 to 15% by mole of a monomer represented by the formula (3):

$$CF_2=CF-R_f^3 \qquad (3)$$

wherein R$_f^3$ is CF$_3$ or OR$_f^4$, in which R$_f^4$ is a perfluoroalkyl group having 1 to 5 carbon atoms.

11. A coating film of metal oxide which comprises a metal oxide (B) and the fluorine-containing polymer (A) having functional group of claim 7.

* * * * *